(12) United States Patent
Kitajima

(10) Patent No.: US 10,574,765 B2
(45) Date of Patent: Feb. 25, 2020

(54) METHOD, DEVICE, AND NON-TRANSITORY COMPUTER-READABLE RECORDING MEDIUM

(71) Applicant: FUJITSU LIMITED, Kawasaki-shi, Kanagawa (JP)

(72) Inventor: Shinya Kitajima, Shinagawa (JP)

(73) Assignee: FUJITSU LIMITED, Kawasaki (JP)

( * ) Notice: Subject to any disclaimer, the term of this patent is extended or adjusted under 35 U.S.C. 154(b) by 98 days.

(21) Appl. No.: 15/812,232

(22) Filed: Nov. 14, 2017

(65) Prior Publication Data

US 2018/0139288 A1  May 17, 2018

(30) Foreign Application Priority Data

Nov. 15, 2016 (JP) ................................. 2016-222451

(51) Int. Cl.
*H04L 29/08* (2006.01)
*H04L 12/24* (2006.01)

(52) U.S. Cl.
CPC .............. *H04L 67/16* (2013.01); *H04L 41/12* (2013.01); *H04L 41/5009* (2013.01)

(58) Field of Classification Search
None
See application file for complete search history.

(56) References Cited

U.S. PATENT DOCUMENTS

| 8,874,719 | B1* | 10/2014 | Burnett | ................... H04L 41/28 |
| | | | | 709/223 |
| 2012/0117226 | A1 | 5/2012 | Tanaka et al. | |
| 2015/0016294 | A1* | 1/2015 | Hegge | ..................... H04L 47/41 |
| | | | | 370/252 |
| 2017/0177636 | A1* | 6/2017 | Nguyen | .............. G06F 16/2264 |
| 2019/0028298 | A1* | 1/2019 | Murray | ................. H04L 12/423 |

FOREIGN PATENT DOCUMENTS

| JP | 2012-99048 | 5/2012 |
| JP | 2013-171541 | 9/2013 |

* cited by examiner

*Primary Examiner* — Angela Nguyen
(74) *Attorney, Agent, or Firm* — Fujitsu Patent Center

(57) ABSTRACT

A method includes: generating relation information indicating service relationships each indicating that a first service and a source service and a destination service are related each other when a reception from the source service occurs at the first service and when a transmission to the destination service occurs at the first service and when a time of the reception is within a specific time period before a time of the transmission, determining whether the first service and the specified source service and the specified destination service have performed a related communication based on a number of service relationships corresponding to a combination of the first service and the specified source service and the specified destination service, and outputting information representing the combination of the first service and the specified source service and the specified destination service that are determined to have performed the related communication.

11 Claims, 57 Drawing Sheets

FIG. 8

| SERVICE NAME | IP ADDRESS | PORT NUMBER |
|---|---|---|
| PROXY p | 10.254.212.13 | 9030 |
| SERVICE a_1 | 172.16.32.3 | 9030 |
| ... | ... | ... |

FIG. 11

10.254.212.13 (PROXY p) : PARENT-SIDE SPAN 152

| PARENT-SIDE SPAN ID | RECEPTION TIME | TRANSMISSION TIME | USED PORT | COMMUNICATION-SOURCE IP | COMMUNICATION-SOURCE PORT |
|---|---|---|---|---|---|
| Sp_p1 | 11315 | 11415 | 9030 | CLIENT | 60002 |
| Sp_p2 | 11645 | 11745 | 9030 | CLIENT | 52684 |
| Sp_p3 | 11875 | 11975 | 9030 | CLIENT | 46955 |
| Sp_p3 | 12945 | 13045 | 9030 | CLIENT | 56996 |
| Sp_p4 | 13255 | 13355 | 9030 | CLIENT | 46912 |
| Sp_p5 | 14585 | 14685 | 9030 | CLIENT | 41236 |

10.254.212.13 (PROXY p) : CHILD-SIDE SPAN 152

| CHILD-SIDE SPAN ID | TRANSMISSION TIME | RECEPTION TIME | USED PORT | COMMUNICATION-DESTINATION IP | COMMUNICATION-DESTINATION PORT |
|---|---|---|---|---|---|
| Sc_p1 | 11320 | 11410 | 34785 | 172.16.32.3 | 9030 |
| Sc_p2 | 11650 | 11740 | 34787 | 172.16.16.2 | 9030 |
| Sc_p3 | 11880 | 11970 | 34789 | 172.16.32.3 | 9030 |
| Sc_p3 | 12950 | 13040 | 34791 | 172.16.16.2 | 9030 |
| Sc_p4 | 13260 | 13350 | 34793 | 172.16.32.3 | 9030 |
| Sc_p5 | 14590 | 14680 | 34795 | 172.16.16.2 | 9030 |

FIG. 14

10.254.212.13 (PROXY p) : PARENT-SIDE SPAN

| | RECEPTION TIME | TRANSMISSION TIME | USED PORT | COMMUNICATION-SOURCE IP | COMMUNICATION-SOURCE PORT |
|---|---|---|---|---|---|
| Sp_p_1 | 11315 | 11415 | 9030 | CLIENT | 60002 |
| Sp_p_2 | 11645 | 11745 | 9030 | CLIENT | 52684 |
| Sp_p_3 | 11875 | 11975 | 9030 | CLIENT | 46955 |
| Sp_p_4 | 12945 | 13045 | 9030 | CLIENT | 56996 |
| Sp_p_5 | 13255 | 13355 | 9030 | CLIENT | 46912 |
| Sp_p_6 | 14585 | 14685 | 9030 | CLIENT | 41236 |

10.254.212.13 (PROXY p) : CHILD-SIDE SPAN

| | TRANSMISSION TIME | RECEPTION TIME | USED PORT | COMMUNICATION-DESTINATION IP | COMMUNICATION-DESTINATION PORT |
|---|---|---|---|---|---|
| Sc_p_1 | 11320 | 11410 | 34785 | 172.16.32.3 | 9030 |
| Sc_p_2 | 11650 | 11740 | 34787 | 172.16.16.2 | 9030 |
| Sc_p_3 | 11880 | 11970 | 34789 | 172.16.32.3 | 9030 |
| Sc_p_4 | 12950 | 13040 | 34791 | 172.16.16.2 | 9030 |
| Sc_p_5 | 13260 | 13350 | 34793 | 172.16.32.3 | 9030 |
| Sc_p_6 | 14590 | 14680 | 34795 | 172.16.16.2 | 9030 |

10.254.212.13 (PROXY p) : PARENT CANDIDATE 〜153

| CHILD-SIDE SPAN | CHILD-SIDE COMMUNICATION DESTINATION | PARENT CANDIDATE | PARENT-CANDIDATE COMMUNICATION-SOURCE IP |
|---|---|---|---|
| Sc_p_1 | 172.16.32.3:9030 | Sp_p_1 | CLIENT |
| Sc_p_2 | 172.16.32.3:9030 | Sp_p_2, Sp_p_1 | CLIENT |
| Sc_p_3 | 172.16.32.3:9030 | Sp_p_3, Sp_p_2, Sp_p_1 | CLIENT |
| Sc_p_4 | 172.16.32.3:9030 | Sp_p_4 | CLIENT |
| Sc_p_5 | 172.16.32.3:9030 | Sp_p_5, Sp_p_4 | CLIENT |
| Sc_p_6 | 172.16.32.3:9030 | Sp_p_6 | CLIENT |

FIG. 15

| 172.16.32.3 (SERVICE a_1) : PARENT-SIDE SPAN ||||||
|---|---|---|---|---|---|
| | RECEPTION TIME | TRANSMISSION TIME | USED PORT | COMMUNICATION-SOURCE IP | COMMUNICATION-SOURCE PORT |
| Sp_a1_1 | 11325 | 11415 | 9030 | 10.254.214.13 | 34785 |
| Sp_a1_2 | 11885 | 11965 | 9030 | 10.254.214.13 | 34789 |
| Sp_a1_3 | 13265 | 13345 | 9030 | 10.254.214.13 | 34793 |

| 172.16.32.3 (SERVICE a_1) : CHILD-SIDE SPAN ||||||
|---|---|---|---|---|---|
| | TRANSMISSION TIME | RECEPTION TIME | USED PORT | COMMUNICATION-DESTINATION IP | COMMUNICATION-DESTINATION PORT |
| Sc_a1_1 | 11335 | 11361 | 42687 | 172.16.32.2 | 9001 |
| Sc_a1_2 | 11895 | 11921 | 42691 | 172.16.32.2 | 9001 |
| Sc_a1_3 | 13275 | 13350 | 42695 | 172.16.32.2 | 9001 |

153

| 172.16.32.3 (SERVICE a-1) : PARENT CANDIDATE ||||
|---|---|---|---|
| CHILD-SIDE SPAN | PARENT CANDIDATE | CHILD-SIDE COMMUNICATION-DESTINATION | PARENT-CANDIDATE COMMUNICATION-SOURCE IP |
| Sc_a1_1 | Sp_a1_1 | 172.16.32.2:9001 | 10.254.212.13 |
| Sc_a1_2 | Sp_a1_2, Sp_a1_1 | 172.16.32.2:9001 | 10.254.212.13 |
| Sc_a1_3 | Sp_a1_3 | 172.16.32.2:9001 | 10.254.212.13 |

FIG. 16

| 172.16.16.2 (SERVICE a_2) : PARENT-SIDE SPAN | | | | | |
|---|---|---|---|---|---|
| | RECEPTION TIME | TRANSMISSION TIME | USED PORT | COMMUNICATION -SOURCE IP | COMMUNICATION -SOURCE PORT |
| Sp_a2_1 | 11655 | 11735 | 9030 | 10.254.212.13 | 34784 |
| Sp_a2_2 | 12955 | 13035 | 9030 | 10.254.212.13 | 34791 |
| Sp_a2_3 | 14595 | 14675 | 9030 | 10.254.212.13 | 34795 |

| 172.16.16.2 (SERVICE a_2) : CHILD-SIDE SPAN | | | | | |
|---|---|---|---|---|---|
| | TRANSMISSION TIME | RECEPTION TIME | USED PORT | COMMUNICATION -DESTINATION IP | COMMUNICATION- DESTINATION PORT |
| Sc_a2_1 | 11665 | 11691 | 42689 | 172.16.32.2 | 9001 |
| Sc_a2_2 | 12965 | 12991 | 42693 | 172.16.32.2 | 9001 |
| Sc_a2_3 | 14605 | 14631 | 42697 | 172.16.32.2 | 9001 |

153

| 172.16.16.2 (SERVICE a_2) : PARENT CANDIDATE | | | |
|---|---|---|---|
| CHILD-SIDE SPAN | PARENT CANDIDATE | CHILD-SIDE COMMUNICATION DESTINATION | PARENT-CANDIDATE COMMUNICATION-SOURCE IP |
| Sc_a2_1 | Sp_a2_1 | 172.16.32.2:9001 | 10.254.212.13 |
| Sc_a2_2 | Sp_a2_2 | 172.16.32.2:9001 | 10.254.212.13 |
| Sc_a2_3 | Sp_a2_3 | 172.16.32.2:9001 | 10.254.212.13 |

FIG. 17

| | 172.16.16.4 (SERVICE e) : PARENT-SIDE SPAN | | | | |
|---|---|---|---|---|---|
| | RECEPTION TIME | TRANSMISSION TIME | USED PORT | COMMUNICATION-SOURCE IP | COMMUNICATION-SOURCE PORT |
| Sp_e_1 | 11348 | 11378 | 9021 | 172.16.32.4 | 52136 |
| Sp_e_2 | 11473 | 11553 | 9021 | 172.16.16.3 | 52138 |
| Sp_e_3 | 12518 | 12598 | 9021 | 172.16.32.4 | 52142 |
| Sp_e_4 | 12538 | 12568 | 9021 | 172.16.16.3 | 52146 |
| Sp_e_5 | 13918 | 13948 | 9021 | 172.16.32.4 | 52148 |

| | 172.16.16.4 (SERVICE e) : CHILD-SIDE SPAN | | | | |
|---|---|---|---|---|---|
| | TRANSMISSION TIME | RECEPTION TIME | USED PORT | COMMUNICATION-DESTINATION IP | COMMUNICATION-DESTINATION PORT |
| Sc_e_1 | 11483 | 11509 | 42987 | 172.16.32.2 | 9001 |
| Sc_e_2 | 11488 | 11544 | 42989 | 172.16.16.5 | 9121 |
| Sc_e_3 | 12528 | 12554 | 42991 | 172.16.32.2 | 9001 |
| Sc_e_4 | 12533 | 12589 | 42993 | 172.16.16.5 | -121 |

153

| | 172.16.16.4 (SERVICE e) : PARENT CANDIDATE | | |
|---|---|---|---|
| CHILD-SIDE SPAN | PARENT CANDIDATE | CHILD-SIDE COMMUNICATION DESTINATION | PARENT-CANDIDATE COMMUNICATION-SOURCE IP |
| Sc_e_1 | Sp_e_2, Sp_e_1 | 172.16.32.2:9001 | 172.16.16.3, 172.16.32.4 |
| Sc_e_2 | Sp_e_2, Sp_e_1 | 172.16.16:5:9121 | 172.16.16.3, 172.16.32.4 |
| Sc_e_3 | Sp_e_3 | 172.16.32.2:9001 | 172.16.32.4 |
| Sc_e_4 | Sp_e_3 | 172.16.16:5:9121 | 172.16.32.4 |

FIG. 18

| | 172.16.32.2 (SERVICE b) : PARENT-SIDE SPAN ||||||
| --- | --- | --- | --- | --- | --- |
| | RECEPTION TIME | TRANSMISSION TIME | USED PORT | COMMUNICATION-SOURCE IP | COMMUNICATION-SOURCE PORT |
| Sp_b_1 | 11338 | 11358 | 9001 | 172.16.32.3 | 42687 |
| Sp_b_2 | 11486 | 11506 | 9001 | 172.16.16.4 | 42987 |
| Sp_b_3 | 11668 | 11688 | 9001 | 172.16.16.2 | 42689 |
| Sp_b_4 | 11898 | 11918 | 9001 | 172.16.32.3 | 42691 |
| Sp_b_5 | 12531 | 12551 | 9001 | 172.16.16.4 | 42991 |
| Sp_b_6 | 12968 | 12988 | 9001 | 172.16.16.2 | 42693 |
| Sp_b_7 | 13278 | 13298 | 9001 | 172.16.32.3 | 42695 |
| Sp_b_8 | 14608 | 14628 | 9001 | 172.16.16.2 | 42697 |

| | 172.16.32.2 (SERVICE b) : CHILD-SIDE SPAN ||||||
| --- | --- | --- | --- | --- | --- |
| | TRANSMISSION TIME | RECEPTION TIME | USED PORT | COMMUNICATION-DESTINATION IP | COMMUNICATION-DESTINATION PORT |
| Sc_b_1 | 11340 | | 51236 | 172.16.32.5 | 9132 |
| Sc_b_2 | 14340 | | 51238 | 172.16.32.5 | 9132 |

153

| 172.16.32.2 (SERVICE b) : PARENT CANDIDATE ||||
| --- | --- | --- | --- |
| CHILD-SIDE SPAN | PARENT CANDIDATE | CHILD-SIDE COMMUNICATION DESTINATION | PARENT-CANDIDATE COMMUNICATION-SOURCE IP |
| Sc_b_1 | Sp_b_1 | 172.16.32.5:9132 | 172.16.32.3 |
| Sc_b_2 | - | 172.16.32.5:9132 | - |

FIG. 19

10.254.212.13 (PROXY p) : PARENT CANDIDATE

| CHILD-SIDE SPAN | PARENT CANDIDATE | CHILD-SIDE COMMUNICATION DESTINATION | PARENT-CANDIDATE COMMUNICATION-SOURCE IP |
|---|---|---|---|
| Sc_p_1 | Sp_p_1 | 172.16.32.3:9030 | CLIENT |
| Sc_p_2 | Sp_p_2, Sp_p_1 | 172.16.32.3:9030 | CLIENT |
| Sc_p_3 | Sp_p_3, Sp_p_2, Sp_p_1 | 172.16.32.3:9030 | CLIENT |
| Sc_p_4 | Sp_p_4 | 172.16.32.3:9030 | CLIENT |
| Sc_p_5 | Sp_p_5, Sp_p_4 | 172.16.32.3:9030 | CLIENT |
| Sc_p_6 | Sp_p_6 | 172.16.32.3:9030 | CLIENT |

⇒

10.254.212.13 (PROXY p) : PARENT-CANDIDATE CLASSIFICATION TOTAL

| CHILD-SIDE COMMUNICATION DESTINATION | CHILD-SIDE FREQUENCY | PARENT-CANDIDATE COMMUNICATION-SOURCE IP | PARENT FREQUENCY |
|---|---|---|---|
| 172.16.32.3:9030 | 3 | CLIENT | 3 |
| 172.16.32.2:9030 | 3 | CLIENT | 3 |

10.254.212.13 (SERVICE a-1) : PARENT CANDIDATE

| CHILD-SIDE SPAN | PARENT CANDIDATE | CHILD-SIDE COMMUNICATION DESTINATION | PARENT-CANDIDATE COMMUNICATION-SOURCE IP |
|---|---|---|---|
| Sc_a1_1 | Sp_a1_1 | 172.16.32.2:9001 | 10.254.212.13 |
| Sc_a1_2 | Sp_a1_2, Sp_a1_1 | 172.16.32.2:9001 | 10.254.212.13 |
| Sc_a1_3 | Sp_a1_3 | 172.16.32.2:9001 | 10.254.212.13 |

⇒

10.254.212.13 (PROXY a-1) : PARENT-CANDIDATE CLASSIFICATION TOTAL

| CHILD-SIDE COMMUNICATION DESTINATION | CHILD-SIDE FREQUENCY | PARENT-CANDIDATE COMMUNICATION-SOURCE IP | PARENT FREQUENCY |
|---|---|---|---|
| 172.16.32.2:9001 | 3 | 10.254.212.13 | 3 |

172.16.16.2 (SERVICE a_2) : PARENT CANDIDATE

| CHILD-SIDE SPAN | PARENT CANDIDATE | CHILD-SIDE COMMUNICATION DESTINATION | PARENT-CANDIDATE COMMUNICATION-SOURCE IP |
|---|---|---|---|
| Sc_a2_1 | Sp_a2_1 | 172.16.32.2:9001 | 10.254.212.13 |
| Sc_a2_2 | Sp_a2_2 | 172.16.32.2:9001 | 10.254.212.13 |
| Sc_a2_3 | Sp_a2_3 | 172.16.32.2:9001 | 10.254.212.13 |

⇒

172.16.16.2 (SERVICE a_2) : PARENT-CANDIDATE CLASSIFICATION TOTAL

| CHILD-SIDE COMMUNICATION DESTINATION | CHILD-SIDE FREQUENCY | PARENT-CANDIDATE COMMUNICATION-SOURCE IP | PARENT FREQUENCY |
|---|---|---|---|
| 172.16.32.2:9001 | 3 | 10.254.212.13 | 3 |

FIG. 21

| 172.16.32.2 (SERVICE b) : PARENT CANDIDATE | | | | 153 |
|---|---|---|---|---|
| CHILD-SIDE SPAN | PARENT CANDIDATE | CHILD-SIDE COMMUNICATION DESTINATION | PARENT-CANDIDATE COMMUNICATION-SOURCE IP | |
| Sc_b_1 | Sp_b_1 | 172.16.32.5:9132 | 172.16.32.3 | |
| Sc_b_2 | – | 172.16.32.5:9132 | – | |

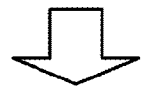

| 172.16.32.2 (SERVICE b) : PARENT CANDIDATE | | | | 154 |
|---|---|---|---|---|
| CHILD-SIDE COMMUNICATION DESTINATION | CHILD-SIDE FREQUENCY | PARENT-CANDIDATE COMMUNICATION-SOURCE IP | PARENT FREQUENCY | |
| 172.16.32.5:9132 | 2 | 172.16.32.3 | 1 | |
| 172.16.32.5:9132 | 2 | – | 1 | |

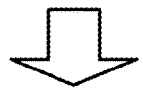

| NO-PARENT COMMUNICATION | |
|---|---|
| TARGET IP | COMMUNICATION DESTINATION |
| 172.16.32.2 | 172.16.32.5:9132 |

FIG. 23

| 172.16.16.4 (SERVICE e) : PARENT-CANDIDATE CLASSIFICATION TOTAL | | | | |
|---|---|---|---|---|
| CHILD-SIDE COMMUNICATION DESTINATION | CHILD-SIDE FREQUENCY | PARENT-CANDIDATE COMMUNICATION-SOURCE IP | PARENT FREQUENCY | PROPORTION |
| 172.16.32.2:9001 | 2 | 172.16.32.4 | 2 | 1.00 |
| 172.16.32.2:9001 | 2 | 172.16.16.3 | 1 | 0.50 |
| 172.16.16.5:9121 | 2 | 172.16.32.4 | 2 | 1.00 |
| 172.16.16.5:9121 | 2 | 172.16.16.3 | 1 | 0.50 |

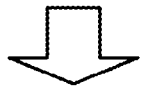

| 172.16.16.4 (SERVICE e) : PARENT-CANDIDATE CLASSIFICATION TOTAL | | | | |
|---|---|---|---|---|
| CHILD-SIDE COMMUNICATION DESTINATION | CHILD-SIDE FREQUENCY | PARENT-CANDIDATE COMMUNICATION-SOURCE IP | PARENT FREQUENCY | PROPORTION |
| 172.16.32.2:9001 | 265 | 172.16.32.4 | 125 | 0.47 |
| 172.16.32.2:9001 | 265 | 172.16.16.3 | 140 | 0.53 |
| 172.16.16.5:9121 | 265 | 172.16.32.4 | 132 | 0.50 |
| 172.16.16.5:9121 | 265 | 172.16.16.3 | 133 | 0.50 |

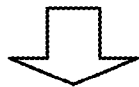

155

| PARENT-CHILD RELATIONSHIP ESTIMATION RESULT | | |
|---|---|---|
| PARENT-SIDE COMMUNICATION-F SOURCE IP | TARGET SERVICE | CHILD-SIDE COMMUNICATION DESTINATION |
| 172.16.32.4 | 172.16.16.4:9021 | 172.16.32.2:9001 |
| 172.16.32.4 | 172.16.16.4:9021 | 172.16.16.5:9121 |
| 172.16.16.3 | 172.16.16.4:9021 | 172.16.32.2:9001 |
| 172.16.16.3 | 172.16.16.4:9021 | 172.16.16.5:9121 |

FIG. 33

| | 10.254.212.13 (PROXY p) : PARENT-SIDE SPAN | | | | |
|---|---|---|---|---|---|
| | RECEPTION TIME | TRANSMISSION TIME | USED PORT | COMMUNICATION-SOURCE IP | COMMUNICATION-SOURCE PORT |
| Sp_p_1 | 11315 | 11415 | 9030 | CLIENT | 60002 |
| Sp_p_2 | 11645 | 11745 | 9030 | CLIENT | 52684 |
| Sp_p_3 | 11875 | 11975 | 9030 | CLIENT | 46955 |
| Sp_p_4 | 12945 | 13045 | 9030 | CLIENT | 56996 |
| Sp_p_5 | 13255 | 13355 | 9030 | CLIENT | 46912 |
| Sp_p_6 | 14585 | 14685 | 9030 | CLIENT | 41236 |

| | 10.254.212.13 (PROXY p) : CHILD-SIDE SPAN | | | | |
|---|---|---|---|---|---|
| | TRANSMISSION TIME | RECEPTION TIME | USED PORT | COMMUNICATION-DESTINATION IP | COMMUNICATION-DESTINATION PORT |
| Sc_p_1 | 11320 | 11410 | 34785 | 172.16.32.3 | 9030 |
| Sc_p_2 | 11650 | 11740 | 34787 | 172.16.16.2 | 9030 |
| Sc_p_3 | 11880 | 11970 | 34789 | 172.16.32.3 | 9030 |
| Sc_p_4 | 12950 | 13040 | 34791 | 172.16.16.2 | 9030 |
| Sc_p_5 | 13260 | 13350 | 34793 | 172.16.32.3 | 9030 |
| Sc_p_6 | 14590 | 14680 | 34795 | 172.16.16.2 | 9030 |

156

| 10.254.212.13 (PROXY p) : CHILD CANDIDATE | | | |
|---|---|---|---|
| PARENT SIDE SPAN | CHILD CANDIDATE | PARENT-SIDE COMMUNICATION-SOURCE IP | CHILD-CANDIDATE COMMUNICATION DESTINATION |
| Sp_p_1 | Sc_p_1, Sc_p_2, Sc_p_3 | CLIENT | 172.16.32.3:9030, 172.16.2:9030 |
| Sp_p_2 | Sc_p_2, Sc_p_3 | CLIENT | 172.16.32.3:9030, 172.16.2:9030 |
| Sp_p_3 | Sc_p_3 | CLIENT | 172.16.32.3:9030 |
| Sp_p_4 | Sc_p_4, Sc_p_5 | CLIENT | 172.16.32.3:9030, 172.16.2:9030 |
| Sp_p_5 | Sc_p_5 | CLIENT | 172.16.32.3:9030 |
| Sp_p_6 | Sc_p_6 | CLIENT | 172.16.32.3:9030 |

FIG. 34

| 172.16.16.4 (SERVICE e) : PARENT-SIDE SPAN | | | | |
|---|---|---|---|---|
| | RECEPTION TIME | TRANSMISSION TIME | USED PORT | COMMUNICATION -SOURCE IP | COMMUNICATION -SOURCE PORT |
| Sp_e_1 | 11348 | 11378 | 9021 | 172.16.32.4 | 52136 |
| Sp_e_2 | 11473 | 11553 | 9021 | 172.16.16.3 | 52138 |
| Sp_e_3 | 12518 | 12598 | 9021 | 172.16.32.4 | 52142 |
| Sp_e_4 | 12538 | 12568 | 9021 | 172.16.16.3 | 52146 |
| Sp_e_5 | 13918 | 13948 | 9021 | 172.16.32.4 | 52148 |

| 172.16.16.4 (SERVICE e) : CHILD-SIDE SPAN | | | | |
|---|---|---|---|---|
| | TRANSMISSION TIME | RECEPTION TIME | USED PORT | COMMUNICATION -DESTINATION IP | COMMUNICATION- DESTINATION PORT |
| Sc_e_1 | 11483 | 11509 | 42987 | 172.16.32.2 | 9001 |
| Sc_e_2 | 11488 | 11544 | 42989 | 172.16.16.5 | 9121 |
| Sc_e_3 | 12528 | 12554 | 42991 | 172.16.32.2 | 9001 |
| Sc_e_4 | 12533 | 12589 | 42993 | 172.16.16.5 | 9121 |

156

| 172.16.16.4 (SERVICE e) : CHILD CANDIDATE | | | |
|---|---|---|---|
| PARENT-SIDE SPAN | CHILD CANDIDATE | PARENT-SIDE COMMUNICATION-SOURCE IP | CHILD-CANDIDATE COMMUNICATION DESTINATION |
| Sp_e_1 | Sc_e_1, Sp_e_2 | 172.16.32.4 | 172.16.32:9001, 172.16.16.5:9121 |
| Sp_e_2 | Sc_e_1, Sp_e_2 | 172.16.32.3 | 172.16.32:9001, 172.16.16.5:9121 |
| Sp_e_3 | Sc_e_3, Sp_e_4 | 172.16.32.4 | 172.16.32:9001, 172.16.16.5:9121 |
| Sp_e_4 | − | 172.16.32.3 | − |
| Sp_e_5 | − | 172.16.32.4 | − |

FIG. 35

| 10.254.212.13 (PROXY p) : CHILD-CANDIDATE ||||
|---|---|---|---|
| PARENT-SIDE SPAN | CHILD CANDIDATE | PARENT-SIDE COMMUNICATION-SOURCE IP | CHILD-CANDIDATE COMMUNICATION DESTINATION |
| Sp_p_1 | Sc_p_1, Sc_p_2, Sc_p_3 | CLIENT | 172.16.32.3:9030, 172.16.2:9030 |
| Sp_p_2 | Sc_p_2, Sc_p_3 | CLIENT | 172.16.32.3:9030, 172.16.2:9030 |
| Sp_p_3 | Sc_p_3 | CLIENT | 172.16.32.3:9030 |
| Sp_p_4 | Sc_p_4, Sc_p_5 | CLIENT | 172.16.32.3:9030, 172.16.2:9030 |
| Sp_p_5 | Sc_p_5 | CLIENT | 172.16.32.3:9030 |
| Sp_p_6 | Sc_p_6 | CLIENT | 172.16.32.3:9030 |

157

| PARENT-CHILD RELATIONSHIP ESTIMATION RESULT |||
|---|---|---|
| PARENT-SIDE COMMUNICATION-SOURCE IP | TARGET SERVICE | CHILD-SIDE COMMUNICATION DESTINATION |
| CLIENT | 10.254.212.13:9030 | 172.16.32.3:9030 |
| CLIENT | 10.254.212.13:9030 | 172.16.32.2:9030 |

| 172.16.16.4 (SERVICE e) : CHILD CANDIDATE ||||
|---|---|---|---|
| PARENT-SIDE SPAN | CHILD CANDIDATE | PARENT-SIDE COMMUNICATION-SOURCE IP | CHILD-CANDIDATE COMMUNICATION DESTINATION |
| Sp_e_1 | Sc_e_1, Sp_e_2 | 172.16.32.4 | 172.16.32:9001, 172.16.16.5:9121 |
| Sp_e_2 | Sc_e_1, Sp_e_2 | 172.16.32.3 | 172.16.32:9001, 172.16.16.5:9121 |
| Sp_e_3 | Sc_e_3, Sp_e_4 | 172.16.32.4 | 172.16.32:9001, 172.16.16.5:9121 |
| Sp_e_4 | – | 172.16.32.3 | – |
| Sp_e_5 | – | 172.16.32.4 | – |

| PARENT-CHILD RELATIONSHIP ESTIMATION RESULT (157) |||
|---|---|---|
| PARENT-SIDE COMMUNICATION-SOURCE IP | TARGET SERVICE | CHILD-SIDE COMMUNICATION DESTINATION |
| 172.16.34.4 | 172.16.16.4:9021 | 172.16.32.2:9001 |
| 172.16.34.4 | 172.16.16.4:9021 | 172.16.16.5:9121 |
| 172.16.34.3 | 172.16.16.4:9021 | 172.16.32.2:9001 |
| 172.16.34.3 | 172.16.16.4:9021 | 172.16.16.5:9121 |

FIG. 37

| 10.254.212.13 (PROXY p) : CHILD CANDIDATE ||||
|---|---|---|---|
| PARENT-SIDE SPAN | CHILD CANDIDATE | PARENT-SIDE COMMUNICATION-SOURCE IP | CHILD-CANDIDATE COMMUNICATION DESTINATION |
| Sp_p_1 | Sc_p_1, Sc_p_2, Sc_p_3 | CLIENT | 172.16.32.3:9030, 172.16.2:9030 |
| Sp_p_2 | Sc_p_2, Sc_p_3 | CLIENT | 172.16.32.3:9030, 172.16.2:9030 |
| Sp_p_3 | Sc_p_3 | CLIENT | 172.16.32.3:9030 |
| Sp_p_4 | Sc_p_4, Sc_p_5 | CLIENT | 172.16.32.3:9030, 172.16.2:9030 |
| Sp_p_5 | Sc_p_5 | CLIENT | 172.16.32.3:9030 |
| Sp_p_6 | Sc_p_6 | CLIENT | 172.16.32.3:9030 |

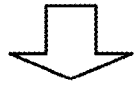

| PARENT-CHILD RELATIONSHIP ESTIMATION RESULT |||
|---|---|---|
| PARENT-SIDE COMMUNICATION-SOURCE IP | TARGET SERVICE | CHILD-SIDE COMMUNICATION DESTINATION |
| CLIENT | 10.254.212.13:9030 | 172.16.32.3:9030 |
| CLIENT | 10.254.212.13:9030 | 172.16.32.2:9030 |

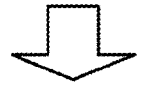

158

| 10.254.212.13 (PROXY p) : CHILD-CANDIDATE CLASSIFICATION TOTAL ||||||
|---|---|---|---|---|---|
| PARENT-SIDE COMMUNICATION-SOURCE IP | PARENT-SIDE FREQUENCY | CHILD-CANDIDATE FREQUENCY | CHILD-CANDIDATE COMMUNICATION DESTINATION IP | CHILD FREQUENCY | SIMULTANEOUS CALLING FREQUENCY |
| CLIENT | 6 | 6 | 172.16.32.3:9030 | 5 | 3 |
| CLIENT | 6 | 6 | 172.16.32.2:9030 | 4 | 3 |

FIG. 38

| 172.16.16.4 (SERVICE e) : CHILD CANDIDATE ||||
|---|---|---|---|
| PARENT-SIDE SPAN | CHILD CANDIDATE | PARENT-SIDE COMMUNICATION-SOURCE IP | CHILD-CANDIDATE COMMUNICATION DESTINATION |
| Sp_e_1 | Sc_e_1, Sp_e_2 | 172.16.32.4 | 172.16.32:9001, 172.16.16.5:9121 |
| Sp_e_2 | Sc_e_1, Sp_e_2 | 172.16.32.3 | 172.16.32:9001, 172.16.16.5:9121 |
| Sp_e_3 | Sc_e_3, Sp_e_4 | 172.16.32.4 | 172.16.32:9001, 172.16.16.5:9121 |
| Sp_e_4 | - | 172.16.32.3 | - |
| Sp_e_5 | - | 172.16.32.4 | - |

| PARENT-CHILD RELATIONSHIP ESTIMATION RESULT |||
|---|---|---|
| PARENT-SIDE COMMUNICATION-SOURCE IP | TARGET SERVICE | CHILD-SIDE COMMUNICATION DESTINATION |
| 172.16.34.4 | 172.16.16.4:9021 | 172.16.32.2:9001 |
| 172.16.34.4 | 172.16.16.4:9021 | 172.16.16.5:9121 |
| 172.16.34.3 | 172.16.16.4:9021 | 172.16.32.2:9001 |
| 172.16.34.3 | 172.16.16.4:9021 | 172.16.16.5:9121 |

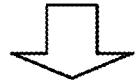

158

| 10.254.212.13 (PROXY p) : CHILD-CANDIDATE CLASSIFICATION TOTAL ||||||
|---|---|---|---|---|---|
| PARENT-SIDE COMMUNICATION-SOURCE IP | PARENT-SIDE FREQUENCY | CHILD-CANDIDATE FREQUENCY | CHILD-CANDIDATE COMMUNICATION DESTINATION IP | CHILD FREQUENCY | SIMULTANEOUS CALLING FREQUENCY |
| 172.16.34.4 | 3 | 2 | 172.16.32.2:9001 | 2 | 2 |
| 172.16.34.4 | 3 | 2 | 172.16.16.5:9121 | 2 | 2 |
| 172.16.34.3 | 2 | 1 | 172.16.32.2:9001 | 1 | 1 |
| 172.16.34.3 | 2 | 1 | 172.16.16.5:9121 | 1 | 1 |

FIG. 40

172.16.16.4 (SERVICE e) : CHILD-CANDIDATE CLASSIFICATION TOTAL

| PARENT-SIDE COMMUNICATION-SOURCE IP | PARENT-SIDE FREQUENCY | CHILD-CANDIDATE FREQUENCY | CHILD-CANDIDATE COMMUNICATION DESTINATION IP | CHILD-SIDE FREQUENCY | SIMULTANEOUS CALLING FREQUENCY |
|---|---|---|---|---|---|
| 172.16.32.4 | 3 | 2 | 172.16.32.2:9001 | 2 | 2 |
| 172.16.32.4 | 3 | 2 | 172.16.32.5:9121 | 2 | 2 |
| 172.16.16.3 | 2 | 1 | 172.16.32.2:9001 | 1 | 1 |
| 172.16.16.3 | 2 | 1 | 172.16.32.5:9121 | 1 | 1 |

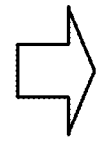

PARENT AND CHILD RELATIONSHIP ESTIMATION RESULT 159

| PARENT-SIDE COMMUNICATION-SOURCE IP | TARGET SERVICE | CHILD-SIDE COMMUNICATION DESTINATION | PARENT FREQUENCY PROPORTION | CHILD-CANDIDATE FREQUENCY PROPORTION | CALLING FREQUENCY PROPORTION | SIMULTANEOUS CALLING FREQUENCY |
|---|---|---|---|---|---|---|
| 172.16.32.4 | 172.16.16.4:9021 | 172.16.32.2:9001 | 0.60 | 0.67 | 1.00 | 1.00 |
| 172.16.32.4 | 172.16.16.4:9021 | 172.16.32.5:9121 | 0.60 | 0.67 | 1.00 | 1.00 |
| 172.16.16.3 | 172.16.16.4:9021 | 172.16.32.2:9001 | 0.40 | 0.50 | 1.00 | 1.00 |
| 172.16.16.3 | 172.16.16.4:9021 | 172.16.32.5:9121 | 0.40 | 0.50 | 1.00 | 1.00 |

FIG. 52

| 172.16.16.4 (SERVICE e) : PARENT-SIDE SPAN ||||||
|---|---|---|---|---|---|
| | RECEPTION TIME | TRANSMISSION TIME | USED PORT | COMMUNICATION -SOURCE IP | COMMUNICATION -SOURCE PORT |
| Sp_e_1 | 11348 | 11378 | 9021 | 172.16.32.4 | 52136 |
| Sp_e_2 | 11473 | 11553 | 9021 | 172.16.16.3 | 52138 |
| Sp_e_3 | 12518 | 12598 | 9021 | 172.16.32.4 | 52142 |
| Sp_e_4 | 12538 | 12568 | 9021 | 172.16.16.3 | 52146 |
| Sp_e_5 | 13918 | 13948 | 9021 | 172.16.32.4 | 52148 |

| 172.16.16.4 (SERVICE e) : CHILD-SIDE SPAN ||||||
|---|---|---|---|---|---|
| | TRANSMISSION TIME | RECEPTION TIME | USED PORT | COMMUNICATION -DESTINATION IP | COMMUNICATION- DESTINATION PORT |
| Sc_e_1 | 11483 | 11509 | 42987 | 172.16.32.2 | 9001 |
| Sc_e_2 | 11488 | 11544 | 42989 | 172.16.16.5 | 9121 |
| Sc_e_3 | 12528 | 12554 | 42991 | 172.16.32.2 | 9001 |
| Sc_e_4 | 12533 | 12589 | 42993 | 172.16.16.5 | 9121 |

| 172.16.16.4 (SERVICE e) : PARENT CANDIDATE ||||
|---|---|---|---|
| CHILD-SIDE SPAN | PARENT-SIDE SPAN | CHILD-SIDE COMMUNICATION DESTINATION | PARENT-CANDIDATE COMMUNICATION-SOURCE IP |
| Sc_e_1 | Sp_e_2 | 172.16.32.2:9001 | 172.16.16.3 |
| Sc_e_2 | - | 176.16.16.5:9121 | - |
| Sc_e_3 | Sp_e_3 | 172.16.32.2:9001 | 172.16.32.4 |
| Sc_e_4 | - | 176.16.16.5:9121 | - |

Nnop:2

FIG. 53

| 172.16.16.4 (SERVICE e) : PARENT-SIDE SPAN | | | | | |
|---|---|---|---|---|---|
| | RECEPTION TIME | TRANSMISSION TIME | USED PORT | COMMUNICATION-SOURCE IP | COMMUNICATION-SOURCE PORT |
| Sp_e_1 | 11348 | 11378 | 9021 | 172.16.32.4 | 52136 |
| Sp_e_2 | 11473 | 11553 | 9021 | 172.16.16.3 | 52138 |
| Sp_e_3 | 12518 | 12598 | 9021 | 172.16.32.4 | 52142 |
| Sp_e_4 | 12538 | 12568 | 9021 | 172.16.16.3 | 52146 |
| Sp_e_5 | 13918 | 13948 | 9021 | 172.16.32.4 | 52148 |

| 172.16.16.4 (SERVICE e) : CHILD-SIDE SPAN | | | | | |
|---|---|---|---|---|---|
| | TRANSMISSION TIME | RECEPTION TIME | USED PORT | COMMUNICATION-DESTINATION IP | COMMUNICATION-DESTINATION PORT |
| Sc_e_1 | 11483 | 11509 | 42987 | 172.16.32.2 | 9001 |
| Sc_e_2 | 11488 | 11544 | 42989 | 172.16.16.5 | 9121 |
| Sc_e_3 | 12528 | 12554 | 42991 | 172.16.32.2 | 9001 |
| Sc_e_4 | 12533 | 12589 | 42993 | 172.16.16.5 | 9121 |

| 172.16.16.4 (SERVICE e) : PARENT CANDIDATE | | | |
|---|---|---|---|
| CHILD-SIDE SPAN | PARENT-SIDE SPAN | CHILD-SIDE COMMUNICATION DESTINATION | PARENT-CANDIDATE COMMUNICATION-SOURCE IP |
| Sc_e_1 | Sp_e_2 | 172.16.32.2:9001 | 172.16.16.3 |
| Sc_e_2 | Sp_e_2 | 176.16.16.5:9121 | 172.16.16.3 |
| Sc_e_3 | Sp_e_3 | 172.16.32.2:9001 | 172.16.32.4 |
| Sc_e_4 | Sp_e_3 | 176.16.16.5:9121 | 172.16.32.4 |

Nnop:0

FIG. 54

| 172.16.16.4 (SERVICE e) : PARENT-SIDE SPAN | | | | | |
|---|---|---|---|---|---|
| | RECEPTION TIME | TRANSMISSION TIME | USED PORT | COMMUNICATION-SOURCE IP | COMMUNICATION-SOURCE PORT |
| Sp_e_1 | 11348 | 11378 | 9021 | 172.16.32.4 | 52136 |
| Sp_e_2 | 11473 | 11553 | 9021 | 172.16.16.3 | 52138 |
| Sp_e_3 | 12518 | 12598 | 9021 | 172.16.32.4 | 52142 |
| Sp_e_4 | 12538 | 12568 | 9021 | 172.16.16.3 | 52146 |
| Sp_e_5 | 13918 | 13948 | 9021 | 172.16.32.4 | 52148 |

| 172.16.16.4 (SERVICE e) : CHILD-SIDE SPAN | | | | | |
|---|---|---|---|---|---|
| | TRANSMISSION TIME | RECEPTION TIME | USED PORT | COMMUNICATION-DESTINATION IP | COMMUNICATION-DESTINATION PORT |
| Sc_e_1 | 11483 | 11509 | 42987 | 172.16.32.2 | 9001 |
| Sc_e_2 | 11488 | 11544 | 42989 | 172.16.16.5 | 9121 |
| Sc_e_3 | 12528 | 12554 | 42991 | 172.16.32.2 | 9001 |
| Sc_e_4 | 12533 | 12589 | 42993 | 172.16.16.5 | 9121 |

| 172.16.16.4 (SERVICE e) : PARENT CANDIDATE | | | |
|---|---|---|---|
| CHILD-SIDE SPAN | PARENT-SIDE SPAN | CHILD-SIDE COMMUNICATION DESTINATION | PARENT-CANDIDATE COMMUNICATION-SOURCE IP |
| Sc_e_1 | Sp_e_2, Sp_e_1 | 172.16.32.2:9001 | 172.16.16.3, 172.16.32.4 |
| Sc_e_2 | Sp_e_2, Sp_e_1 | 176.16.16.5:9121 | 172.16.16.3, 172.16.32.4 |
| Sc_e_3 | Sp_e_3 | 172.16.32.2:9001 | 172.16.32.4 |
| Sc_e_4 | Sp_e_3 | 176.16.16.5:9121 | 172.16.32.4 |

Nnop:0

FIG. 55

| 172.16.16.4 (SERVICE e) : PARENT-SIDE SPAN | | | | | |
|---|---|---|---|---|---|
| | RECEPTION TIME | TRANSMISSION TIME | USED PORT | COMMUNICATION-SOURCE IP | COMMUNICATION-SOURCE PORT |
| Sp_e_1 | 11348 | 11378 | 9021 | 172.16.32.4 | 52136 |
| Sp_e_2 | 11473 | 11553 | 9021 | 172.16.16.3 | 52138 |
| Sp_e_3 | 12518 | 12598 | 9021 | 172.16.32.4 | 52142 |
| Sp_e_4 | 12538 | 12568 | 9021 | 172.16.16.3 | 52146 |
| Sp_e_5 | 13918 | 13948 | 9021 | 172.16.32.4 | 52148 |

| 172.16.16.4 (SERVICE e) : CHILD-SIDE SPAN | | | | | |
|---|---|---|---|---|---|
| | TRANSMISSION TIME | RECEPTION TIME | USED PORT | COMMUNICATION-DESTINATION IP | COMMUNICATION-DESTINATION PORT |
| Sc_e_1 | 11483 | 11509 | 42987 | 172.16.32.2 | 9001 |
| Sc_e_2 | 11488 | 11544 | 42989 | 172.16.16.5 | 9121 |
| Sc_e_3 | 12528 | 12554 | 42991 | 172.16.32.2 | 9001 |
| Sc_e_4 | 12533 | 12589 | 42993 | 172.16.16.5 | 9121 |

| 172.16.16.4 (SERVICE e) : PARENT CANDIDATE | | | |
|---|---|---|---|
| CHILD-SIDE SPAN | PARENT-SIDE SPAN | CHILD-SIDE COMMUNICATION DESTINATION | PARENT-CANDIDATE COMMUNICATION-SOURCE IP |
| Sc_e_1 | Sp_e_2 | 172.16.32.2:9001 | 172.16.16.3 |
| Sc_e_2 | Sp_e_2 | 176.16.16.5:9121 | 172.16.16.3 |
| Sc_e_3 | Sp_e_3 | 172.16.32.2:9001 | 172.16.32.4 |
| Sc_e_4 | Sp_e_3 | 176.16.16.5:9121 | 172.16.32.4 |

Nnop:0

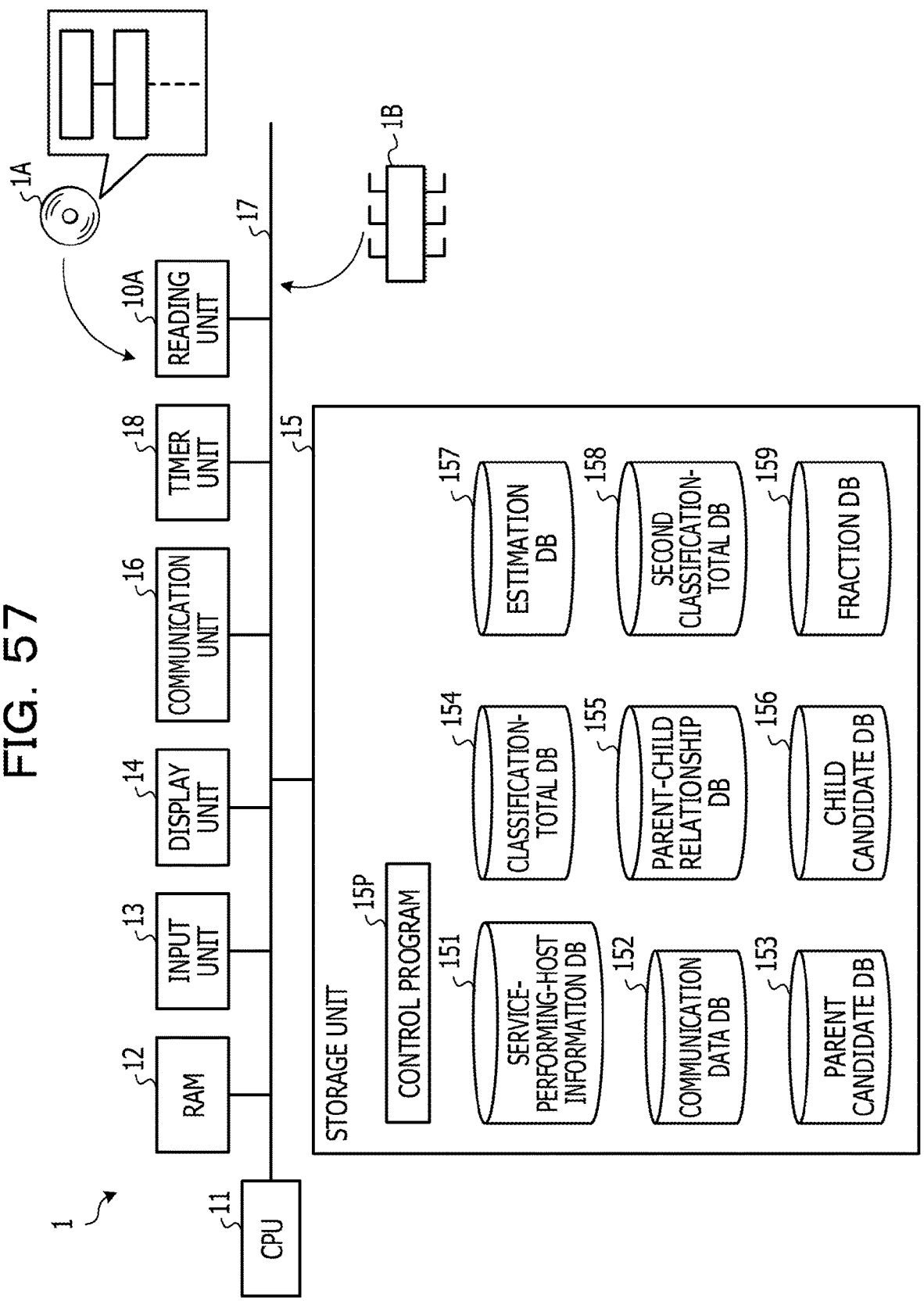

METHOD, DEVICE, AND NON-TRANSITORY COMPUTER-READABLE RECORDING MEDIUM

CROSS-REFERENCE TO RELATED APPLICATION

This application is based upon and claims the benefit of priority of the prior Japanese Patent Application No. 2016-222451, filed on Nov. 15, 2016, the entire contents of which are incorporated herein by reference.

FIELD

The embodiments discussed herein are related to technology for specifying a relationship between services.

BACKGROUND

A visualization device that easily locates a bottleneck in a large-scale distributed processing system is known (see, for example, Japanese Laid-open Patent Publication No. 2013-171541).

SUMMARY

According to an aspect of the invention, a method includes: generating relation information indicating service relationships each indicating that a first service and a source service and a destination service are related each other among a plurality of services when a reception from the source service occurs at the first service and when a transmission to the destination service occurs at the first service and when a time of the reception is within a specific time period before a time of the transmission, determining, for each specified source service and each specified destination service among the plurality of services, whether the first service and the specified source service and the specified destination service have performed a related communication based on a number of service relationships corresponding to a combination of the first service and the specified source service and the specified destination service, the number of service relationships being determined based on the relation information, and outputting information representing the combination of the first service and the specified source service and the specified destination service that are determined to have performed the related communication.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is an explanatory diagram illustrating the layout of records in a service-performing-host information database (DB);

FIG. 11 is an explanatory diagram illustrating the layout of records in a communication data DB;

FIG. 14 is an explanatory diagram illustrating the layout of records in a parent candidate DB;

FIG. 15 is an explanatory diagram illustrating the layout of records in the parent candidate DB for a different service;

FIG. 16 is an explanatory diagram illustrating the layout of records in the parent candidate DB for a different service;

FIG. 17 is an explanatory diagram illustrating the layout of records in the parent candidate DB for a different service;

FIG. 18 is an explanatory diagram illustrating the layout of records in the parent candidate DB for a different service;

FIG. 19 is an explanatory diagram illustrating the layout of records in a classification-total DB;

FIG. 21 is an explanatory diagram illustrating a process executed in a case where a parent candidate is not present;

FIG. 23 is an explanatory diagram illustrating steps of the process for estimating a parent-child relationship;

FIG. 33 is an explanatory diagram illustrating the layout of records in a child candidate DB;

FIG. 34 is an explanatory diagram illustrating the layout of records in the child candidate DB for a different service;

FIG. 35 is an explanatory diagram illustrating the layout of records in an estimation DB;

FIG. 37 is an explanatory diagram illustrating the layout of records in a second classification-total DB;

FIG. 38 is an explanatory diagram illustrating the layout of records in the second classification-total DB for a different service;

FIG. 40 is an explanatory diagram illustrating the layout of records in the proportion DB for a different service;

FIG. 52 is an explanatory diagram illustrating a state before the change of the predetermined time;

FIG. 53 is an explanatory diagram illustrating a state after the change of the predetermined time;

FIG. 54 is an explanatory diagram illustrating a state before the change of the predetermined time;

FIG. 55 is an explanatory diagram illustrating a state after the change of the predetermined time;

FIG. 57 is a block diagram illustrating a hardware group of a server computer according to Embodiment 4.

DESCRIPTION OF EMBODIMENTS

Technologies in the related art have made processes visible only for each step and have not enabled determination of an overall relationship among a plurality of services.

Embodiment 1

Figure 1:
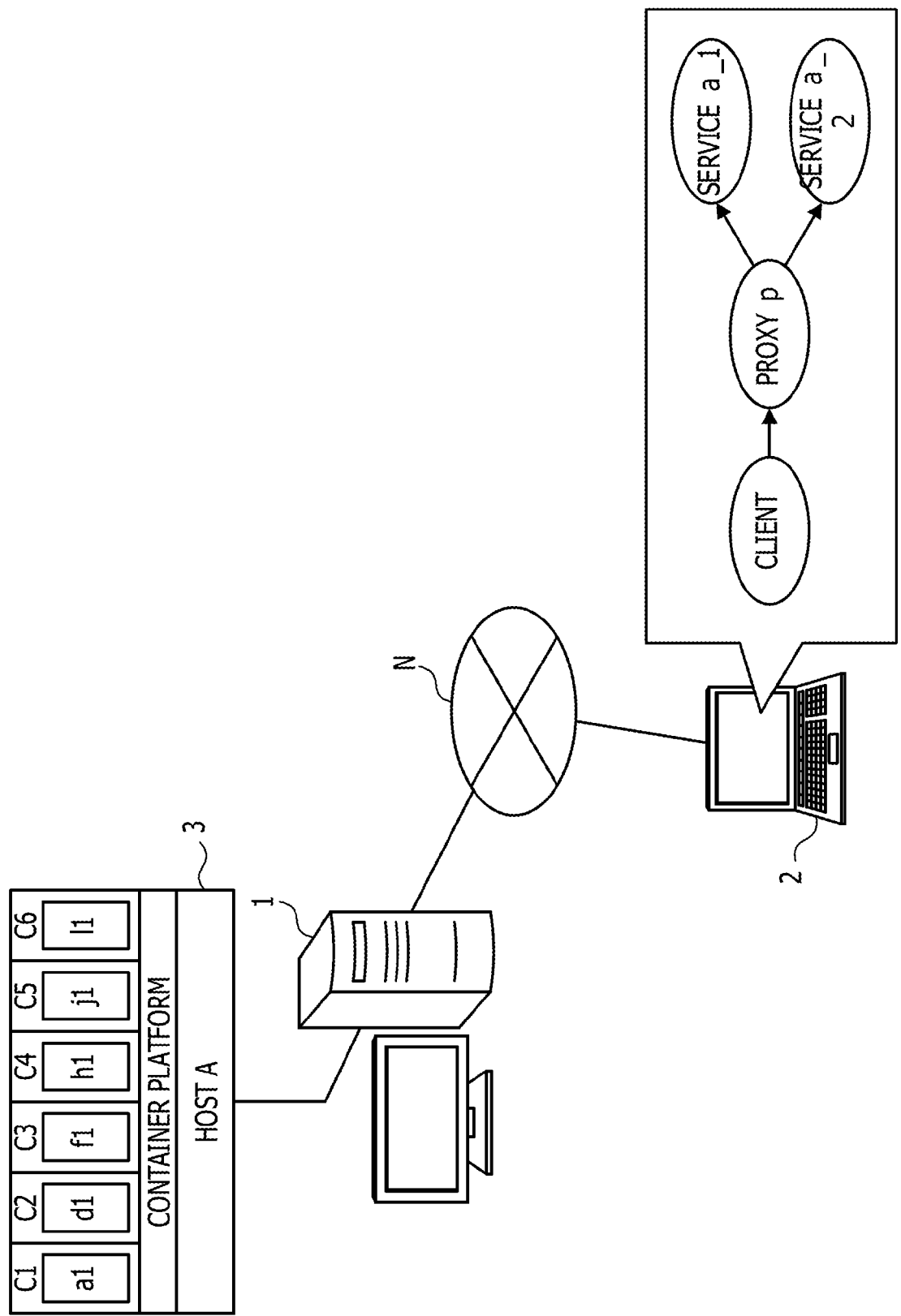
FIG. 1 is an explanatory diagram illustrating an overview of an information processing system.

Hereinafter, an embodiment will be described with reference to the drawings. FIG. 1 is an explanatory diagram illustrating an overview of an information processing system. The information processing system includes an information processing apparatus 1, a host computer 3, a computer 2, and other components. The information processing apparatus 1 is a server computer, a personal computer, or another apparatus. In the following description, a server computer 1 serves as the information processing apparatus 1. The computer 2 is a personal computer, a tablet, a smartphone, a mobile phone, or another apparatus.

Containers C1 to C6 that perform services operate on a container platform in the host computer 3. The containers C1 to C6 execute respective service instances. For example, the container C1 executes an instance a1 of a service a. Note that an example of using the containers C1 to C6 on the container platform is described in this embodiment, but the services may be performed by using virtual machines. In addition, one host computer 3 is illustrated, but a plurality of host computers 3 may be provided.

The host computer 3, the server computer 1, and the computer 2 are connected to each other via a communication network N such as the Internet, a local area network (LAN), or a public network. The server computer 1 acquires communication information on a per-service basis and generates a relational chart representing relationships among the services. The server computer 1 outputs, to the computer 2, data for displaying the generated relational chart. As illustrated in FIG. 1, the relational chart representing the relationships among the services is displayed on a display unit of the computer 2. Hereinafter, details will be described.

Figure 2:
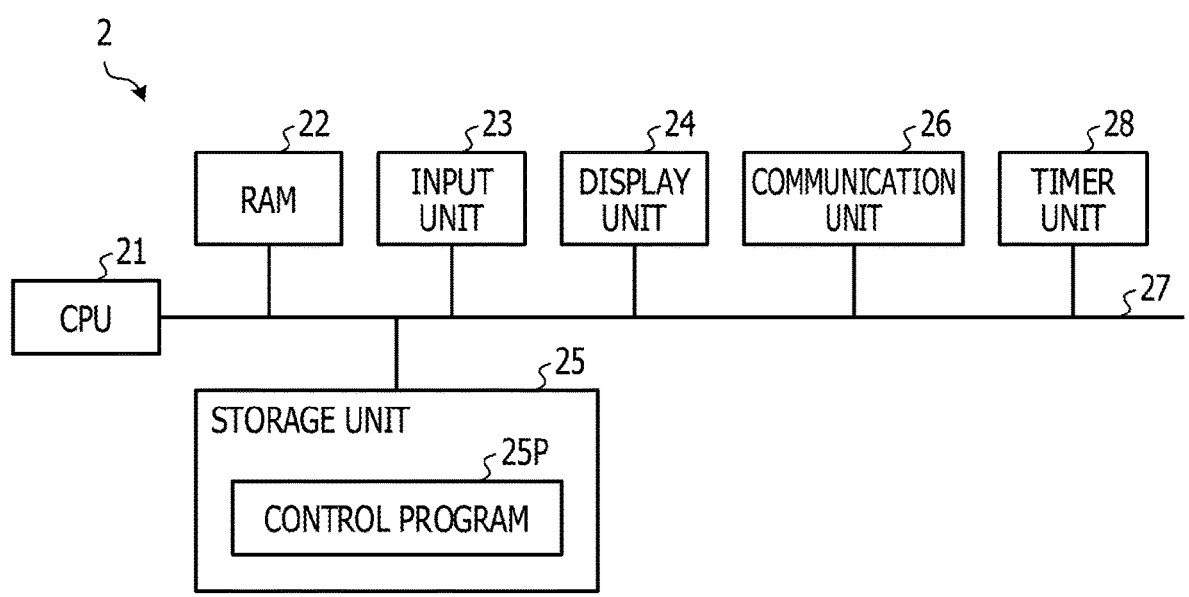
FIG. 2 is a block diagram illustrating the hardware configuration of a computer.

FIG. 2 is a block diagram illustrating the hardware configuration of the computer 2. The computer 2 includes a central processing unit (CPU) 21 serving as a controller unit, and a random access memory (RAM) 22, an input unit 23, a display unit 24, a storage unit 25, a timer unit 28, a communication unit 26, and other components. The CPU 21 is connected to the hardware components via a bus 27. The CPU 21 controls the hardware components in accordance with a control program 25P stored in the storage unit 25. Note that the CPU 21 may be a multicore processor including a plurality of processor cores. The RAM 22 is, for example, a static RAM (SRAM), a dynamic RAM (DRAM), a flash memory, or another memory. The RAM 22 also functions as a storage unit and temporarily stores therein various pieces of data generated when the CPU 21 runs various programs.

The input unit 23 is an input device such as a mouse, a keyboard, a touch panel, or a button and outputs received operation information to the CPU 21. The display unit 24 is a liquid crystal display, an organic electroluminescence (EL) display, or another display and displays various pieces of information in accordance with an instruction from the CPU 21. The communication unit 26 is a communication module and exchanges information with the server computer 1 and other apparatuses. The timer unit 28 outputs date and time information to the CPU 21. The storage unit 25 is a large-capacity memory and stores therein the control program 25P and the like.

Figure 3:
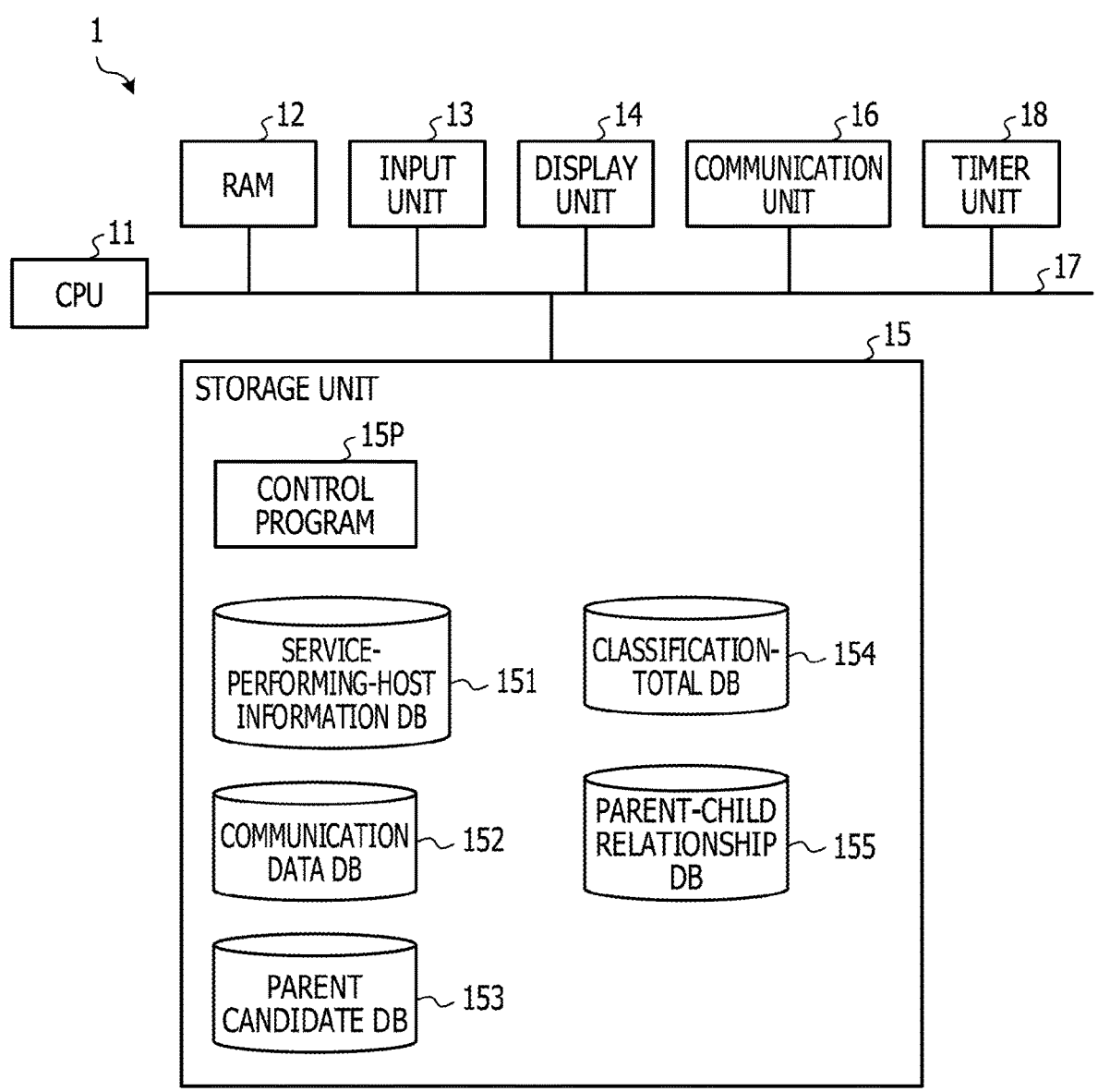
FIG. 3 is a block diagram illustrating the hardware configuration of a server computer.

FIG. 3 is a block diagram illustrating the hardware configuration of the server computer 1. The server computer 1 includes a CPU 11 serving as the controller unit, a RAM 12, an input unit 13, a display unit 14, a storage unit 15, a timer unit 18, a communication unit 16, and other components. The CPU 11 is connected to the hardware components via a bus 17. The CPU 11 controls the hardware components in accordance with a control program 15P stored in the storage unit 15. Note that the CPU 11 may be a multicore processor including a plurality of processor cores. The RAM 12 is, for example, a SRAM, a DRAM, a flash memory, or another memory. The RAM 12 also functions as a storage unit and temporarily stores therein various pieces of data generated when the CPU 11 runs various programs.

The input unit 13 is an input device such as a mouse, a keyboard, a touch panel, or a button and outputs received operation information to the CPU 11. The display unit 14 is a liquid crystal display, an organic EL display, or another display and displays various pieces of information in accordance with an instruction from the CPU 11. The communication unit 16 is a communication module and exchanges information with the computer 2 and other apparatuses. The timer unit 18 outputs date and time information to the CPU 11. The storage unit 15 is a large-capacity memory and stores therein the control program 15P and the like. The storage unit 15 further stores therein a service-performing-host information DB 151, a communication data DB 152, a parent candidate DB 153, a classification-total DB 154, a parent-child relationship DB 155, and the like. Note that an example of storing the parent candidate DB 153 and other databases in the storage unit 15 is described in this embodiment, but the embodiment is not limited to this. These may be stored in a RAM (not illustrated) and a database server.

Figure 4:
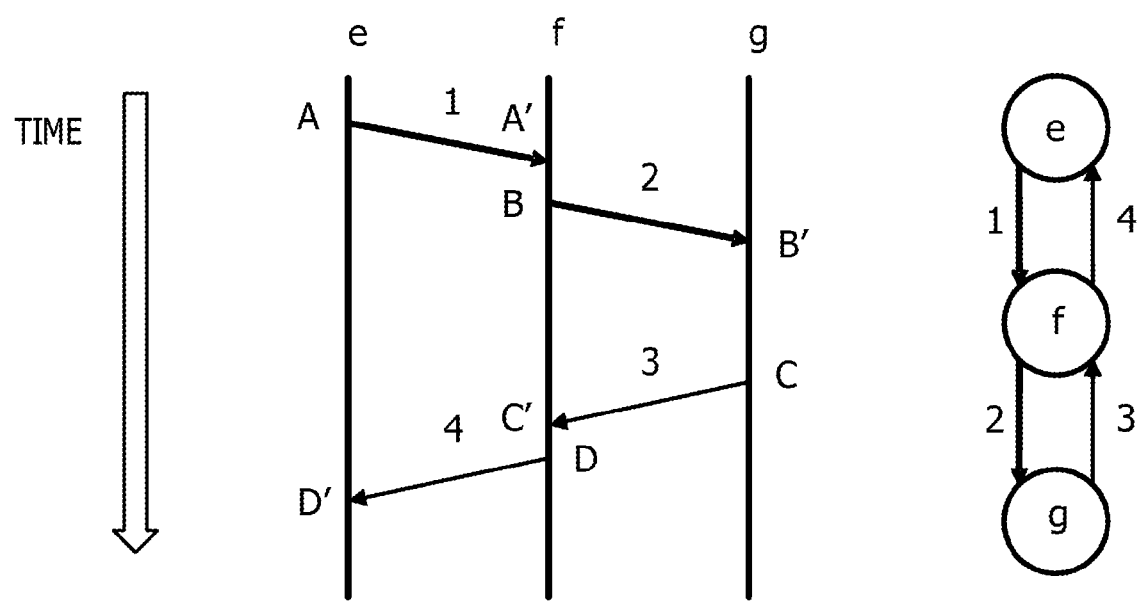
FIG. 4 is an explanatory diagram illustrating an example of synchronous communication.

FIG. 4 is an explanatory diagram illustrating an example of synchronous communication. FIG. 4 illustrates synchronous communication among services e, f, and g. If the service f receives focus, the transmission source of the service f is the service e and the transmission destination of the service f is the service g. In addition, communication includes request communication and response communication performed in response to the request communication. In the example in FIG. 4, a request communication is performed from A to A', and a response communication is performed from D to D'. Note that some services have only request communication and thus do not have response communication. Each service executes a series of processes from the reception of a request to the transmission of a response every time communication is performed. In this embodiment, the series of processes is regarded as one unit and hereinafter is referred to as a span. In the example in FIG. 4, a trapezoid formed by A, A', D, and D' denotes one span. Note that if a response is not present, a period until a request is received is regarded as one span.

With respect to the service f, a service on the transmission source side is the service e, and a service on the transmission destination side is the service g. Hereinafter, the term "transmission source side" is referred to as a parent side, and the term "transmission destination side" is referred to as a child side. A parent-child relationship between micro services denotes a parent-child relationship between spans. For example, the parent of a trapezoid formed by B, B', C, and C' is the trapezoid formed by A, A', D, and D'. The trapezoids have a parent-child relationship. Note that even though the order of processes in micro services is intended to be identified based on the content of communication, only one process is identifiable. Specifically, although the use of the content of communication enables states where communication between a service A and a service B is performed and where communication between the service B and a service C is performed to be identified individually, it is not possible to identify whether the communication between the services B and C is caused by the communication between the services A and B. In this embodiment, the relationship among these services is identified in processes to be described below and is represented by a relational chart. To identify the relationship, it is also conceivable that a trace ID unique to a client is assigned to a request from the client. In this case, the trace ID is taken over to the next communication serially, and the relationship is thereby identifiable. However, it is difficult to change the existing code in the specification to assign the trace ID in many cases.

In FIG. 4, a communication 2 from the service g to the service f is called by a communication 1 from the service e to the service f. These spans (A-A'-D-D' and B-B'-C-C') have a parent-child relationship. A communication 4 occurs after the reception in a communication 3. Since a response is transmitted in the parent span after a response from the child span is received as described above, the communication from the service f to the service g is synchronous communication. If a process result is transmitted back in the service f based on a result of a process of the service g, the service f performs the communication in such a form as described in FIG. 4. In such a service, for example, a page for a product is displayed after the quantity of inventory of the product is inquired.

Figure 5:
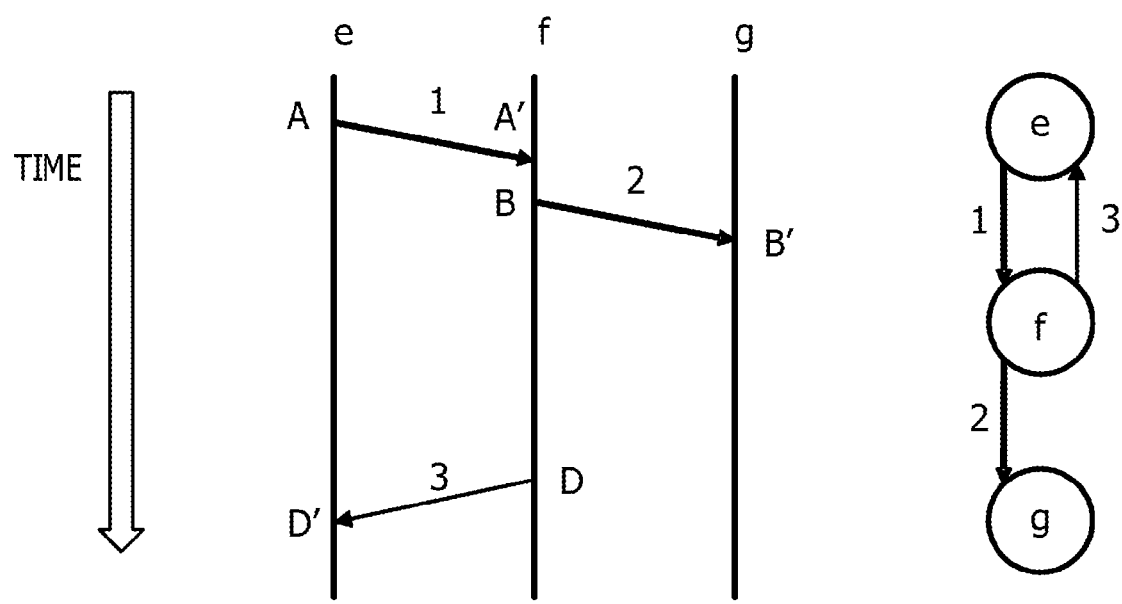
FIG. 5 is an explanatory diagram illustrating an example of asynchronous communication.

FIG. 5 is an explanatory diagram illustrating an example of asynchronous communication. The example illustrated in FIG. 5 illustrates a scenario in which a response is not transmitted back. The communication 2 from the service f to the service g is called by the communication 1 from the service e to the service f. In this case, the span A-A'-D-D' and the span B-B' have a parent-child relationship. The communication 3 occurs after the transmission in the communication 2, and the occurrence time does not depend on the result of the communication 2. In such a case, the communication from the service f to the service g is referred to as asynchronous communication. The service f corresponds to, for example, a service in which certain information is merely transmitted to the service g. In such a service, for example, information regarding process result log is transmitted to a log accumulation service.

Figure 6:
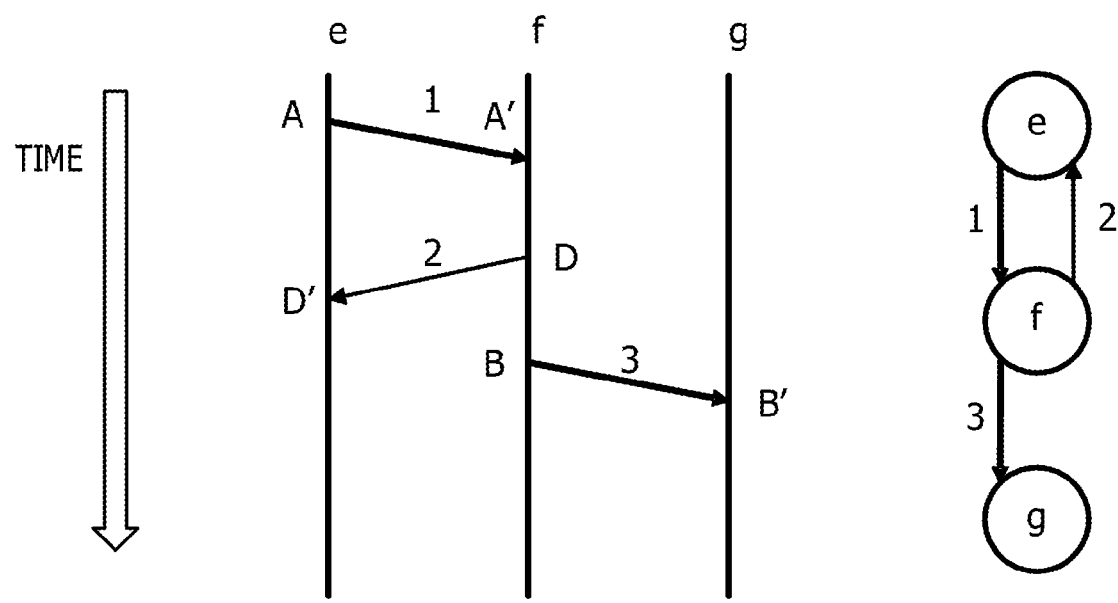
FIG. 6 is an explanatory diagram illustrating an example of the asynchronous communication.

FIG. 6 is an explanatory diagram illustrating an example of the asynchronous communication. The example illustrated in FIG. 6 also illustrates a scenario in which a response is not transmitted back. The communication 3 from the service f to the service g is called by the communication 1 from the service e to the service f. In this case, the span A-A'-D-D' and the span B-B' have a parent-child relationship. Like the example illustrated in FIG. 5, the example illustrated in FIG. 6 illustrates a scenario in which a child span is called later. Since transmission of pieces of log information does not have to be performed in real time, the pieces of information are accumulated in, for example, a communication queue and thereafter transmitted collectively. A variation in which a response is transmitted back from the service g to the service f is also conceivable but is the same as the scenario illustrated in FIG. 6. Accordingly, detailed description is omitted.

Figure 7:
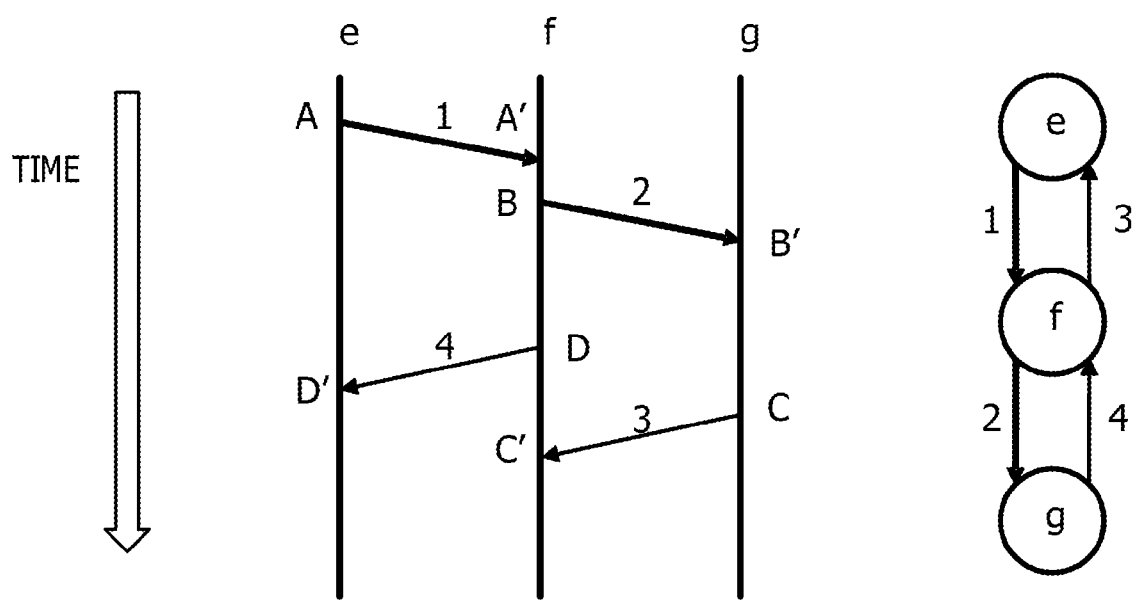
FIG. 7 is an explanatory diagram illustrating an example of the asynchronous communication.

FIG. 7 is an explanatory diagram illustrating an example of the asynchronous communication. The example illustrated in FIG. 7 illustrates a scenario in which a response is transmitted back. The communication 2 from the service f to the service g is called by the communication 1 from the service e to the service f. In this case, the span A-A'-D-D' and the span B-B'-C-C' have a parent-child relationship. The communication illustrated in FIG. 7 is performed in a scenario in which a process completion message or the like is transmitted back later in the communication illustrated in FIG. 5. For example, a case where the service g is a time consuming service such as a large file write process and where completion of the process is notified later is assumed. The destination in the communication 3 is the service f or a different service.

FIG. 8 is an explanatory diagram illustrating the layout of records in a service-performing-host information DB 151. The service-performing-host information DB 151 has a service name field, an internet protocol (IP) address filed, a port number field, and the like. The service name field is used to store service names for identifying various services. The IP address field is used to store IP addresses of the services associated with the service names. The port number field is used to store port numbers each associated with the corresponding service name and the IP address.

Figure 9:
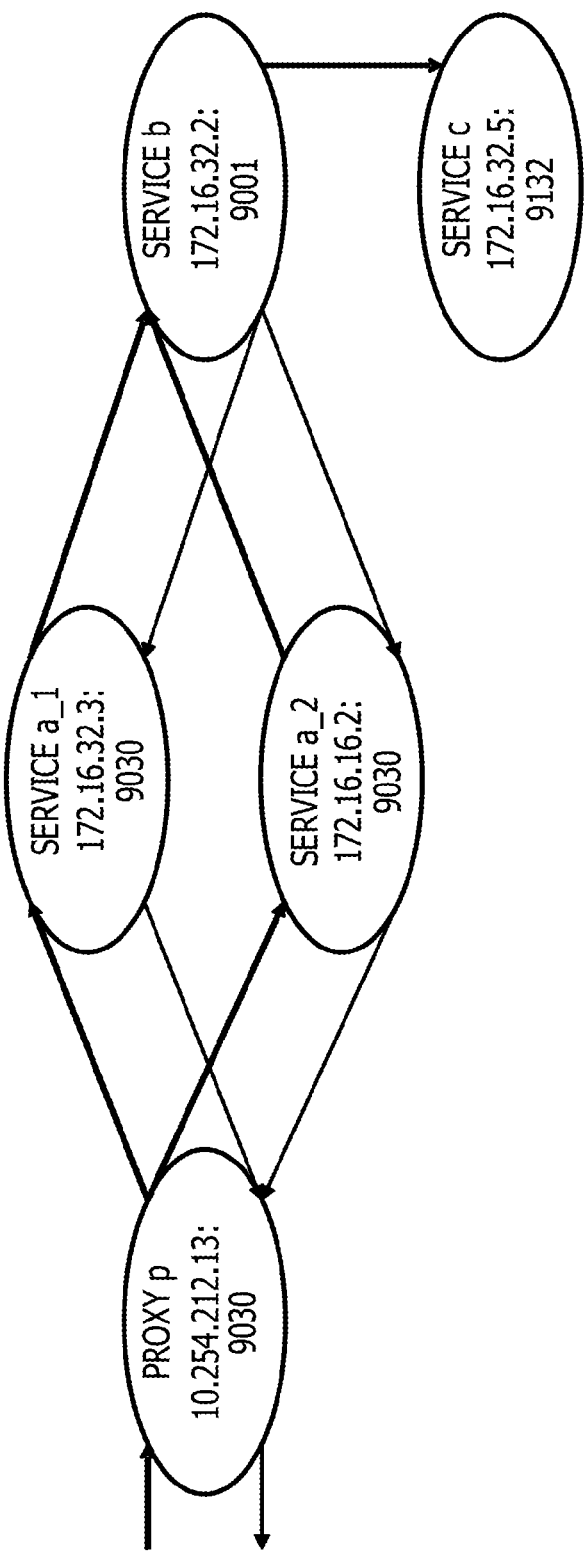
FIG. 9 is an explanatory diagram illustrating an estimation task flow.

FIG. 9 is an explanatory diagram illustrating an estimation task flow. Ellipses illustrated in FIG. 9 denote respective services constituting the task. Thick lines connecting the services denote request messages, and thin lines denote response messages. Each ellipse has a service name, an IP address, and a port number. In the flow illustrated in FIG. 9

(hereinafter, a flow 1), the service a is made dual by a proxy p, and communication with either a service a_1 or a service a_2 is performed with round-robin. The communication from the service a to a service b is synchronous communication. After receiving a response from the service b, the service a transmits back a result all the time. The service b transmits a log to a service c every three seconds in asynchronous communication.

Figure 10:
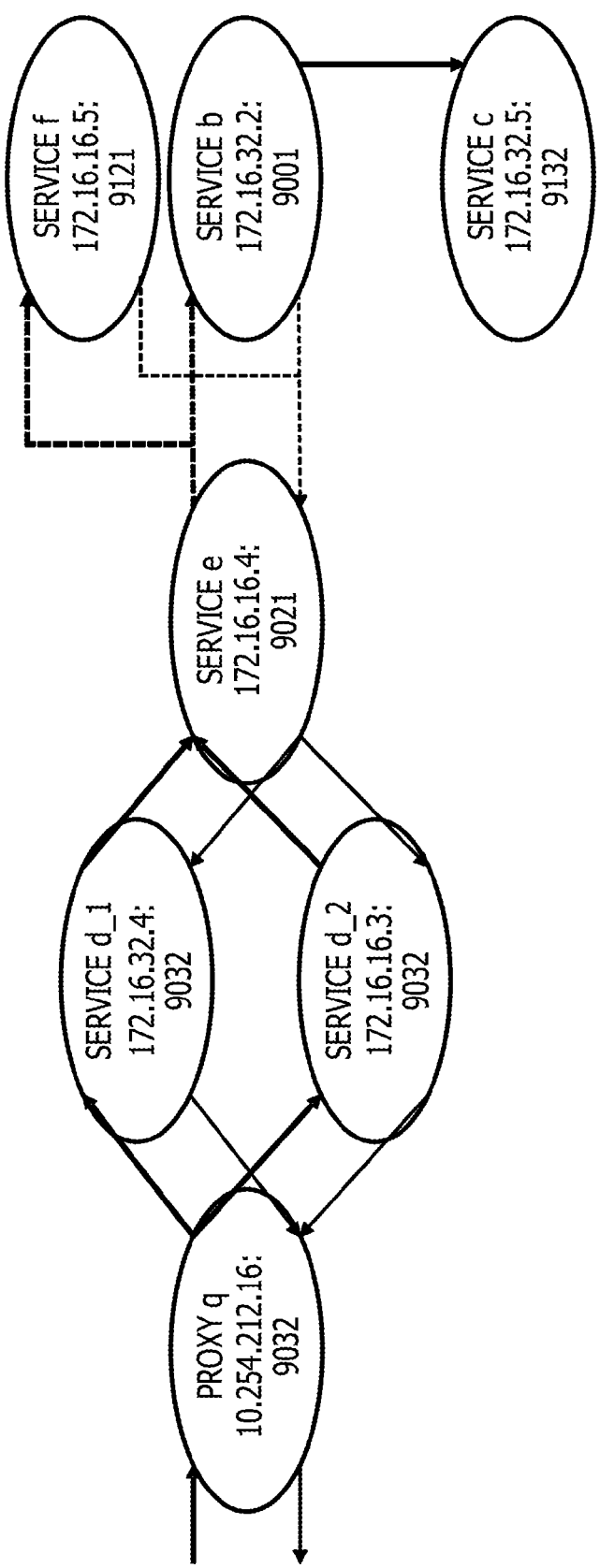
FIG. 10 is an explanatory diagram illustrating an estimation task flow.

FIG. 10 is an explanatory diagram illustrating an estimation task flow. The ellipses illustrated in FIG. 10 denote respective services. Thick lines connecting the services denote request messages, and thin lines denote response messages. Each ellipse has a service name, an IP address, and a port number. Dotted lines denote synchronous communication simultaneously performed based on simultaneous calling for two services. In the flow illustrated in FIG. 10 (hereinafter, referred to as a flow 2), a service d is made dual by a proxy q, and communication with either a service d_1 or a service d_2 is performed with round-robin. The communication from the service d to the service e is synchronous communication. After receiving a response from the service e, the service d transmits back a result all the time. The service e performs the synchronous communication with the service b and the service f simultaneously. Alternatively, in some cases, the service e transmits back a response to the service d without performing the synchronous communication. The service b transmits a log to a service c every three seconds in asynchronous communication. Hereinafter, the estimation processes in the respective flows 1 and 2 will be described.

FIG. 11 is an explanatory diagram illustrating the layout of records in the communication data DB 152. The communication data DB 152 stores therein communication information regarding parent-side spans and communication information regarding child-side spans on a per-service basis. In the example in FIG. 11, communication information regarding parent-side spans and child-side spans of the proxy p is stored. In this embodiment, the communication information includes a reception time, a transmission time, a used port, a communication source IP, and a communication source port on the parent side and a transmission time, a reception time, a used port, a communication destination IP, and a communication destination port on the child side. Although the communication information also includes other pieces of information such as a header and the content of communication data, description of the pieces of information is omitted for easy-to-understand explanation.

For parent-side spans, the communication data DB 152 has a parent-side span ID field, a reception time field, a transmission time field, a used port field, a communication-source IP field, a communication-source port field, and the like. The parent-side span ID field is used to store parent-side span IDs for identifying spans on the parent side. The reception time field is used to store, in association with the parent-side span IDs, times when request signals are received from respective services on the parent side. The transmission time field is used to store, in association with the parent-side span IDs, times when response signals are transmitted to the respective services on the parent side. The used port field is used to store, in association with the parent-side span IDs, ports used by the service in the parent-side spans. The communication-source IP field is used to store, in association with the parent-side span IDs, the IP addresses of the respective services on the parent side. In FIG. 11, the IP addresses of the services on the parent side are each expressed as CLIENT. The communication-source port field is used to store, in association with the parent-side span IDs, the port numbers of the services on the parent side.

For child-side spans, the communication data DB 152 has a child-side span ID field, a transmission time field, a reception time field, a used port field, a communication-destination IP field, a communication-destination port filed, and the like. The child-side span ID field is used to store child-side span IDs for identifying respective spans on the child side. The transmission time field is used to store, in association with the child-side span IDs, times when request signals are transmitted to respective services on the child side. The reception time field is used to store, in association with the child-side span IDs, times when response signals are received from the services on the child side.

The used port field is used to store, in association with the child-side span IDs, ports used by the service in the child-side spans. The communication-destination ID field is used to store, in association with the child-side span IDs, the IP addresses of the services on the child side. The communication-destination port field is used to store, in association with the child-side span IDs, port numbers of the services on the child side.

In Step 1, the CPU 11 acquires pieces of communication information on a per-service basis by using tcpdump for a predetermined period of time and stores the acquired pieces of communication information in the communication data DB 152. The CPU 11 generates a parent-side span ID every time a request signal is received from a transmission source and stores the received communication information in the communication data DB 152. As illustrated for each parent-side span in FIG. 11, a reception time, a transmission time, a used port, an IP address of a communication source, and a port number of the communication source are stored in association with the parent-side span ID. Note that the times are based on a UNIX (registered trademark) time (milliseconds), but only lower five digits are described.

In the example in FIG. 11, access from a client that is a user of a system in the micro service architecture is performed by using a global IP address or a specific IP address for the access. If the CPU 11 determines that an address used for the access is the global IP address or the specific IP address, the CPU 11 determines that communication is performed from the client. In FIG. 11, CLIENT is described in the communication-source IP field.

In Step 1, also for the child-side spans, the CPU 11 likewise acquires pieces of communication information on a per-service basis by using tcpdump for a predetermined period of time. The CPU 11 generates a child-side span ID every time a request signal is transmitted to a transmission destination and stores the received communication information in the communication data DB 152. As illustrated in each child-side span in FIG. 11, a transmission time, a reception time, a used port, an IP address of a communication destination, and a port number of the communication destination are stored in association with the child-side span ID.

Figure 12:
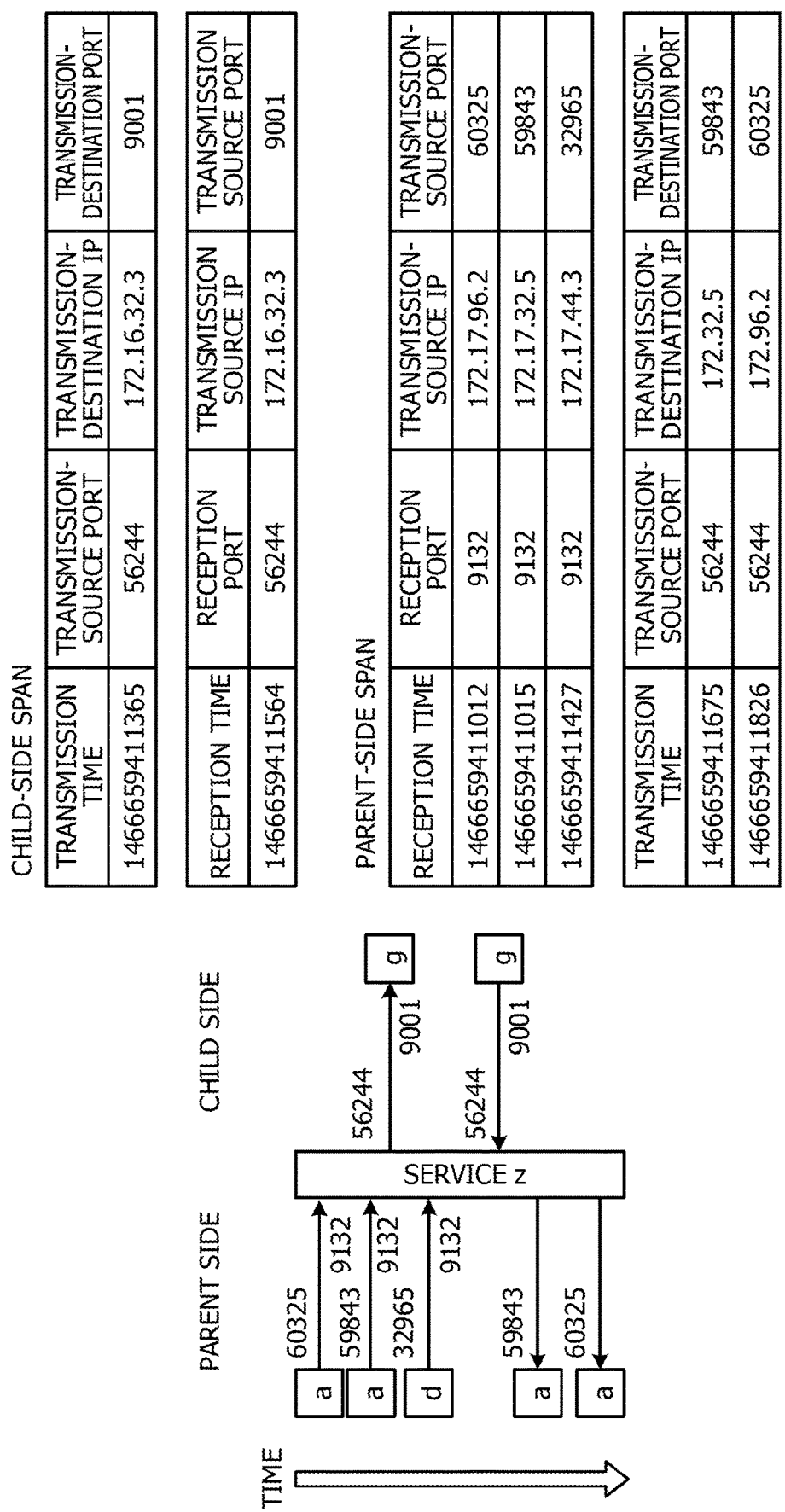
FIG. 12 is an explanatory diagram illustrating the details of a communication information acquisition process.
Figure 13:
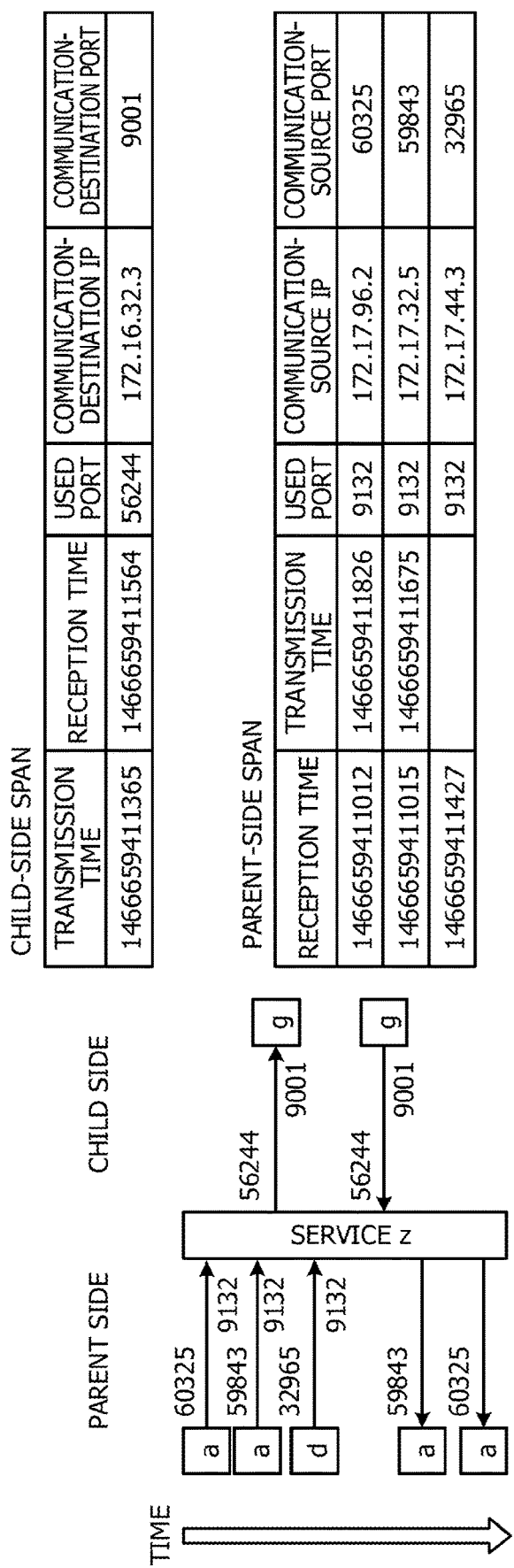
FIG. 13 is an explanatory diagram illustrating the details of the communication information acquisition process.

FIGS. 12 and 13 are explanatory diagrams illustrating the details of a communication information acquisition process. FIG. 12 illustrates a state in which a service z communicates with a plurality of services. An ephemeral port is used as a transmission port. In many Linux (registered trademark) kernels, ports numbered from 32768 to 61000 are used. If a response is transmitted to a specific request, different ports are used every time the request is transmitted, but a port used for transmitting the request is, at any time, the same as a port used for receiving the response to the request.

Since the response to the received request is clearly identified, records in each of the parent-side span and the child-side span in FIG. 12 can be collated as illustrated in FIG. 13 based on the coincidence of the IP addresses and the port numbers in the corresponding parent-side or child-side span. In this embodiment, a relational chart for estimating all of flows is generated based on pieces of communication data acquired from all of related services (all of hosts).

FIG. 14 is an explanatory diagram illustrating the layout of records in the parent candidate DB 153. The parent candidate DB 153 has a child-side span field, a parent candidate field, a child-side communication destination field, a parent-candidate communication-source IP field, and the like for each IP address of the corresponding service. Note that FIG. 14 also illustrates data stored in the communication data DB 152 for easy-to-understand explanation. In Step 2, the CPU 11 extracts one or more parent candidates of each child-side span based on the data stored in the communication data DB 152. Specifically, the CPU 11 extracts, as one or more parent candidates of the child-side span, one or more parent-side spans in which the value of a transmission time Tc_s of the child-side span is larger than the value of a reception time Tp_r of the corresponding parent-side span and in which a time difference between these values is within a predetermined time X (1000 milliseconds in this embodiment) (0<Tc_s−Tp_r≤X). For example, for a transmission time of 11320 in a child span Sc_p_1, the CPU 11 extracts a parent candidate Sp_p_1 having a reception time of 11315.

For a transmission time of 11650 in a child span Sc_p_2, the CPU 11 extracts a parent candidate Sp_p_2 having a reception time of 11645 and a parent candidate Sp_p_1 having a reception time of 11315. The CPU 11 stores the child-side span and the extracted parent candidates in association with an IP address 10.254.212.13 identifying the service. The CPU 11 also stores, in association with the IP address identifying the service and the child-side span ID, the IP address and the port number of the communication destination on the child side and the IP address of the communication source of the parent candidate. In the example in FIG. 14, for the child span Sc_p_1, the CPU 11 stores, in association with the address of the proxy p and the child span Sc_p_1, 172.16.32.3:9030, which is a combination of the communication destination IP address and the communication port on the child side and the communication-source IP address CLIENT of the parent candidate. Note that FIG. 14 is generated based on the task flow illustrated in FIG. 9.

FIG. 15 is an explanatory diagram illustrating the layout of records in the parent candidate DB 153 for a different service. Likewise, the CPU 11 extracts one or more parent candidates within the predetermined time X before the transmission time of the child-side span of the service a_1 (172.16.32.3). The CPU 11 stores, in association with the IP address of the service and the child-side span ID, each extracted parent candidate, the IP address of the corresponding child-side communication destination, and the IP address of the communication source of the parent candidate in the parent candidate DB 153. Note that FIG. 15 is generated based on the task flow illustrated in FIG. 9.

FIG. 16 is an explanatory diagram illustrating the layout of records in the parent candidate DB 153 for a different service. Likewise, the CPU 11 extracts one or more parent candidates within the predetermined time X before the transmission time of the child-side span of the service a_2 (172.16.16.2). The CPU 11 stores, in association with the IP address of the service and the child-side span ID, each extracted parent candidate, the IP address of the corresponding child-side communication destination, and the IP address of the communication source of the parent candidate in the parent candidate DB 153. Note that FIG. 16 is generated based on the task flow illustrated in FIG. 9.

FIG. 17 is an explanatory diagram illustrating the layout of records in the parent candidate DB 153 for a different service. Likewise, the CPU 11 extracts one or more parent candidates within the predetermined time X before the transmission time of the child-side span of the service e (172.16.16.4). The CPU 11 stores, in association with the IP address of the service and the child-side span ID, each extracted parent candidate, the IP address of the corresponding child-side communication destination, and the IP address of the communication source of the parent candidate in the parent candidate DB 153. Note that FIG. 17 is generated based on the task flow illustrated in FIG. 10.

FIG. 18 is an explanatory diagram illustrating the layout of records in the parent candidate DB 153 for a different service. Likewise, the CPU 11 extracts one or more parent candidates within the predetermined time X before the transmission time of the child-side span of the service b (172.16.32.2). The CPU 11 stores, in association with the IP address of the service and the child-side span ID, each extracted parent candidate, the IP address of the corresponding child-side communication destination, and the IP address of the communication source of the parent candidate in the parent candidate DB 153. For a child-side span Sc_b_2, a parent candidate having a reception time within the predetermined time X is not present, and the parent candidate field and the parent-candidate communication-source IP field have no values. Note that FIG. 18 is generated based on the task flow illustrated in FIG. 10.

FIG. 19 is an explanatory diagram illustrating the layout of records in the classification-total DB 154. The classification-total DB 154 has a child-side communication destination field, a child-side frequency field, a parent-candidate communication-source IP field, a parent frequency field, and the like on a per-service basis. Note that FIG. 19 also illustrates the parent candidate DB 153 for easy-to-understand explanation. The child-side communication destination field is used to store child-side communication destinations stored in the parent candidate DB 153. The child-side frequency field is used to store the frequency of the IP address of each child-side communication destination in association with the IP address of the child-side communication destination.

The parent-candidate communication-source IP field is used to store the IP address of each parent-candidate communication source in association with the IP address of the corresponding child-side communication destination. The parent frequency field is used to store, in association with the IP address of the child-side communication destination and the IP address of the parent-candidate communication source, the frequency of a combination of these stored in the parent candidate DB 153. For example, the IP address of the child-side communication destination 172.16.32.3:9030 appears three times, and a combination of the IP address of the child-side communication destination and the IP address of the parent-candidate communication source that is CLIENT appears three times.

In Step 3, the CPU 11 refers to the parent candidate DB 153 and obtains the frequencies of the respective IP addresses of the child-side communication destinations having the above-described transmission time. The CPU 11 stores each count value in the classification-total DB 154 in association with the IP address of the child-side communication destination. The CPU 11 refers to the parent candidate DB 153 and obtains the frequencies of the respective IP addresses of the parent-candidate communication sources extracted in association with the IP address of the child-side communication destination. The CPU 11 stores each count value in association with the IP address of the child-side communication destination and the IP address of the parent-candidate communication source. FIG. 19 illustrates the classification-total DB 154 for the proxy p, the service a_1, and the service a_2.

Figure 20:
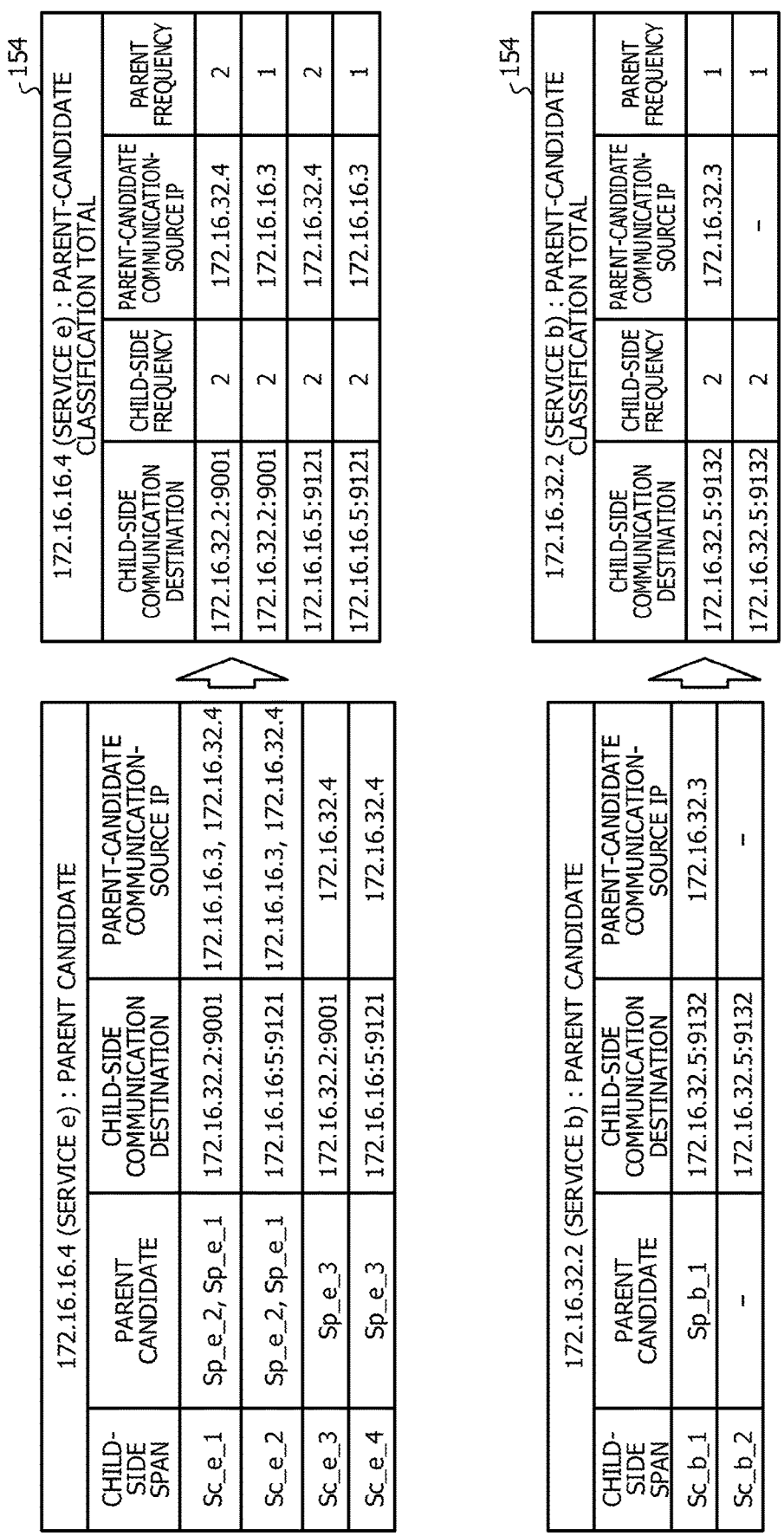
FIG. 20 is an explanatory diagram illustrating the layout of records in the classification-total DB.

FIG. 20 is an explanatory diagram illustrating the layout of records in the classification-total DB 154. FIG. 20 illustrates the classification-total DB 154 for the service e and the service b. In the service e, the frequency of the combination of the IP address of the child-side communication destination 172.16.32.2:9001 and the IP address of the parent-candidate communication source 172.16.32.4 is 2, and thus 2 is stored in the parent frequency field. In contrast, the frequency of the combination of the IP address of the child-side communication destination 172.16.32.5:9132 and the IP address of the parent-candidate communication source 172.16.16.3 is 1, and thus 1 is stored in the parent frequency field.

In the service b, the frequency of the combination of the IP address of the child-side communication destination 172.16.32.5:9132 and the IP address of the parent-candidate communication source 172.16.32.3 is 1, and thus 1 is stored in the parent frequency field. In addition, the frequency of the combination of the IP address of the child-side communication destination 172.16.32.2:9001 and the absence of the IP address of the parent-candidate communication source is 1, and thus 1 is stored in the parent frequency field.

FIG. 21 is an explanatory diagram illustrating a process executed in a case where a parent candidate is not present. In Step 4, the CPU 11 extracts one or more services having no parent candidate (hereinafter, referred to as no-parent communications) and stores the services in the storage unit 15. The service b illustrated in FIG. 21 does not have a parent-candidate communication source having a reception time within the predetermined time before the transmission time of the child-side communication destination 172.16.32.5:9132. The CPU 11 refers to the parent candidate DB 153 or the classification-total DB 154 and stores, in the storage unit 15, no-parent communication information indicating that the IP address of a parent-candidate communication source for the IP address of the child-side communication destination is not present and that a parent candidate (transmission-source address) for the service is not present.

It is assumed that a child-side span occurs in response to a parent-side span. Accordingly, as in the example illustrated in FIG. 21, if a parent candidate in the communication on the child side is not present, the child-side span is considered to have not occurred in response to the parent-side span and is thus excluded from targets for estimating the parent-child relationship. Specifically, since a parent candidate is not likely to be present in communication in the service b 172.16.32.2, it is assumed that a parent is not present in the service b 172.16.32.2, and a parent candidate is not estimated.

Figure 22:
FIG. 22 is an explanatory diagram illustrating steps of a process for estimating a parent-child relationship.

FIG. 22 is an explanatory diagram illustrating steps of a process for estimating a parent-child relationship. In Step 5, the CPU 11 estimates parent-child relationships based on child-side frequencies and parent frequencies stored in the classification-total DB 154. The CPU 11 obtains proportions (division values) by dividing the parent frequencies stored in the classification-total DB 154 by the corresponding child-side frequencies. The CPU 11 extracts a combination of a child-side communication destination and an IP address of the parent-candidate communication source that have the highest value of the proportions. The CPU 11 also extracts one or more combinations of a child-side communication destination and an IP address of the parent-candidate communication source that each has a proportion within a predetermined range from the proportion having the highest value. The predetermined range may be, for example, 20%. Specifically, if a difference between the highest proportion and a proportion receiving focus is within 20%, a combination thereof is also extracted as a parent candidate. Note that 20% is an example, and the predetermined range is not limited to this. For example, a proportion obtained by multiplying the highest proportion by a coefficient (for example, 0.9) may be used as a lower limit of the predetermined range.

The proportions in the example in FIG. 22 are each 1.00. Accordingly, the CPU 11 extracts, as two parent candidates, "172.16.32.3:9030 and CLIENT" and "172.16.16.2:9030 and CLIENT". The CPU 11 stores the extracted IP addresses of the parents and children in the parent-child relationship DB 155 in association with the IP address identifying the service. The parent-child relationship DB 155 has a parent-side communication-source IP field, a target service field, a child-side communication destination field, and the like. The parent-side communication-source IP field is used to store the IP address of each parent-candidate communication source extracted as a candidate. The child-side communication destination field is used to store, in association with the IP address on the parent side, the IP address of each child-side communication destination in the parent-child relationship. The target service field is used to store the IP address and the port number of the service in the parent-child relationship.

FIG. 23 is an explanatory diagram illustrating steps of the process for estimating a parent-child relationship. In this embodiment, a state where a small number of records in the communication log is illustrated for easy-to-understand explanation, but the state of the log is not limited to this. To enhance the estimation accuracy, the classification-total process in Step 3 and the process for estimating a parent-child relationship in Step 5 may be executed after an increase of records in the communication log to some extent. FIG. 23 illustrates an example in which the number of times a classification total is calculated in the middle part of FIG. 23 is increased compared with that in the upper part. The CPU 11 calculates a proportion for each combination of the parent and the child by dividing the parent frequency by the child-side frequency. The CPU 11 extracts a combination having the highest calculated proportion. The CPU 11 stores, in the parent-child relationship DB 155, the parent and child combination having the highest proportion together with the IP address and the port number of the target service. In the example in FIG. 23, the combination of "172.16.32.2:9001 and 172.16.16.3" that has a proportion of 0.53 is considered to have a parent-child relationship and is thus stored.

The CPU 11 extracts one or more proportions within the predetermined range from the highest proportion. In the example in FIG. 23, the proportions of 0.47 and 0.50 are extracted. The CPU 11 considers a combination of "172.16.32.2:9001 and 172.16.32.4" having the proportion of 0.47 to have a parent-child relationship and thus stores the combination in the parent-child relationship DB 155. The CPU 11 also considers each of a combination of "172.16.16.5:9121 and 172.16.32.4" and a combination of "172.16.16.5:9121 and 172.16.16.3" that each have the proportion of 0.50 to have a parent-child relationship and thus stores the combinations in the parent-child relationship DB 155.

In Step 10, the CPU 11 executes a process for connecting components in the flow. Specifically, the CPU 11 refers to the parent-child relationship DB 155 and displays one or more IP address on the parent side, the IP address of a target service, and one or more IP addresses on the child side. The CPU 11 also generates a relational chart indicating relationships among the services to visually recognize the order of the processes in a time series.

Figure 24:
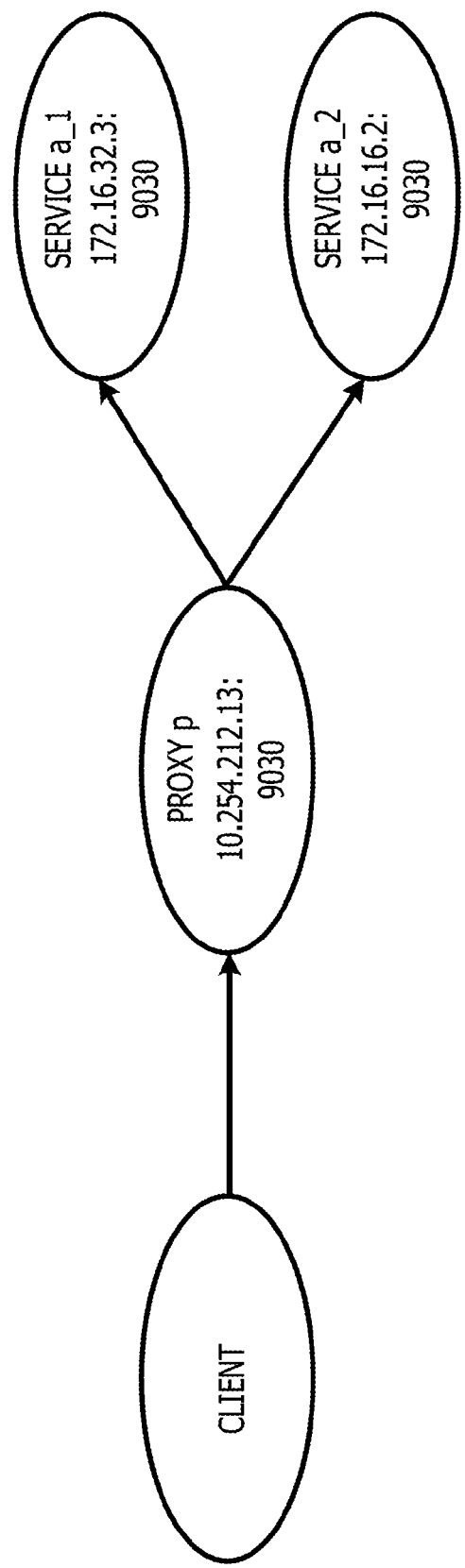
FIG. 24 is a relational chart illustrating relationships among services.

FIG. 24 is a relational chart illustrating relationships among services. The CPU 11 refers to the parent-child relationship DB 155 and the service-performing-host information DB 151 and reads the IP address, the port number, and the service name of a target service in the target service field. The CPU 11 generates a relational chart to collectively recognize the IP address, the port number, and the service name of the target service. Although an example in which the IP address, the port number, and the service name of the target service are displayed in the corresponding ellipse in a hypertext markup language (HTML) to make the service identifiable is illustrated in this embodiment, the way of displaying the service is not limited to this. Services in the relational chart may be made identifiable in such a manner that squares are used, different colors are used for the respective services, or other manners. The format of data for displaying the relational chart is not limited to the HTML. As long as the relational chart can be displayed by using the data, a format such as portable document format (PDF), joint photographic experts group (JPEG), or a bitmap may be used.

The CPU 11 refers to the parent-child relationship DB 155 and generates ellipses having service names and the like on the parent side and the child side. The CPU 11 draws arrows each connecting the parent side to the target service between ellipses for the parent and the child in a time series of the processes. As illustrated in FIG. 24, when two children are present, ellipses for the respective two children are arranged in parallel, and two arrows connecting the parent to the ellipses for the two children are drawn. The example in FIG. 24 illustrates a relational chart representing parent-child relationships between CLIENT and the proxy p, between the proxy p and the service a_1, and between the proxy p and the service a_2. This enables the order of processes between the services to be recognized visually. Note that in this embodiment, the relational chart representing the parent-child relationships among the services arranged from the left to the right in a time series is illustrated, but the relational chart is not limited to this. A relational chart resenting the parent-child relationships among the services arranged from the top to the bottom in a time series may be generated.

Figure 25:
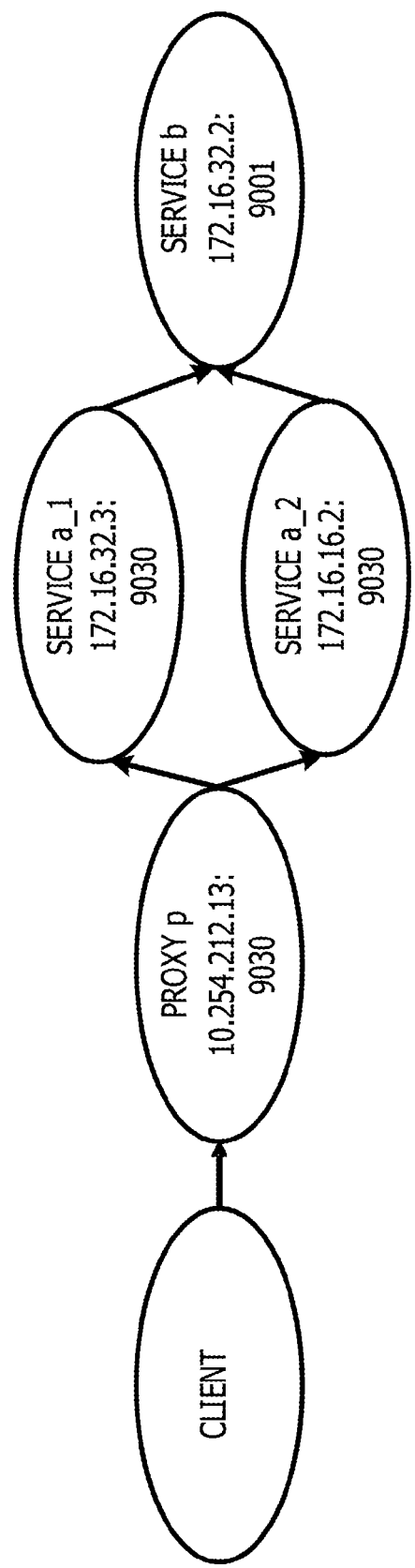
FIG. 25 is a relational chart illustrating relationships among services.

FIG. 25 is a relational chart illustrating relationships among services. The CPU 11 generates a relational chart by executing the same process for a different service. If the CPU 11 has generated a relational chart including the target service and a service on the parent side, the CPU 11 adds a relational chart on the child side. In the example in FIG. 25, the relational chart preceding the services a_1 and a_2 has been generated, and thus a relational chart on the child side for the services a_1 and a_2 is generated. The CPU 11 connects the relational charts and generates a relational chart representing the overall flow. When connecting the relational charts, the CPU 11 reads one or more combinations of relational charts of a parent, a target service, and a child in a time series and serially connects a child in one of the combinations with a child in the next combination. The CPU 11 displays the generated relational chart on the display unit 14. The CPU 11 of the server computer 1 transmits data for displaying the relational chart to the computer 2 via the communication unit 16. The CPU 21 of the computer 2 receives the data for displaying the relational chart via the communication unit 26. The CPU 21 of the computer 2 displays the relational chart based on the received data on the display unit 24.

Figure 26:
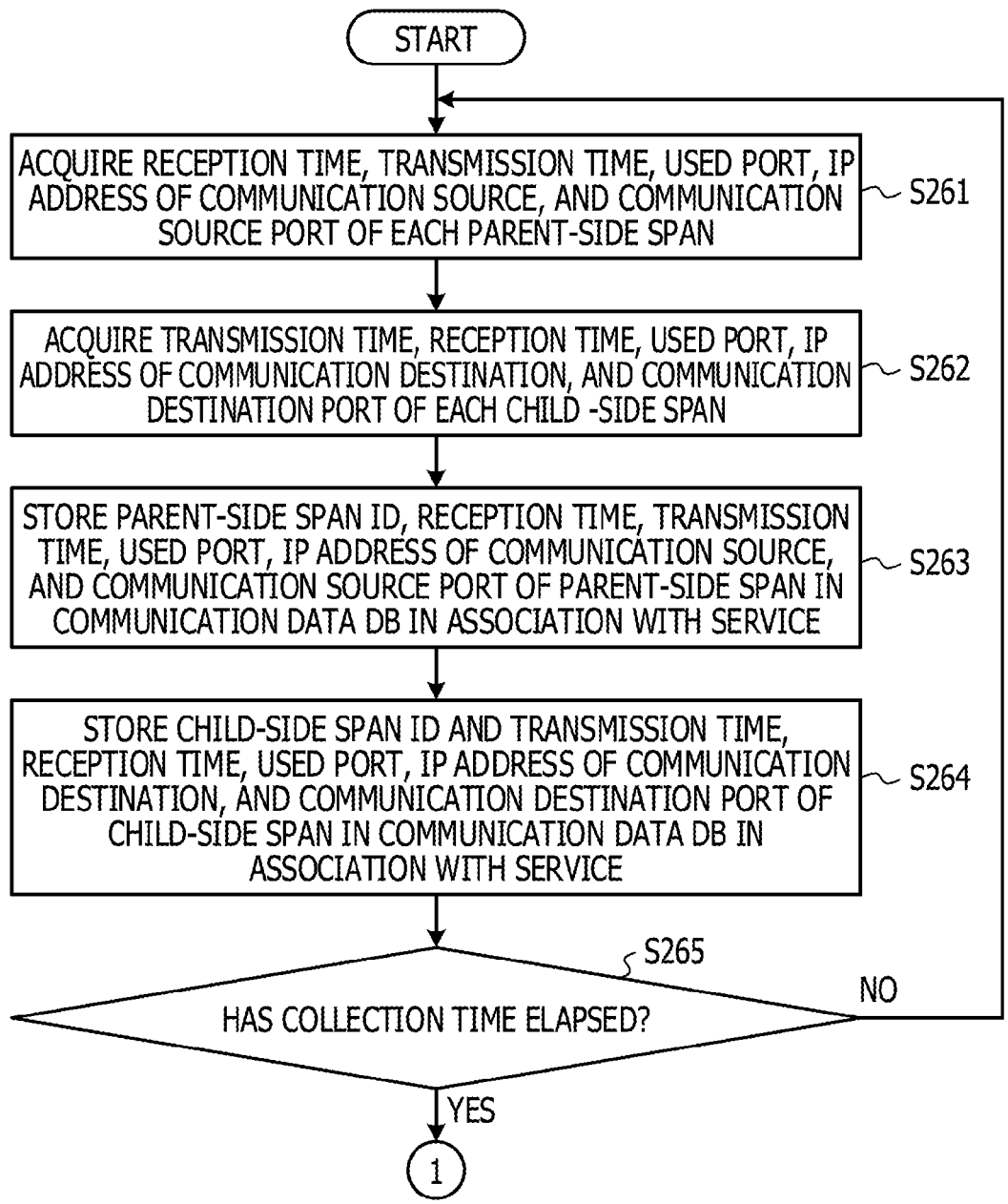
FIG. 26 is a flowchart illustrating steps of a process for extracting a parent candidate.
Figure 27:
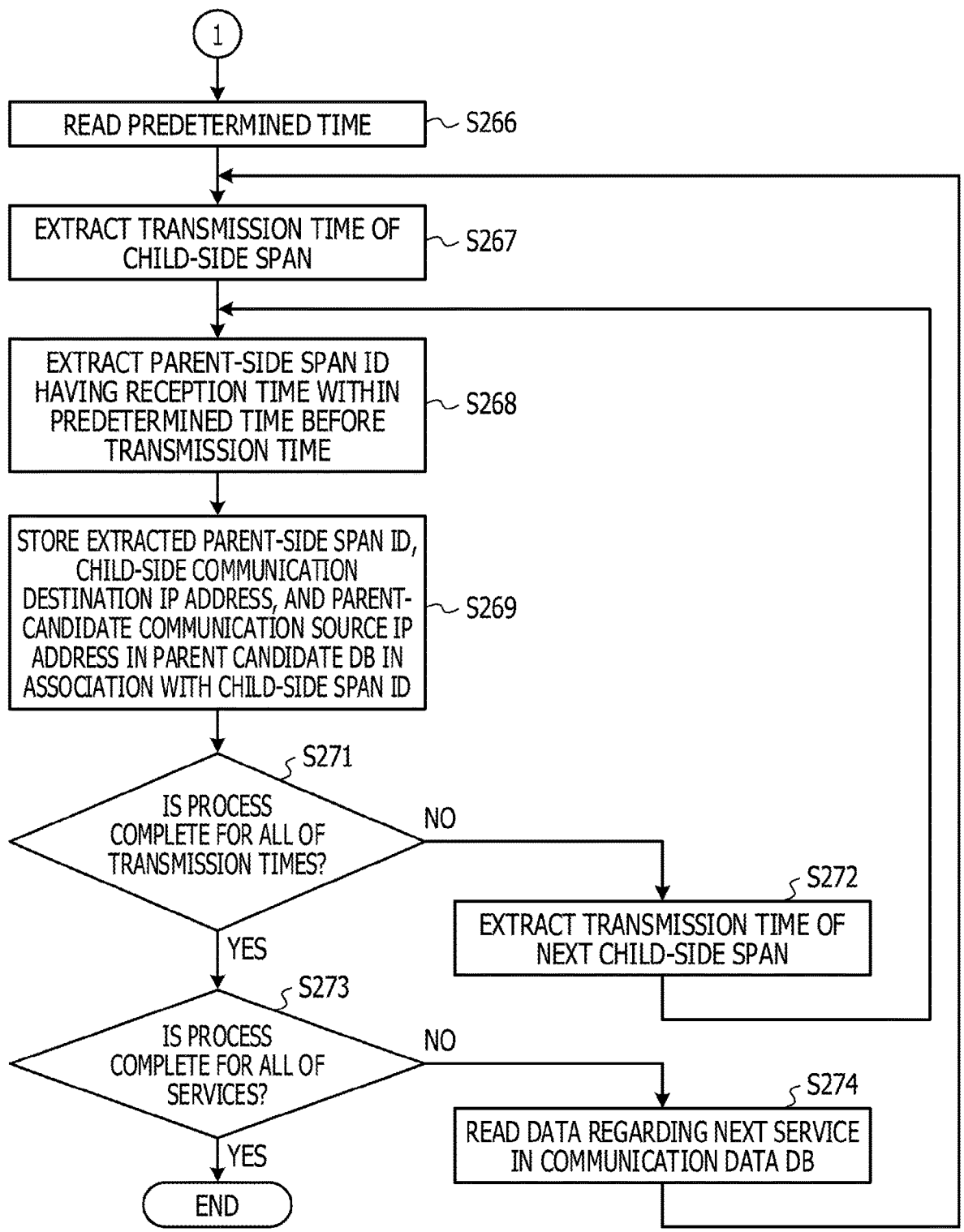
FIG. 27 is a flowchart illustrating steps of the process for extracting a parent candidate.

Processes executed by software in the aforementioned hardware group will be described by using a flowchart. FIGS. 26 and 27 are flowcharts illustrating steps of a process for extracting a parent candidate. The CPU 11 of the server computer 1 executes the following process as Steps 1 and 2. The CPU 11 acquires a reception time, a transmission time, a used port, the IP address of a communication source, and a communication source port of each parent-side span for each service via the communication unit 16 (step S261). The CPU 11 acquires a transmission time, a reception time, a used port, the IP address of a communication destination, and a communication destination port of each child-side span for each service via the communication unit 16 (step S262).

The CPU 11 generates a parent-side span ID every time the CPU 11 receives new communication information on the parent side. The CPU 11 stores the parent-side span ID, a reception time, a transmission time, a used port, the IP address of a communication source, and a communication source port of the parent-side span in the communication data DB 152 in association with the service (step S263). The CPU 11 generates a child-side span ID every time the CPU 11 transmits new communication information on the child side. The CPU 11 stores the child-side span ID, a transmission time, a reception time, a used port, an IP address of a communication destination, and a communication destination port of the child-side span in the communication data DB 152 in association with the service (step S264).

The CPU 11 reads a collection time stored in the storage unit 15. During the collection time, pieces of communication information are collected. The CPU 11 determines whether the collection time has elapsed after the start of communication information collection (step S265). If the CPU 11 determines that the collection time has not elapsed (NO in step S265), the CPU 11 moves the process back to step S261. This enables a certain amount of information regarding a parent candidate to be collected until the collection time elapses. If the CPU 11 determines that the collection time has elapsed (YES in step S265), the CPU 11 moves the process to step S266.

The CPU 11 reads a predetermined time from the storage unit 15 (step S266). Note that appropriate values may be set as the collection time and the predetermined time by using the input unit 13 or the like. The CPU 11 refers to the communication data DB 152 and extracts the transmission time of the child-side span (step S267). The CPU 11 extracts one or more parent-side span IDs having a reception time within the predetermined time before the transmission time (step S268). The CPU 11 stores, in the parent candidate DB 153, each extracted parent-side span ID, the IP address of the corresponding child-side communication destination, and the IP address of the corresponding parent-candidate communication source in association with the child-side span ID (step S269). The CPU 11 determines whether the process is complete for all of the transmission times (step S271).

If the CPU 11 determines that the process is not complete for all of the transmission times (NO in step S271), the CPU 11 moves the process to step S272. The CPU 11 refers to the communication data DB 152 and extracts the transmission time of the next child-side span (step S272). The CPU 11 thereafter moves the process back to step S268. Parent candidates of the transmission times are thereby extracted.

If the CPU 11 determines that the process is complete for all of the transmission times (YES in step S271), the CPU 11 moves the process to step S273. The CPU 11 determines whether the above-described process is complete for all of the services (step S273). If the CPU 11 determines that the process is not complete (NO in step S273), the CPU 11 moves the process to step S274.

The CPU 11 reads data regarding the next service in the communication data DB 152 (step S274). The CPU 11 thereafter moves the process to step S267. Parent candidates of the services are thereby collected. If the CPU 11 determines that the process is complete for all of the services (YES in step S273), the CPU 11 terminates the series of steps.

Figure 28:
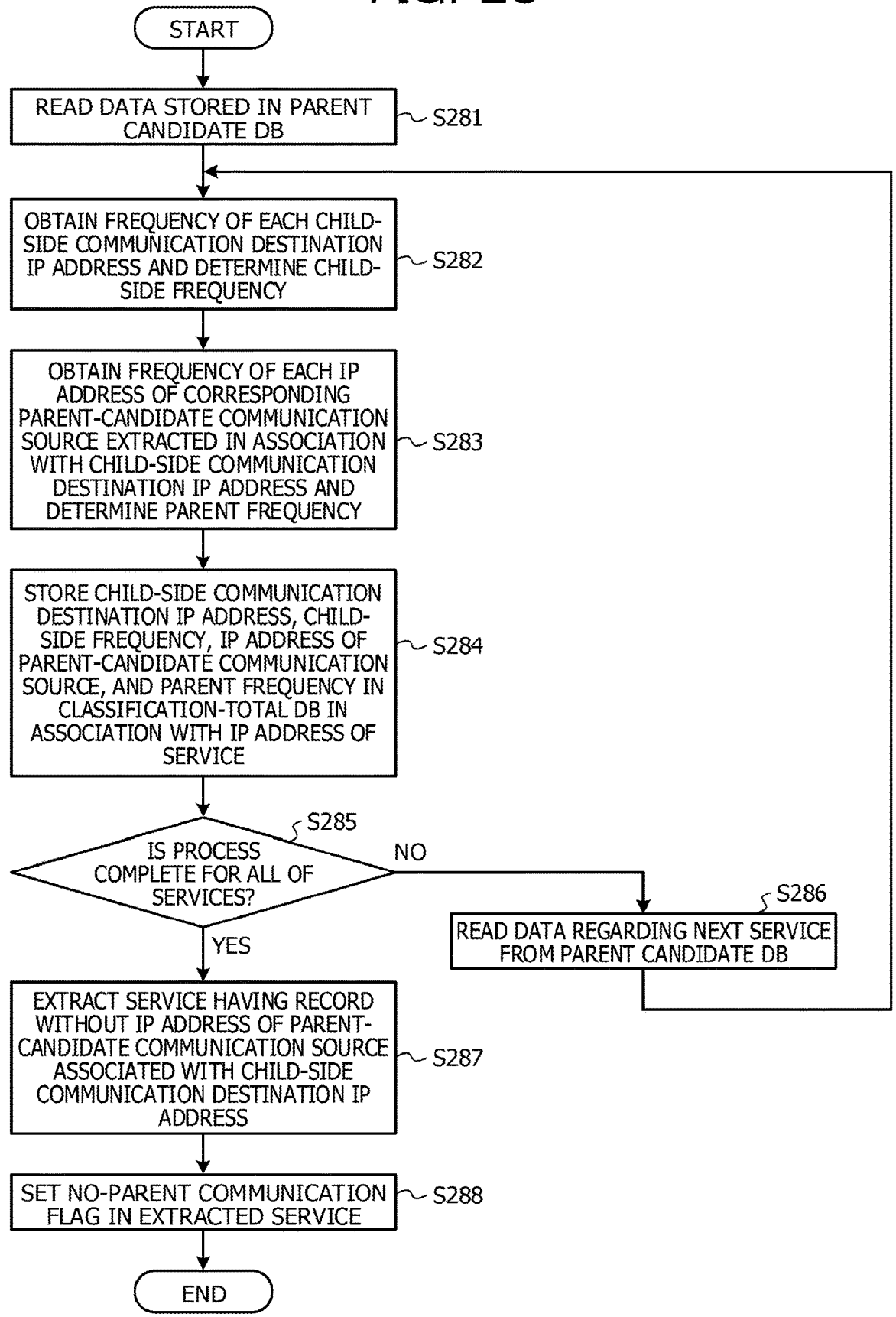
FIG. 28 is a flowchart illustrating steps of a classification-total process.

FIG. 28 is a flowchart illustrating steps of a classification-total process. The CPU 11 executes the following process as the processing in Steps 3 and 4. The CPU 11 reads data regarding a service in the parent candidate DB 153 (step S281). The CPU 11 obtains the frequency of each IP address of the corresponding child-side communication destination and determines the child-side frequency of the IP address of the child-side communication destination (step S282). The CPU 11 refers to the parent candidate DB 153, obtains the frequency of each IP address of the corresponding parent-candidate communication source extracted in association with the IP address of the child-side communication destination, and determines a parent frequency (step S283). The CPU 11 stores, in the classification-total DB 154, the IP address of the child-side communication destination, the child-side frequency, the IP address of the parent-candidate communication source, and the parent frequency in association with the IP address of the service (step S284).

The CPU 11 determines whether the process is complete for all of the services (step S285). If the CPU 11 determines that the process is not complete (NO in step S285), the CPU 11 moves the process to step S286. The CPU 11 reads data regarding the next service having not undergone the process from the parent candidate DB 153 (step S286). The CPU 11 thereafter moves the process to step S282.

If the CPU 11 determines that the process is complete for all of the services (YES in step S285), the CPU 11 moves the process to step S287. The CPU 11 refers to the parent candidate DB 153 or the classification-total DB 154, and extracts a service having a record in which the IP address of the parent-candidate communication source associated with the IP address of the child-side communication destination is not stored (step S287). The CPU 11 sets a no-parent communication flag in the extracted service (step S288).

Figure 29:
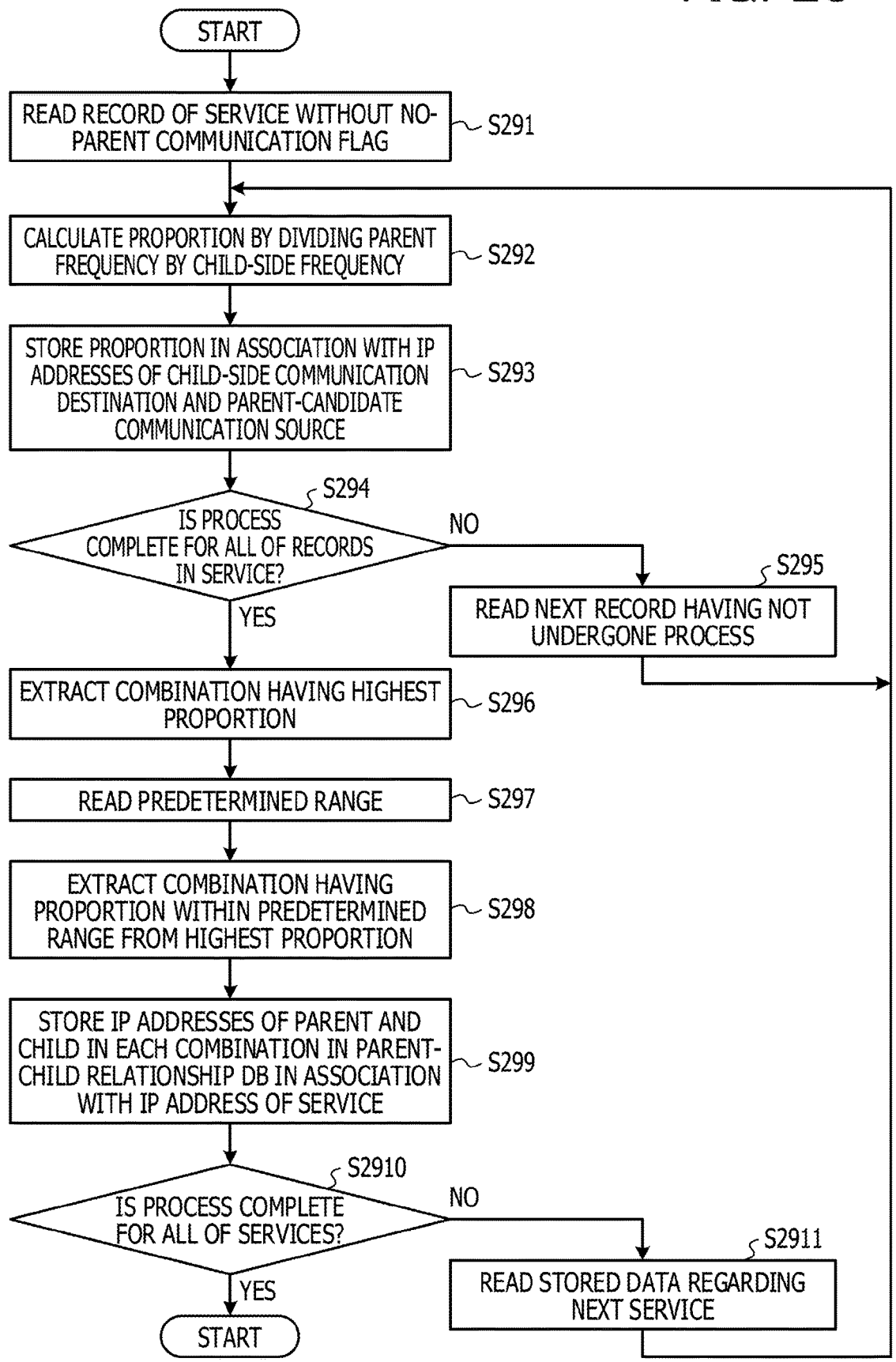
FIG. 29 is a flowchart illustrating steps of a process for estimating a parent-child relationship.

FIG. 29 is a flowchart illustrating steps of the process for estimating a parent-child relationship. The CPU 11 of the server computer 1 executes the following process as the processing in Step 5. The CPU 11 reads, from the classification-total DB 154, data regarding a service in which the no-parent communication flag based on step S288 is not set (step S291). The CPU 11 calculates a proportion by dividing the parent frequency by the child-side frequency (step S292). The CPU 11 stores the proportion in association with the IP address of the child-side communication destination and the IP address of the parent-candidate communication source (hereinafter, referred to as a combination) (step S293).

The CPU 11 determines whether the process is complete for all of records in the service (step S294). If the CPU 11 determines that the process is not complete (NO in step S294), the CPU 11 moves the process to step S295. The CPU 11 reads the next record having not undergone the process (step S295). Thereafter, the CPU 11 moves the process to step S292. The proportion in each record in the service is thereby calculated.

If the CPU 11 determines that the process is complete for all of the records in the service (YES in step S294), the CPU 11 moves the process to step S296. The CPU 11 extracts a combination having the highest proportion (step S296). The CPU 11 reads the predetermined range from the storage unit 15 (step S297). The CPU 11 extracts one or more combinations having a proportion within the predetermined range from the highest proportion (step S298). The CPU 11 stores the IP addresses of the parent and the child in each combination in the parent-child relationship DB 155 in association with the IP address of the service (step S299). A combination outside the predetermined range is considered to not have a parent-child relationship.

The CPU 11 determines whether the process is complete for all of the services (step S2910). If the CPU 11 determines that the process is not complete for all of the services (NO in step S2910), the CPU 11 moves the process to step S2911. The CPU 11 reads data regarding the next service having not undergone the process (step S2911). The CPU 11 thereafter moves the process to step S292. A parent-child relationship between the services is thereby estimated. If the CPU 11 determines that the process is complete for all of the services (YES in step S2910), the CPU 11 terminates the series of steps.

Figure 30:
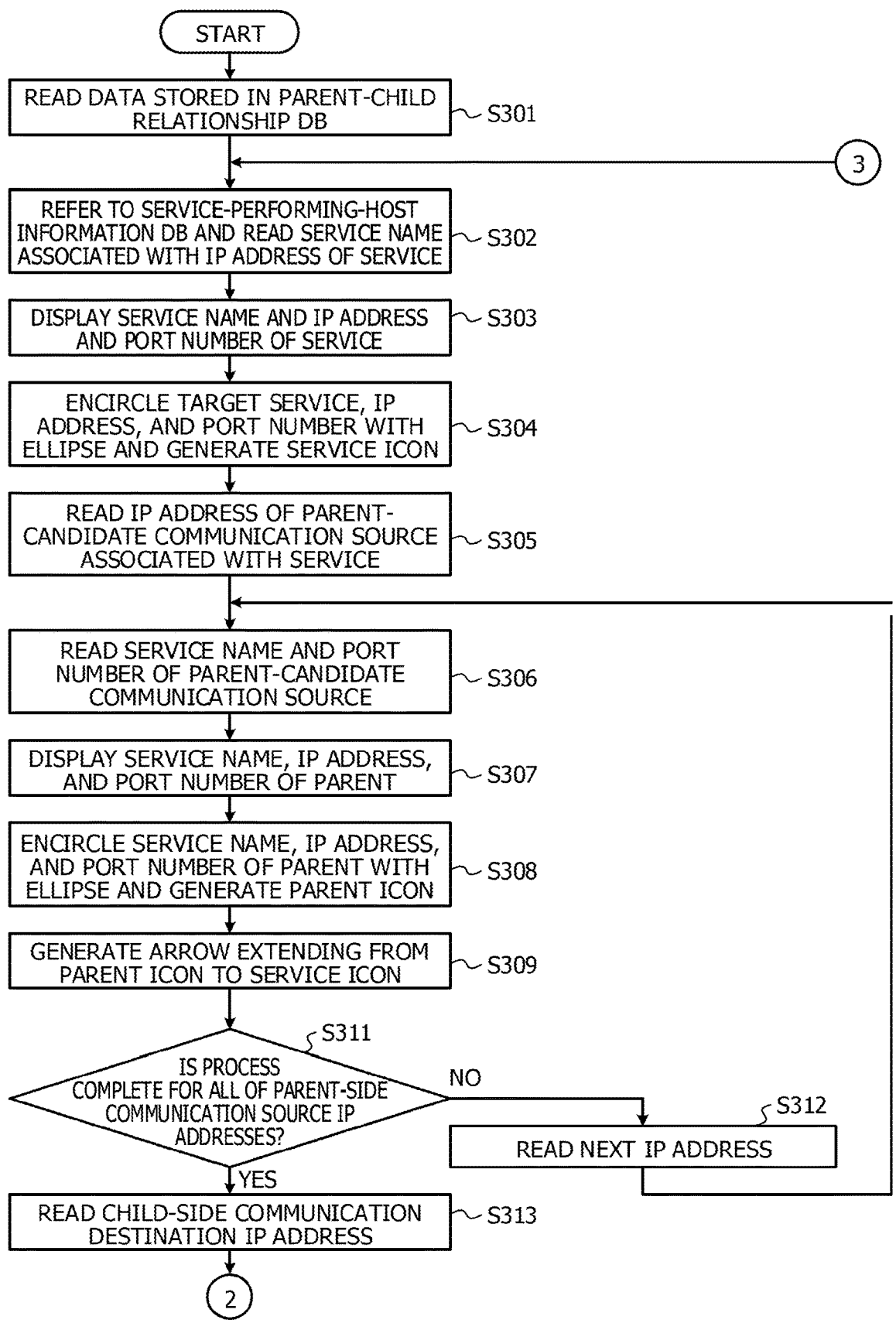
FIG. 30 is a flowchart illustrating a process for generating a relational chart.
Figure 31:
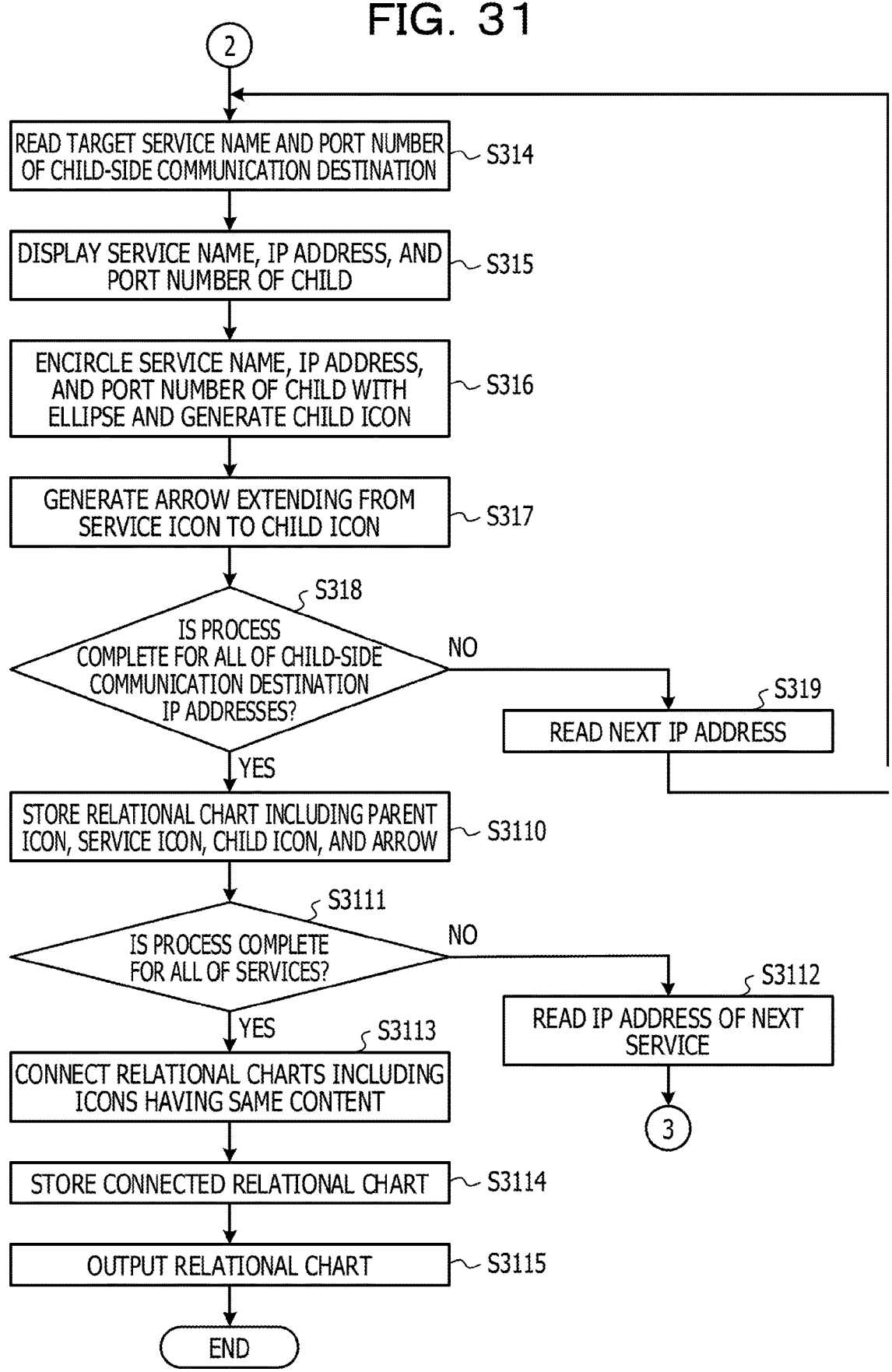
FIG. 31 is a flowchart illustrating the process for generating a relational chart.

FIGS. 30 and 31 are flowcharts illustrating a process for generating a relational chart. The CPU 11 reads the data stored in the parent-child relationship DB 155 (step S301). The CPU 11 refers to the service-performing-host information DB 151 and reads the service name associated with the IP address of the service (step S302). The CPU 11 writes the service name and the IP address and the port number of the service in the HTML file (step S303). The CPU 11 encircles the written target service, the IP address, and the port number with an ellipse and generates a service icon (step S304). Note that data stored in the parent-child relationship DB 155 may be displayed in addition to the icon.

The CPU 11 refers to the parent-child relationship DB 155 and reads the IP address of a parent-candidate communication source associated with the service (step S305). The CPU 11 refers to the service-performing-host information DB 151 and reads the service name and the port number of the parent-candidate communication source associated with the IP address (step S306). The CPU 11 displays the service name, the IP address, and the port number of the parent (step S307). The CPU 11 encircles the service name, the IP address, and the port number of the parent with an ellipse and generates a parent icon (step S308).

The CPU 11 generates an arrow extending from the parent icon to the service icon (step S309). The CPU 11 determines whether the process is complete for all of the IP addresses of the parent-side communication sources (step S311). If the CPU 11 determines that the process is not complete (NO in step S311), the CPU 11 moves the process to step S312. The CPU 11 reads the IP address of the next parent having not undergone the process (step S312). The CPU 11 thereafter moves the process to step S306. When a plurality of parents are present, a plurality of parent icons and arrows are thereby generated.

If the CPU 11 determines that the process is complete (YES in step S311), the CPU 11 moves the process to step S313. The CPU 11 refers to the parent-child relationship DB 155 and reads the IP address of a child-side communication destination (step S313). The CPU 11 refers to the service-performing-host information DB 151 and reads the service name and the port number of the child-side communication destination associated with the IP address (step S314). The CPU 11 displays the service name, the IP address, and the port number of the child (step S315). The CPU 11 encircles the service name, the IP address, and the port number of the child with an ellipse and generates a child icon (step S316). The CPU 11 generates an arrow extending from the service icon to the child icon (step S317).

The CPU 11 determines whether the process is complete for all of the IP addresses of the child-side communication destinations (step S318). If the CPU 11 determines that the process is not complete (NO in step S318), the CPU 11 moves the process to step S319. The CPU 11 reads the IP address of the next child having not undergone the process (step S319). The CPU 11 thereafter moves the process to step S314. When a plurality of children are present, a plurality of child icons and arrows are thereby generated.

If the CPU 11 determines that the process is complete (YES in step S318), the CPU 11 moves the process to step S3110. The CPU 11 stores, in the storage unit 15, a relational chart including the one or more parent icons, the service icon, the one or more child icons, and the arrows (step S3110). The CPU 11 determines whether the process is complete for all of the services (step S3111). If the CPU 11 determines that the process is not complete (NO in step S3111), the CPU 11 moves the process to step S3112.

The CPU 11 refers to the parent-child relationship DB 155 and reads the next IP address having not undergone the process (step S3112). The CPU 11 thereafter moves the process to step S302. A relational chart representing a parent-child relationship between the services is thereby generated. If the CPU 11 determines that the process is complete (YES in step S3111), the CPU 11 moves the process to step S3113. The CPU 11 connects relational charts including icons having the same content (step S3113). Specifically, a child icon in a relational chart and a parent icon in a relational chart subsequent to the relational chart including the child icon in a time series have the same content, the CPU 11 erases one of these icons and connects the relational charts.

The CPU 11 stores the connected relational chart in the storage unit 15 (step S3114). The CPU 11 outputs the stored relational chart to the computer 2 (step S3115). The CPU 21 of the computer 2 displays the relational chart on the display unit 24. Note that in this embodiment, arrows indicating request communication are used in the relational chart, but a process reverse to the above-described process may be executed, and arrows indicating response communication may also be used. The overall relationship among a plurality of services is thereby visually recognized. In addition, setting the predetermined time enables the parent-child relationship to be appropriately estimated. Moreover, appropriately accumulating records in a communication log enables the parent-child relationship to be accurately estimated and further enables communication not having a parent-child relationship to be excluded from the relational chart.

Embodiment 2

Figure 32:
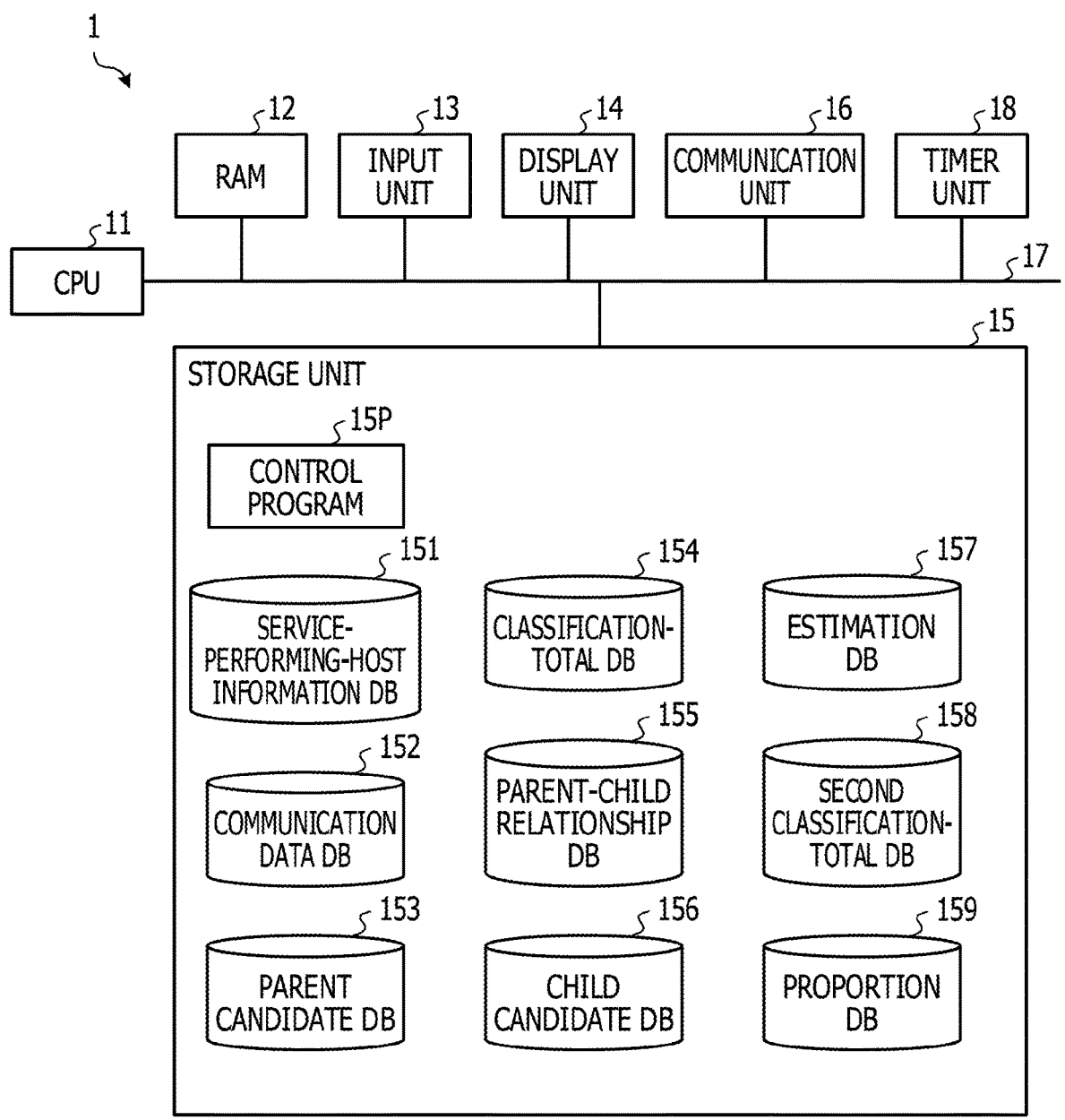
FIG. 32 is a block diagram illustrating a hardware group of a server computer according to Embodiment 2.

Embodiment 2 relates to a form in which the proportion of communication between a parent and a child is added to a relational chart. FIG. 32 is a block diagram illustrating a hardware group of a server computer 1 according to Embodiment 2. The storage unit 15 further includes a child candidate DB 156, an estimation DB 157, a second classification-total DB 158, a proportion DB 159, and the like. FIG. 33 is an explanatory diagram illustrating the layout of records in the child candidate DB 156. Note that data stored in the communication data DB 152 is also illustrated for easy-to-understand explanation.

In Step 6, the CPU 11 executes the following process. The CPU 11 changes the point of reference in Step 2 from the parent side to the child side and extracts one or more child-side spans in which a value of the reception time Tp_r of the parent-side span is smaller than a value of the transmission time Tc_s of the child-side span and in which a difference between these values is within the predetermined time X (1000 milliseconds in the example) (0<Tc_s−Tp_r≤X). For example, in the case of the parent-side span Sp_p_1, the CPU 11 extracts child-side spans Sc_p_1 to Sc_p_3 (11320, 11650, and 11880) having the transmission time Tp_s later than and within 1000 milliseconds from the reception time Tp_r of 11315.

The child candidate DB 156 has a parent-side span field, a child candidate field, a parent-side communication-source IP field, a child-candidate communication destination field, and the like. The CPU 11 executes a process on each parent-side span in the same manner and stores the extracted child-side span IDs in the child candidate field of the child candidate DB 156 in association with the parent-side span ID. The CPU 11 stores, in the parent-side communication-source IP field of the child candidate DB 156 and in association with the parent-side span ID, the IP address of the parent-side communication source associated with the parent-side span ID. The CPU 11 stores, in the child-candidate communication destination field of the child candidate DB 156, each extracted IP address of the communication destination and each port number in association with the parent-side span ID.

FIG. 34 is an explanatory diagram illustrating the layout of records in the child candidate DB 156 for a different service. The example in FIG. 34 illustrates the child candidate DB 156 of the service e. Also for the different service, the CPU 11 likewise refers to the communication data DB 152 and extracts one or more child candidates each having a transmission time within the predetermined time after the reception time of the parent-side span.

FIG. 35 is an explanatory diagram illustrating the layout of records in the estimation DB 157. Note that FIG. 35 also illustrates data stored in the child candidate DB 156 for easy-to-understand explanation. The estimation DB 157 has a parent-side communication-source IP field, a target service field, a child-side communication destination field, and the like. The CPU 11 stores, in the estimation DB 157 and in association with the IP address and the port number of the target service, all of combinations of the IP address of a parent-side communication source and the IP address of a child-candidate communication destination that result from the parent-child relationship estimation.

Figure 36:
FIG. 36 is an explanatory diagram illustrating the layout of records in the estimation DB for a different service.

FIG. 36 is an explanatory diagram illustrating the layout of records in the estimation DB 157 for a different service. Also for the different service, the CPU 11 likewise stores therein the IP address of a parent-side communication source and the IP address of a child-side communication destination in association with the IP address and the port number of the target service. The example in FIG. 36 illustrates a parent-child relationship estimation result for the service e.

FIG. 37 is an explanatory diagram illustrating the layout of records in the second classification-total DB 158. The second classification-total DB 158 has a parent-side communication-source IP field, a parent-side frequency field, a child-candidate frequency field, a child-candidate communication-destination IP field, a child frequency field, a simultaneous calling frequency field, and the like. The CPU 11 stores, in the parent-side communication-source IP field, each IP address of the corresponding parent-side communication source stored in the estimation DB 157 and stores, in the child-candidate communication-destination IP field, the IP address and the port number of the child-candidate communication destination associated with the IP address of the parent-side communication source. The CPU 11 executes a process (described later) as the processing in Step 7, thereby calculates a parent side frequency, a child candidate frequency, a child frequency, and a simultaneous calling frequency, and stores the frequencies in association with the IP address of the parent-side communication source and the IP address and the port number of the corresponding child-candidate communication destination.

FIG. 38 is an explanatory diagram illustrating the layout of records in the second classification-total DB 158 for a different service. The CPU 11 refers to the parent-side communication-source IP field of the child candidate DB 156 and obtains the frequency of each IP address of the corresponding parent-side communication source. In the example in FIG. 37, CLIENT is extracted six times. The CPU 11 stores, in the second classification-total DB 158, the parent side frequencies of 6 and 6 for CLIENT in association with the respective records in the child candidate DB 156. In the example in FIG. 38, the CPU 11 refers to the child candidate DB 156 and determines that the extraction frequency of the IP address of the parent-side communication source 172.16.32.4 to be 3 and the extraction frequency of the IP address 172.16.16.3 to be 2. The CPU 11 stores the parent side frequencies of 3, 3, 2, and 2 in the second classification-total DB 158 in association with the respective records in the child candidate DB 156.

The CPU 11 subsequently calculates a child candidate frequency. The CPU 11 refers to the child candidate DB 156. The CPU 11 counts, for each IP address of the parent-side communication source, the records extracted in association with the IP address of at least one child candidate and thereby obtains a child candidate frequency. In other words, the CPU 11 refers to the child candidate DB 156 and counts the number of times a parent-side span in which a child candidate is not absent appears. In the example in FIG. 37, six records for CLIENT are extracted for each child-candidate communication destination, and thus 6 and 6 are stored in the second classification-total DB 158. In the example in FIG. 38, two records having a parent side address 172.16.32.4 and one record having a parent side address 172.16.16.3 are extracted, and thus child candidate frequencies of 2, 2, 1, and 1 are stored in the second classification-total DB 158 in association with the respective IP addresses.

The CPU 11 subsequently obtains a child frequency. The CPU 11 refers to the child candidate DB 156. The CPU 11 counts, for each IP address of the parent-side communication source, the records extracted in association with the IP address and the port number of the child-candidate communication destination and thereby obtains a child frequency. In the example in FIG. 37, the number of extracted records in which the IP address CLIENT on the parent side and the IP address and the port number on the child side 172.16.32.3:9030 are associated with each other is 5. The number of extracted records in which the IP address CLIENT on the parent side and the IP address and the port number on the child side 172.16.16.2:9030 are associated with each other is 4.

In the example in FIG. 38, the number of extracted records in which the IP address 172.16.32.4 on the parent side and the IP address and the port number on the child side 172.16.32.2:9001 are associated with each other is 2. The number of extracted records in which the IP address 172.16.32.4 on the parent side and the IP address and the port number on the child side 172.16.16.5:9121 are associated with each other is 2. The number of extracted records in which the IP address 172.16.16.3 on the parent side and the IP address and the port number on the child side 172.16.32.2:9001 are associated with each other is 1. The number of extracted records in which the IP address 172.16.16.3 on the parent side and the IP address and the port number on the child side 172.16.16.5:9121 are associated with each other is 1.

The CPU 11 subsequently obtains a simultaneous calling frequency. The CPU 11 refers to the child candidate DB 156 and reads all of the IP addresses on the child side extracted in association with each IP address on the parent side. The CPU 11 then obtains a simultaneous calling frequency of extracting all of the IP addresses on the child side in association with the IP address on the parent side when extracting the IP addresses. In the example in FIG. 37, the IP addresses 172.16.32.3:9030 and 172.16.2:9030 on the child side are simultaneously extracted in association with CLIENT three times, and the simultaneous calling frequency is 3. The CPU 11 stores each of the simultaneous calling frequencies of 3 and 3 in the second classification-total DB 158 in association with the corresponding IP address on the parent side and the corresponding IP address on the child side.

In the example in FIG. 38, the frequency at which the IP addresses 172.16.32.2:9001 and 172.16.16.5.9121 on the child side are simultaneously called in association with the IP address 172.16.32.4 on the parent side is 2. The frequency at which the IP address 172.16.32.2:9001 and 172.16.16.5:9121 on the child side are simultaneously called in association with the IP address 172.16.16.3 on the parent side is 1. The CPU 11 stores, in the second classification-total DB 158, a simultaneous calling frequency of 2 regarding a combination of the IP address 172.16.32.4 on the parent side and the IP address 172.16.32.2:9001 on the child side.

Figure 39:
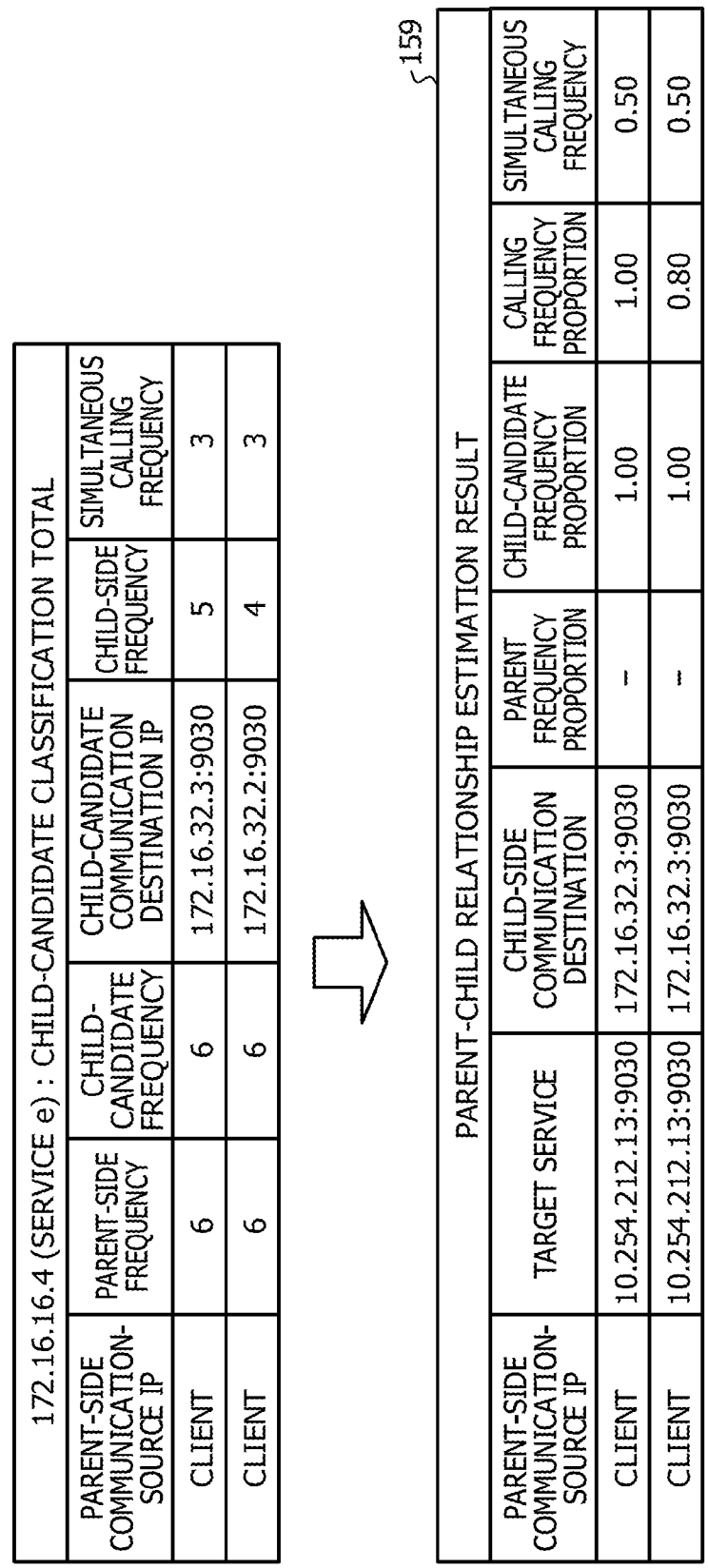
FIG. 39 is an explanatory diagram illustrating the layout of records in a proportion DB.

FIG. 39 is an explanatory diagram illustrating the layout of records in the proportion DB 159. FIG. 40 is an explanatory diagram illustrating the layout of records in the proportion DB 159 for a different service. In Step 8, the CPU 11 calculates a parent frequency proportion, a child-candidate frequency proportion, a calling frequency proportion, and a simultaneous calling proportion. Note that FIG. 39 also illustrates data stored in the second classification-total DB 158 for easy-to-understand explanation. The CPU 11 refers to the second classification-total DB 158 and calculates a frequency proportion of each of the IP addresses of the parent-side communication sources. Specifically, the CPU 11 refers to the second classification-total DB 158 and obtains a parent-side frequency total that is a total of the parent side frequencies of respective IP addresses on the parent side. The CPU 11 subsequently calculates a parent frequency proportion by dividing the parent side frequency of each IP address on the parent side by the parent-side frequency total.

The CPU 11 stores the calculated parent frequency proportion in association with the IP address on the parent side, the IP address of the target service, and the IP address and the port number on the child side. Since only one IP address on the parent side is present in the example in FIG. 39, the parent frequency proportion is not calculated. In the example in FIG. 40, the two IP addresses on the parent side of 172.16.32.4 and 172.16.16.3 are present. The parent-side frequency total is 3+3+2+2=10. The CPU 11 divides the parent side frequency of 6(3+3) of the IP address 172.16.32.4 on the parent side by the parent-side frequency total of 10 and obtains a parent frequency proportion of 0.6. Likewise, the CPU 11 divides the parent side frequency of 4(2+2) of the IP address 172.16.16.3 on the parent side by the parent-side frequency total of 10 and obtains a parent frequency proportion of 0.4. It is thereby understood that communications between services on the parent side are performed at a ratio of 6:4.

The CPU 11 subsequently calculates a child-candidate frequency proportion. The CPU 11 refers to the second classification-total DB 158 and reads child candidate frequencies and parent side frequencies. The CPU 11 calculates the child-candidate frequency proportion for each read child candidate frequency by dividing the child candidate frequency by the corresponding parent side frequency. The CPU 11 stores the calculated child-candidate frequency proportion in the proportion DB 159 in association with the IP address of the parent-side communication source and the IP address of the child-side communication destination. In the example in FIG. 40, the parent side frequency in a combination of the IP address of the parent-side communication source 172.16.32.4 and the IP address of the child-candidate communication destination 172.16.32.2:9001 is 3, and the child candidate frequency is 2. Accordingly, the child-candidate frequency proportion is 0.67(⅔). Note that a fraction may be stored, and a result of division may be rounded to appropriate figures.

The CPU 11 subsequently calculates a calling frequency proportion. The CPU 11 refers to the second classification-total DB 158 and extracts, for each IP address of the parent-side communication source, the highest child frequency that is the highest among the child frequencies. The CPU 11 calculates the calling frequency proportion for each child frequency by dividing the child frequency by the highest child frequency among the child frequencies belonging to the same service and having the same IP address of the parent-side communication source. In the example in FIG. 39, the highest child frequency is 5. The CPU obtains a calling frequency proportion of 1.00 by dividing the child frequency of 5 of the IP address of the child-candidate communication destination 172.16.32.3:9030 by the highest child frequency of 5. The CPU also obtains a calling frequency proportion of 0.80 by dividing a child frequency of 4 of the IP address of the child-candidate communication destination 172.16.16.2:9030 by the highest child frequency of 5.

The CPU 11 stores the calculated calling frequency proportion in association with the IP address of the service, the IP address of the parent-side communication source, and the IP address of the child-side communication destination. In the example in FIG. 40, the highest child frequency of the parent-side communication source IP 172.16.32.4 is 2. The child frequency of the IP address of the child-candidate communication destination 172.16.32.2:9001 is 2, and the CPU 11 obtains a calling frequency proportion of 1.00 by dividing the child frequency by the highest child frequency of 2.

Lastly, the CPU 11 calculates a simultaneous calling proportion. The CPU 11 calculates the simultaneous calling proportion by dividing a simultaneous calling frequency by a child candidate frequency. The CPU 11 refers to the second classification-total DB 158 and reads each simultaneous calling frequency and the corresponding child candidate frequency. The CPU 11 calculates the simultaneous calling proportion by dividing the simultaneous calling frequency by the child candidate frequency and stores the calculated simultaneous calling proportion in the proportion DB 159 in association with the IP address of the service, the IP address of the parent-side communication source, and the IP address of the child-side communication destination. In the example in FIG. 39, the CPU 11 obtains a simultaneous calling proportion of 0.50 by dividing a simultaneous calling frequency of 3 by a child candidate frequency of 6. In the example in FIG. 40, in the case where the IP address of the parent-side communication source is 172.16.32.4, the simultaneous calling frequency is 2, and the child candidate frequency is 2. Accordingly, the simultaneous calling proportion is 1.00.

Figure 41:
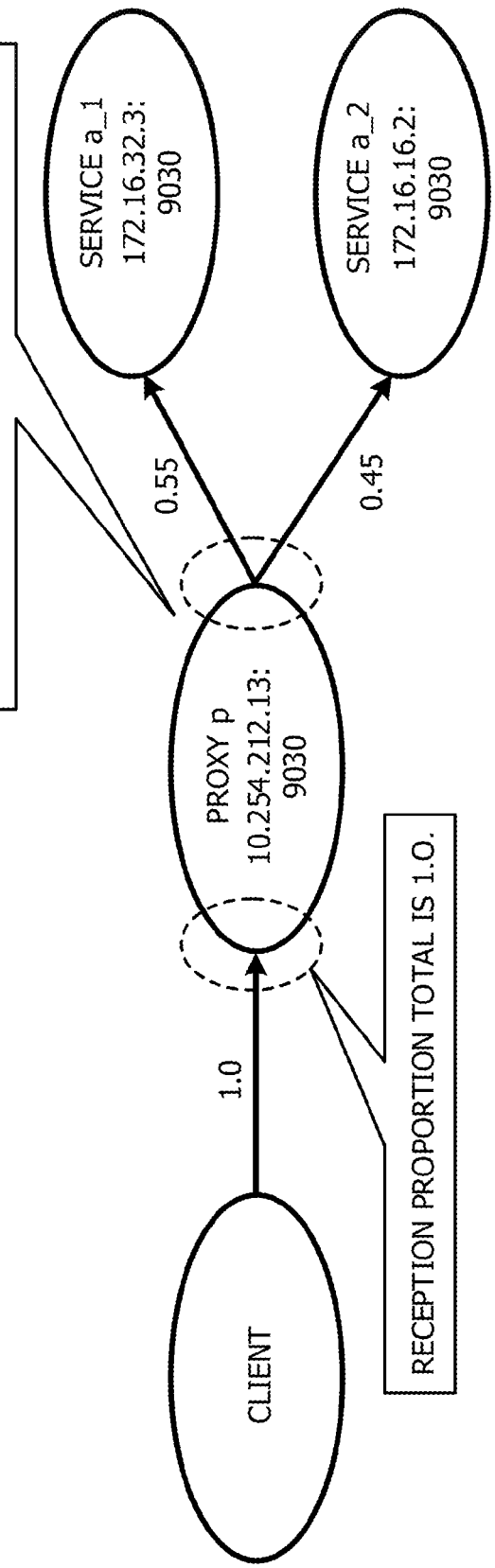
FIG. 41 is an explanatory relational chart.
Figure 42:
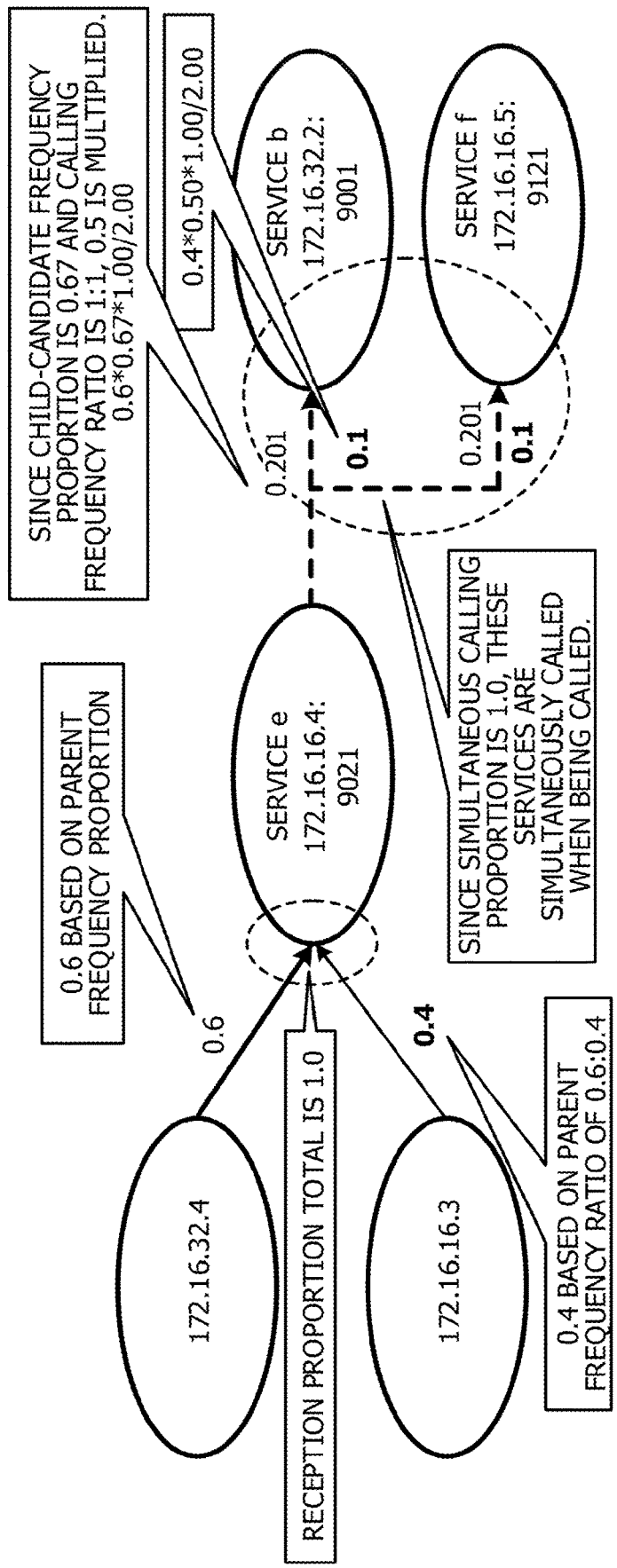
FIG. 42 is an explanatory relational chart for a different service.

FIG. 41 is an explanatory relational chart. FIG. 42 is an explanatory relational chart for a different service. The CPU 11 executes, as processing in Step 9, a process for displaying a proportion near an arrow between a parent and a child. The CPU 11 refers to the proportion DB 159 and reads each parent frequency proportion. The CPU 11 reads the parent frequency proportion in association with the corresponding IP address of the parent-side communication source. The CPU 11 displays the parent frequency proportion near an arrow generated in Embodiment 1 and connecting an ellipse for a target service and an ellipse corresponding to the IP address of the parent-side communication source. Note that if a parent frequency proportion is not stored, the parent frequency proportion is considered to be 1.0. In the example in FIG. 41, the parent frequency proportion for the arrow connecting CLIENT and the proxy p is 1.0.

In the example in FIG. 42, the parent frequency proportion of the IP address of the parent-side communication source 172.16.32.4 is 0.60, and the parent frequency proportion of the IP address of the parent-side communication source 172.16.16.3 is 0.40. In this case, the CPU 11 displays the proportion of 0.6 near the arrow connecting the IP address of the parent-side communication source 172.16.32.4 and the target service and the proportion of 0.4 near the arrow connecting the IP address of the parent-side communication source 172.16.16.3 and the target service.

The CPU 11 subsequently displays a proportion near an arrow connecting the ellipse for the target service and an ellipse on the child side. The CPU 11 calculates the proportion on the child side based on a child-candidate frequency proportion and a calling frequency proportion. Specifically, the CPU 11 calculates the proportion by dividing the child-candidate frequency proportion based on the calling frequency proportion. In the example in FIG. 41, the child-candidate frequency proportion of 1.0 is divided in accordance with the ratio of 1.00:0.80 that is the calling frequency proportion ratio between the service a_1 and the service a_2. In this case, a proportion obtained between the proxy p and the service a_1 is 0.55, a proportion obtained between the proxy p and the service a_2 is 0.45. The CPU 11 displays 0.55 near the arrow connecting the proxy p and the service a_1. The CPU 11 also displays 0.45 near the arrow connecting the proxy p and the service a_2.

An example using FIG. 42 will subsequently be described. The CPU 11 determines whether a simultaneous calling proportion is equal to or higher than a predetermined value. In the description of this embodiment, the predetermined value is 0.8. However, this is an example, and the predetermined value is not limited to this. Since the simultaneous calling proportions of child spans for the target service are higher than the predetermined value in the example in FIG. 42, the CPU 11 determines that the child spans are simultaneously called. In this case, the CPU 11 displays simultaneous calling information indicating that the plurality of services on the child side are simultaneously called. In the description of this embodiment, a solid arrow denoting normal calling information is changed to a dotted arrow to denote the simultaneous calling information. Note that the character string "simultaneous calling" may be displayed on the child span side in the relational chart.

In the example in FIG. 42, the service e is connected to the service b and the service f by using dotted lines. The CPU 11 may display the proportion in such a manner as to enable the service on the parent side from which the communication originates to be distinguished. In this embodiment, the proportion regarding the service on the parent side 172.16.16.3 is displayed in boldface compared with the proportion regarding the service 172.16.32.4. Note that the proportion may be displayed in such a manner so as to be distinguished by a different color or by blinking.

The CPU 11 calculates the proportions of the services b and f, respectively, for the IP address of the parent-side communication source 172.16.32.4. The CPU 11 divides the child frequency proportion of 0.67 in accordance with the calling frequency ratio of 1.00:1.00. Further, the CPU 11 normalizes the child frequency proportion by using the proportion of 0.6 obtained from between the parent side and the target service, that is, $0.6 \times 0.67 \times \frac{1}{2}$ and obtains 0.201. The CPU 11 displays 0.201 near the dotted line connecting the service e and the service b. The CPU 11 also displays 0.201 near the dotted line connecting the service e and the service f having the same proportion divided in accordance with the same ratio. Note that in this embodiment, the normalization example using the proportion obtained from between the parent side and the target service is illustrated, but the normalization may be omitted.

The CPU 11 calculates the respective proportions of the service b and the service f for the IP address of the parent-side communication source 172.16.16.3. The CPU 11 divides a child frequency proportion of 0.50 in accordance with the calling frequency ratio of 1.00:1.00. Further, the CPU 11 normalizes the child frequency proportion value by using the proportion of 0.4 obtained from between the parent side and the target service, that is, $0.4 \times 0.50 \times \frac{1}{2}$ and obtains 0.1. The CPU 11 displays 0.1 in boldface near the dotted line connecting the service e and the service b. The CPU 11 displays 0.1 in boldface also near the dotted line connecting the service e and the service f having the same proportion divided in accordance with the same ratio. The CPU 11 displays the proportions in the relational chart obtained in Embodiment 1 and thereby completes the relational chart.

Figure 43:
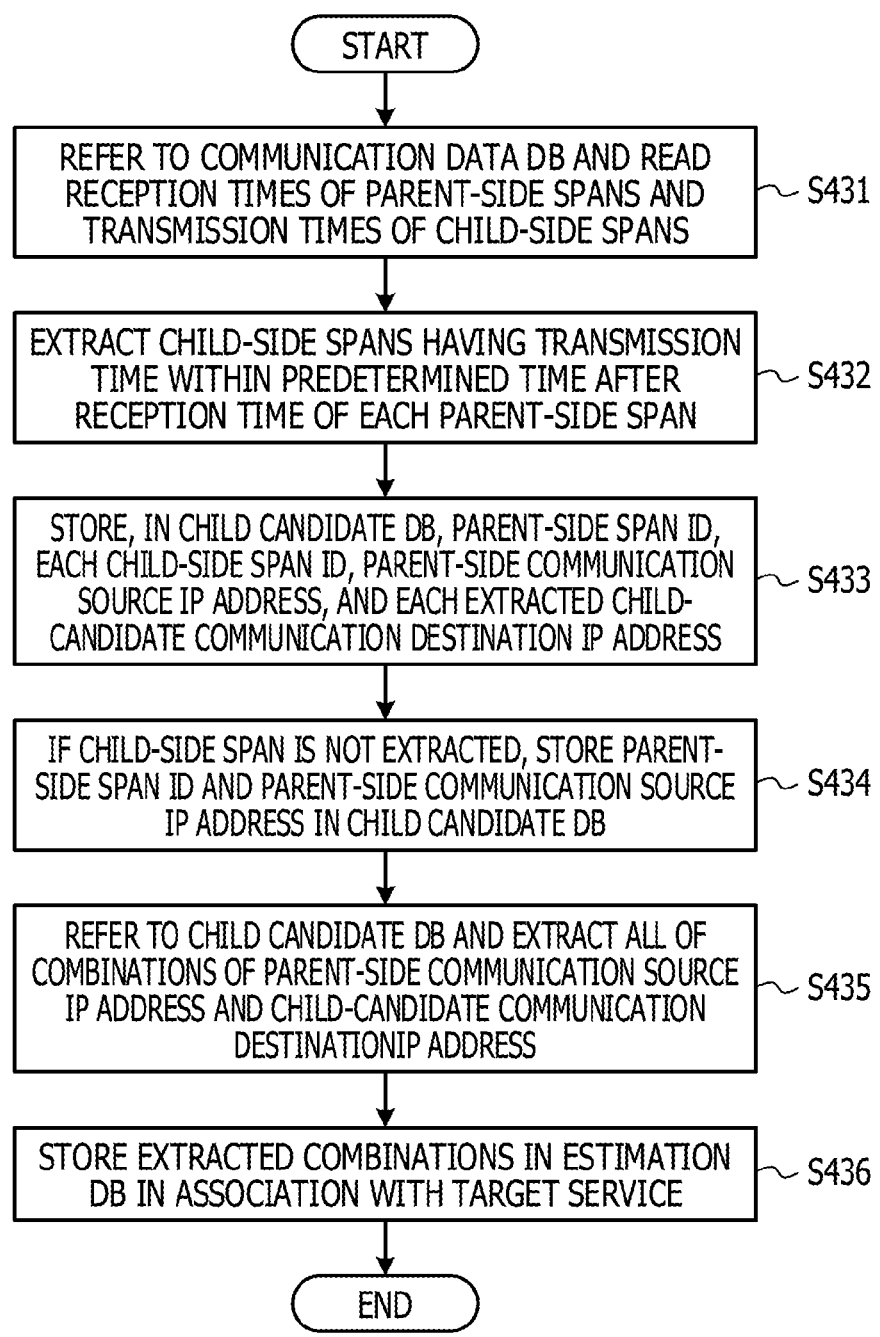
FIG. 43 is a flowchart illustrating steps of a process for estimating a parent-child relationship.

FIG. 43 is a flowchart illustrating steps of a process for estimating a parent-child relationship. The CPU 11 refers to the communication data DB 152 and reads reception times of parent-side spans and transmission times of child-side spans of a target service (step S431). The CPU 11 extracts one or more child-side spans having a transmission time within the predetermined time after the reception time of each parent-side span (step S432). The CPU 11 refers to the communication data DB 152 and stores, in the child candidate DB 156, the parent-side span ID, each child-side span ID, the IP address of the parent-side communication source, and the IP address of each extracted child-candidate communication destination (step S433).

If the CPU 11 does not extract any child-side span in step S432, the CPU 11 stores the parent-side span ID and the IP address of the parent-side communication source in the child candidate DB 156 (step S434). The CPU 11 executes the above-described process in the same manner on each service. The CPU 11 refers to the child candidate DB 156 and extracts all of combinations of the IP address of the parent-side communication source and the IP address of the child-candidate communication destination (step S435). The CPU 11 stores the extracted combinations in the estimation DB 157 in association with the target service (step S436).

Figure 44:
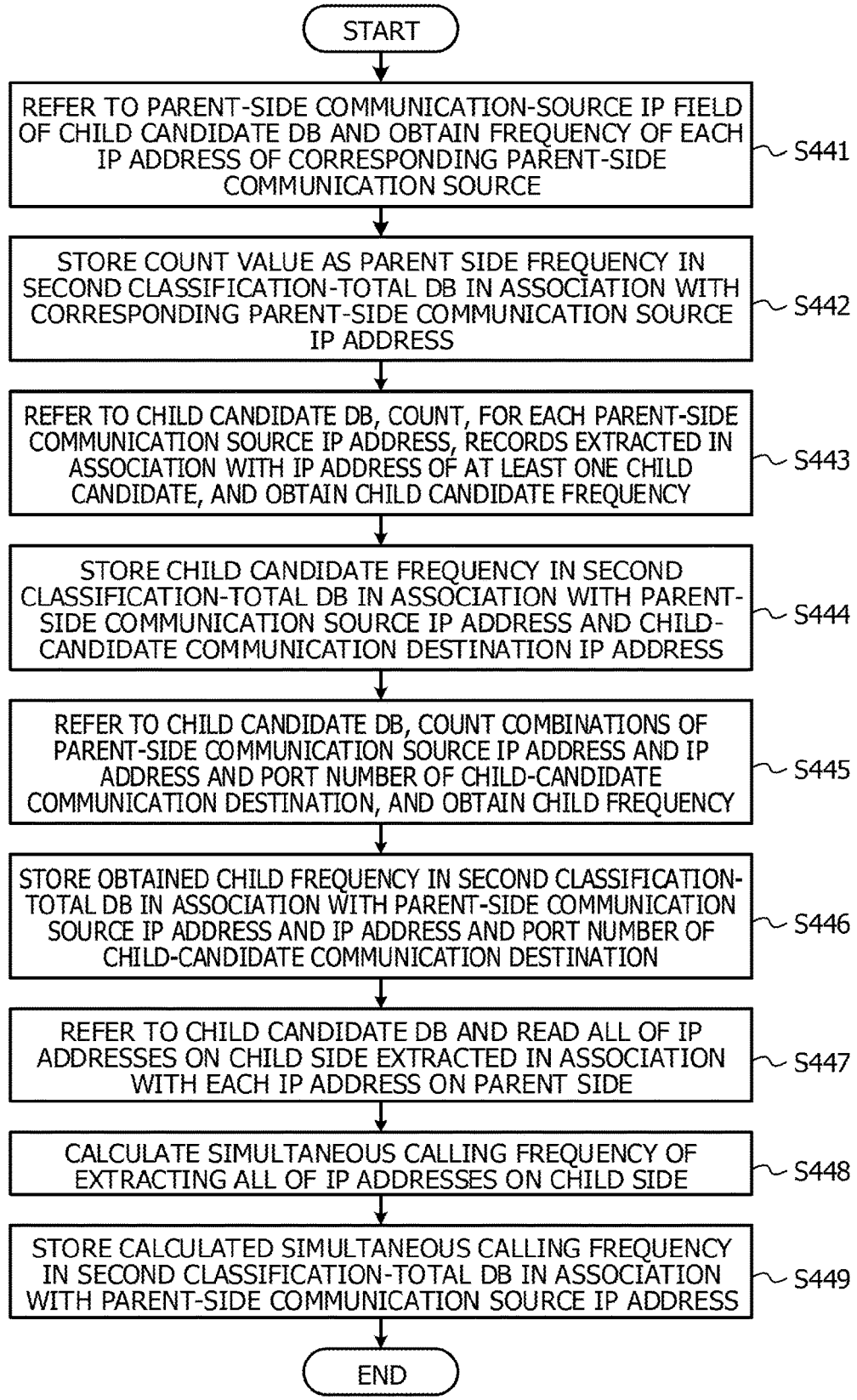
FIG. 44 is a flowchart illustrating steps of a classification-total process.

FIG. 44 is a flowchart illustrating steps of a classification-total process. The CPU 11 of the server computer 1 refers to the parent-side communication-source IP field of the child candidate DB 156 and obtains the frequency of each IP address of the corresponding parent-side communication source (step S441). The CPU 11 stores the count value as a parent side frequency in the second classification-total DB 158 in association with the corresponding IP address of the parent-side communication source (step S442). The CPU 11 refers to the child candidate DB 156. The CPU 11 counts, for each IP address of the parent-side communication source, the records extracted in association with an IP address of at least one child candidate and thereby obtains a child candidate frequency (step S443).

The CPU 11 stores the obtained child candidate frequency in the second classification-total DB 158 in association with the IP address of the parent-side communication source and the IP address of the child-candidate communication destination (step S444). The CPU 11 refers to the child candidate DB 156, counts combinations of the IP address of the parent-side communication source and the IP address and the port number of the child-candidate communication destination, and thereby obtains a child frequency (step S445). The CPU 11 stores the obtained child frequency in the second classification-total DB 158 in association with the IP address of the parent-side communication source and the IP address and the port number of the child-candidate communication destination (step S446).

The CPU 11 refers to the child candidate DB 156 and reads all of the IP addresses on the child side extracted in association with each IP address on the parent side (step S447). In association with the IP address on the parent side, the CPU 11 calculates a simultaneous calling frequency of simultaneously extracting all of the IP addresses on the child side read in step S447 (step S448). The CPU 11 stores the calculated simultaneous calling frequency in the second classification-total DB 158 in association with the IP address of the parent-side communication source (step S449). When the process described above is executed on the child candidate DB 156 for each service, the second classification-total DB 158 for each service is thereby generated.

Figure 45:
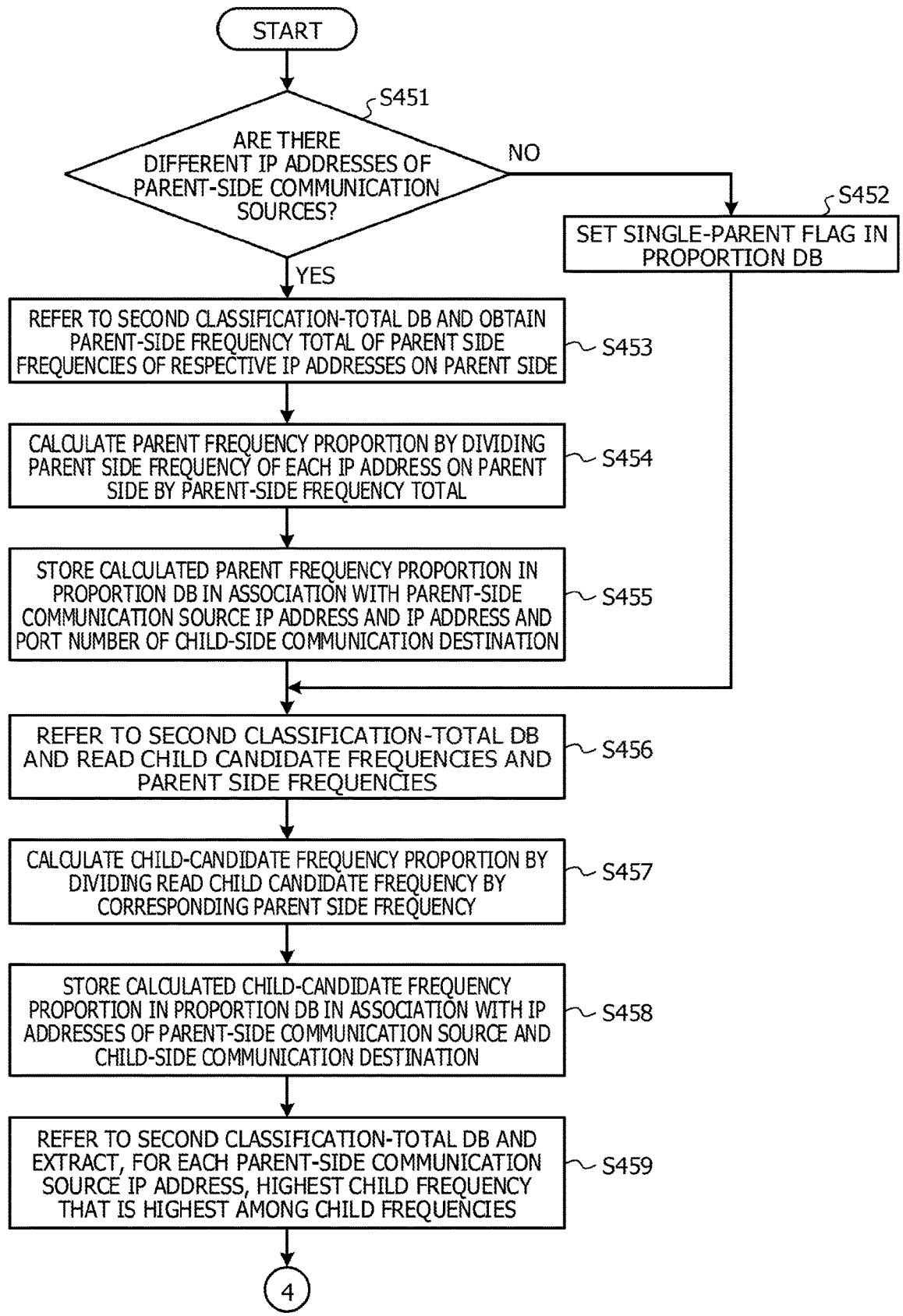
FIG. 45 is a flowchart illustrating steps of a proportion calculation process.
Figure 46:
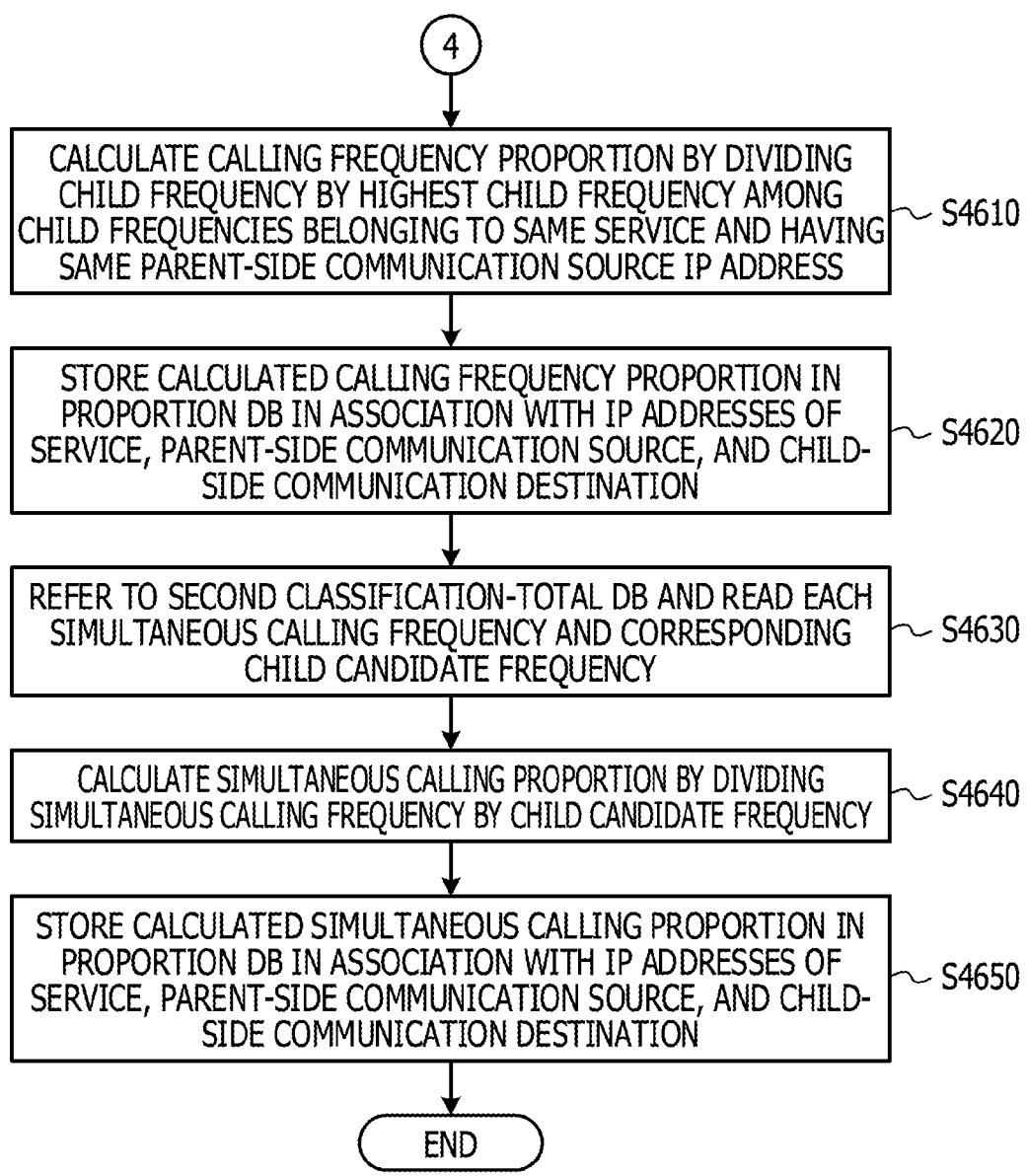
FIG. 46 is a flowchart illustrating steps of the proportion calculation process.

FIGS. 45 and 46 are flowcharts illustrating steps of a proportion calculation process. The CPU 11 refers to the second classification-total DB 158 and determines whether there are different IP addresses of the parent-side communication sources (step S451). If the CPU 11 determines that there are not different IP addresses of the parent-side communication sources (NO in step S451), the CPU 11 moves the process to step S452. The CPU 11 sets, in each parent frequency proportion record in the proportion DB 159, a single-parent flag indicating that the IP address of each parent-side communication sources is the same (step S452). The CPU 11 thereafter moves the process to step S456.

In contrast, if the CPU 11 determines that there are different IP addresses of the parent-side communication sources (YES in step S451), the CPU 11 moves the process to step S453. The CPU 11 refers to the second classification-total DB 158 and obtains a parent-side frequency total of parent side frequencies of the respective IP addresses on the parent side (step S453). The CPU 11 calculates a parent frequency proportion by dividing the parent side frequency of each IP address on the parent side by the parent-side frequency total (step S454). The CPU 11 stores the calculated parent frequency proportion in the proportion DB 159 in association with the IP address of the parent-side communication source and the IP address and the port number of the child-side communication destination (step S455).

The CPU 11 refers to the second classification-total DB 158 and reads the child candidate frequencies and the parent side frequencies (step S456). The CPU 11 calculates a child-candidate frequency proportion for each read child candidate frequency by dividing the child candidate frequency by the corresponding parent side frequency (step S457). The CPU 11 stores the calculated child-candidate frequency proportion in the proportion DB 159 in association with the IP address of the parent-side communication source and the IP address of the child-side communication destination (step S458). The CPU 11 refers to the second classification-total DB 158 and extracts, for each IP address of the parent-side communication source, the highest child frequency that is the highest among the child frequencies (step S459).

The CPU 11 calculates a calling frequency proportion for each child frequency by dividing the child frequency by the highest child frequency among the child frequencies belonging to the same service and having the same IP address of the parent-side communication source (step S4610). The CPU 11 stores the calculated calling frequency proportion in the proportion DB 159 in association with the IP address of the service, the IP address of the parent-side communication source, and the IP address of the child-side communication destination (step S4620). The CPU 11 refers to the second classification-total DB 158 and reads each simultaneous calling frequency and the corresponding child candidate frequency (step S4630). The CPU 11 calculates a simultaneous calling proportion by dividing the simultaneous calling frequency by the child candidate frequency (step S4640). The CPU 11 stores the calculated simultaneous calling proportion in the proportion DB 159 in association with the IP address of the service, the IP address of the parent-side communication source, and the IP address of the child-side communication destination (step S4650).

Figure 47:
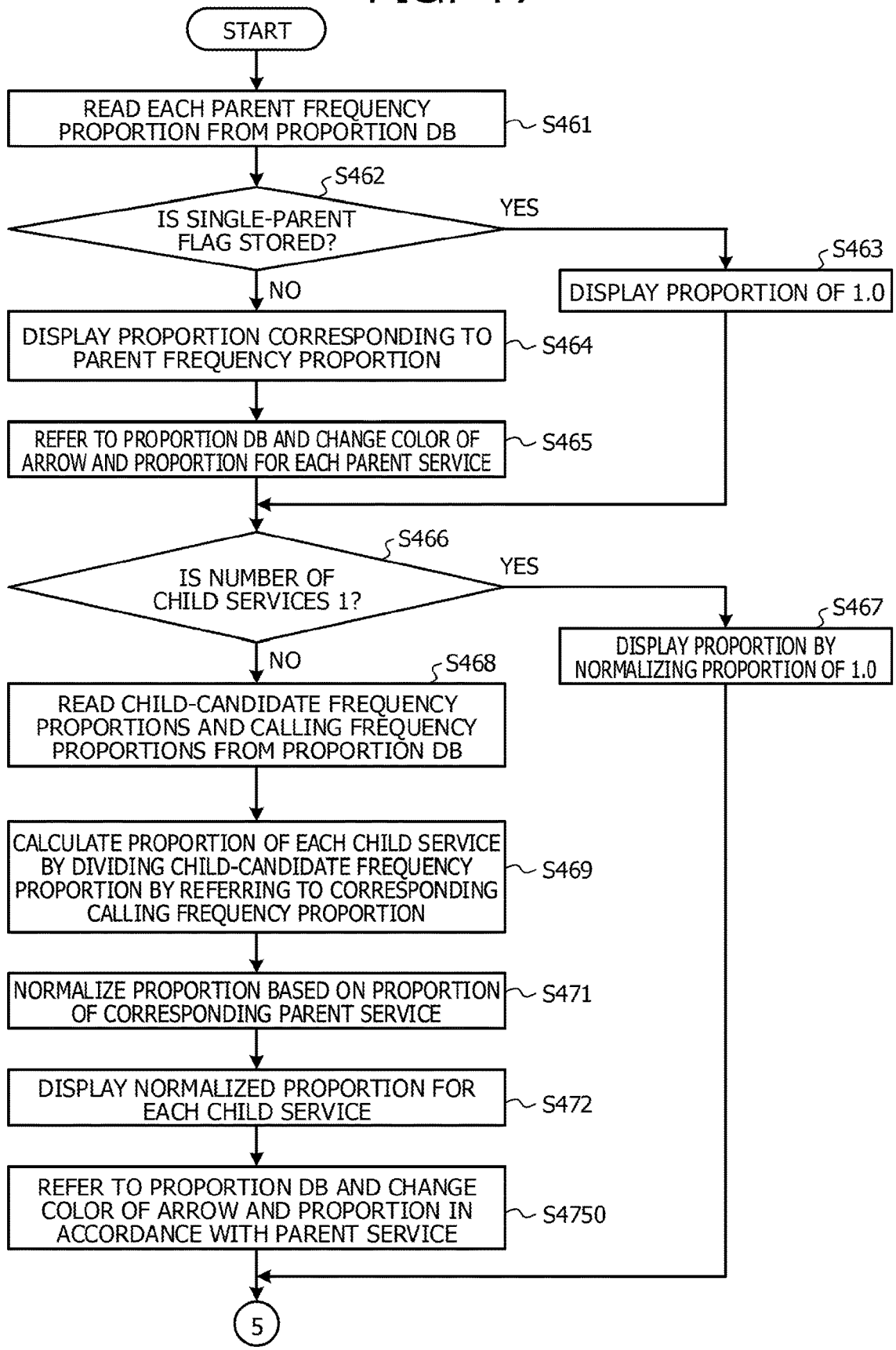
FIG. 47 is a flowchart illustrating steps of a proportion display process.
Figure 48:
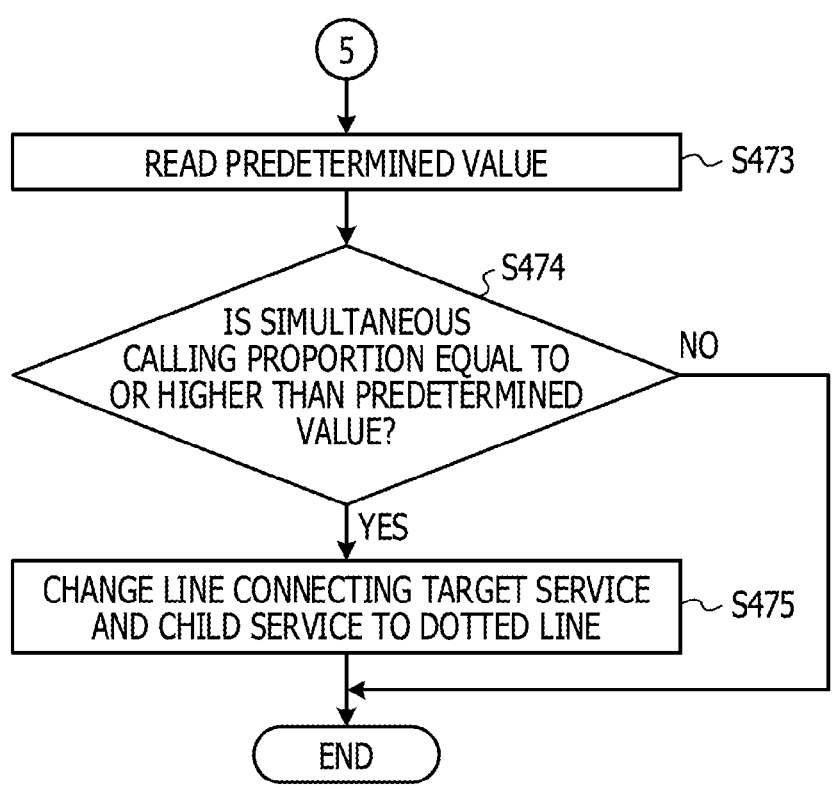
FIG. 48 is a flowchart illustrating steps of the proportion display process.

FIGS. 47 and 48 are flowcharts illustrating steps of a proportion display process. If step S3111 results in YES, or after step S3113, the CPU 11 executes the process for displaying a proportion in a relational chart. Note that in this embodiment, an example in which proportions are displayed for three types of objects that are a parent, a target service, and a child in a state after step S3111 results in YES, that is, in an unconnected state will be described. The CPU 11 reads parent frequency proportions from the proportion DB 159 (step S461). The CPU 11 determines whether the single-parent flag is set for each parent frequency proportion (step S462). If the CPU 11 determines that the single-parent flag is set (YES in step S462), the CPU 11 moves the process to step S463. The CPU 11 displays a proportion of 1.0 near a line connecting the parent service and a target service (step S463). The CPU 11 thereafter moves the process to step S466.

If the CPU 11 determines that the single-parent flag is not set (NO in step S462), the CPU 11 moves the process to step S464. The CPU 11 displays, for each parent frequency proportion, a proportion corresponding to the parent frequency proportion near a line connecting the corresponding parent service and the target service (step S464). The CPU 11 refers to the proportion DB 159 and changes the color of the arrow and the proportion on a per parent service basis (step S465).

The CPU 11 refers to a relational chart generated in Embodiment 1 and determines whether the number of child services is 1 (step S466). If the CPU 11 determines that the number of child services is 1 (YES in step S466), the CPU 11 moves the process to step S467. The CPU 11 normalizes the proportion of 1.0 based on the proportion determined in step S463 or S464 as the proportion obtained from between the parent side and the target service, and displays the normalized proportion (step S467). The CPU 11 thereafter moves the process to step S473.

If the CPU 11 determines that the number of child services is not 1 (NO in step S466), the CPU 11 moves the process to step S468. The CPU 11 reads child-candidate frequency proportions and calling frequency proportions from the proportion DB 159 (step S468). The CPU 11 calculates the proportion of each child service for each child-candidate frequency proportion by dividing the child-candidate frequency proportion by referring to the corresponding calling frequency proportion (step S469). The CPU 11 normalizes the proportion calculated in step S469 based on the proportion of the corresponding parent service described in step S463 or S464 (step S471). The CPU 11 displays the normalized proportion near the arrow connecting the target service and the child service (step S472).

The CPU 11 refers to the proportion DB 159 and changes the color of the arrow and the proportion in accordance with the corresponding parent service (step S4720). In the example in FIG. 42, communication from the IP address of the parent-side communication source 172.16.32.4 has an arrow and a proportion that are represented in black. Communication from the IP address of the parent-side communication source 172.16.3 may have an arrow and a proportion represented in red different from black. The CPU 11 reads the predetermined value from the storage unit 15 (step S473). The CPU 11 refers to the proportion DB 159 and determines whether the simultaneous calling proportion of the child service is equal to or higher than the predetermined value (step S474).

If the CPU 11 determines that the simultaneous calling proportion is equal to or higher than the predetermined value (YES in step S474), the CPU 11 moves the process to step S475. The CPU 11 changes the line connecting the target service and the child service to a dotted line to clearly indicate simultaneous calling (step S475). If the CPU 11 determines that the simultaneous calling proportion is lower than the predetermined value (NO in step S474), the CPU 11 skips step S475 and terminates the series of steps. The CPU 11 executes the above-described process on all of the services in the same manner. A relational chart in which proportions are displayed for all of combinations for a parent, a target service, and a child is thereby generated. When connecting the relational charts, the CPU 11 sets the proportion near the line connecting the first parent and the subsequent target service to 1 and normalizes each proportion obtained between the subsequent services in a time series.

Figure 49:
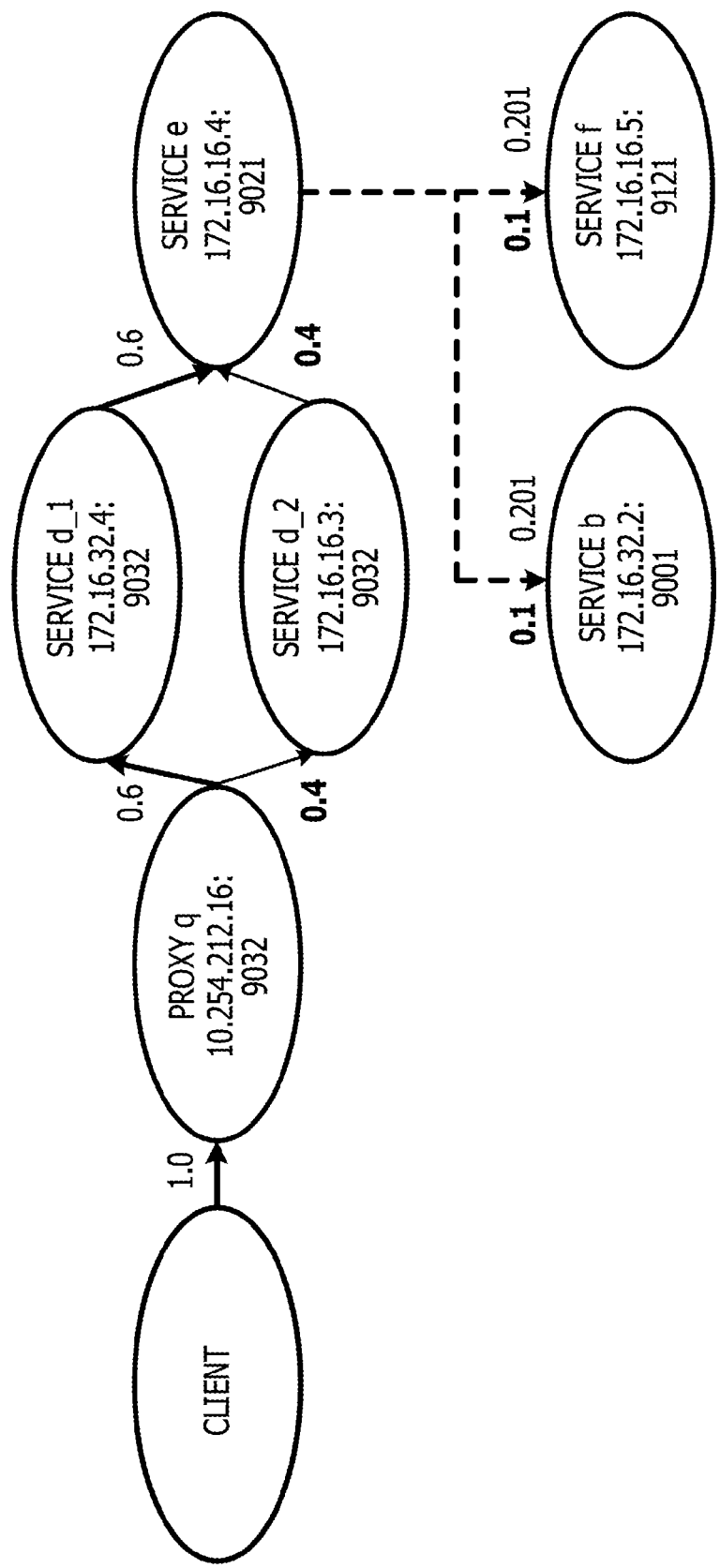
FIG. 49 is an explanatory diagram illustrating an example of connected flows.

FIG. 49 is an explanatory diagram illustrating an example of the connected flows. In the example in FIG. 49, in a case where the proxy q and the service e are respective target services, the child services d_1 and d_2 of the proxy q are the same as the parent services d_1 and d_2 of the service e. With respect to the services d_1 and d_2, the CPU 11 connects the relational charts generated for the proxy q and the service e. With the proportion obtained between CLIENT and the proxy q being set to 1.0, the CPU 11 normalizes proportions obtained between the subsequent services in a time series. Note that the normalization may be omitted.

Accordingly, the proportion of communication can also be recognized visually and easily. In addition, the presence of simultaneous calling can be recognized visually.

Embodiment 2 has heretofore been described, and description other than the above is the same as that in Embodiment 1. Accordingly, the same components are denoted by the same reference numerals, and detailed description is omitted.

Embodiment 3

Figure 50:
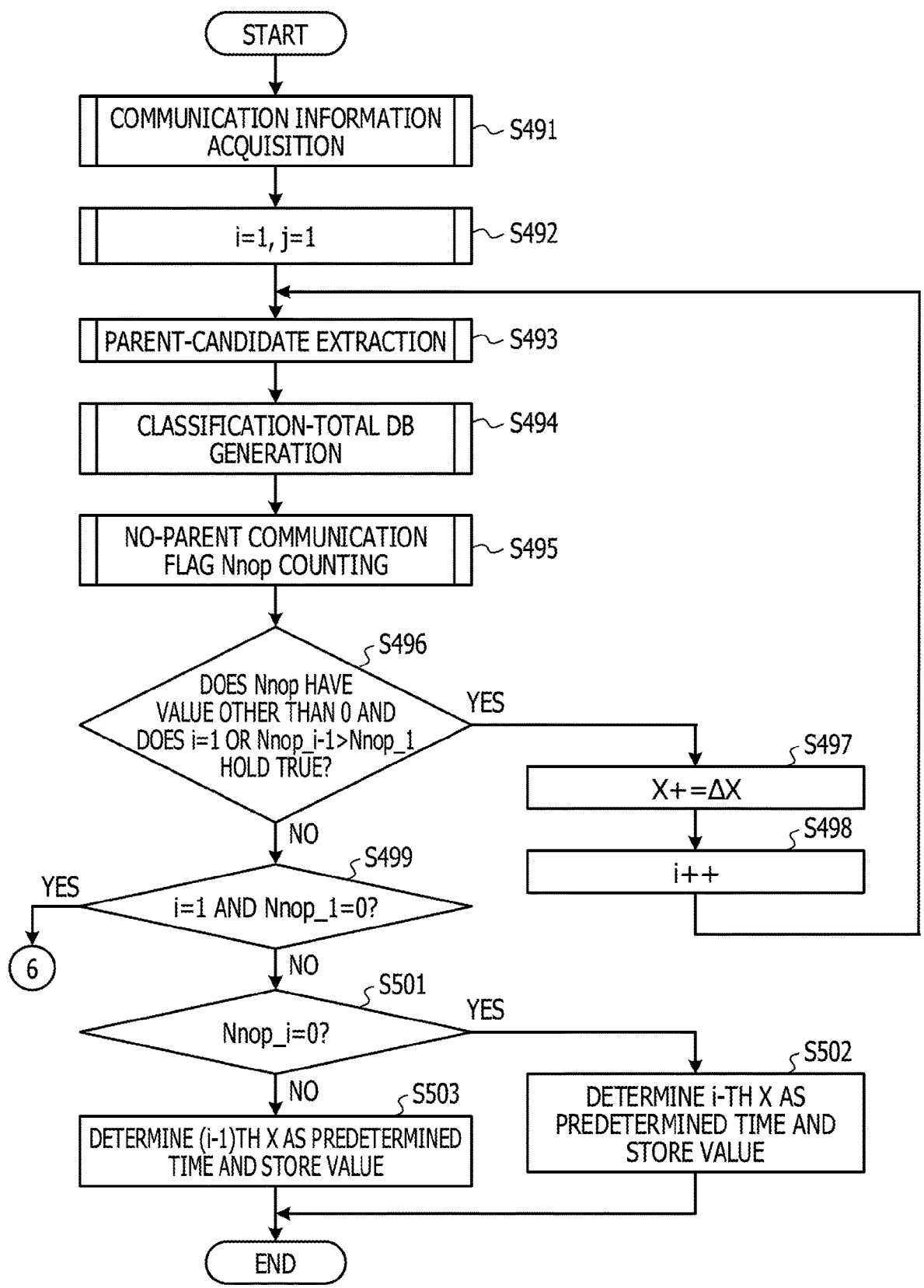
FIG. 50 is a flowchart illustrating steps of a process for determining a predetermined time.
Figure 51:
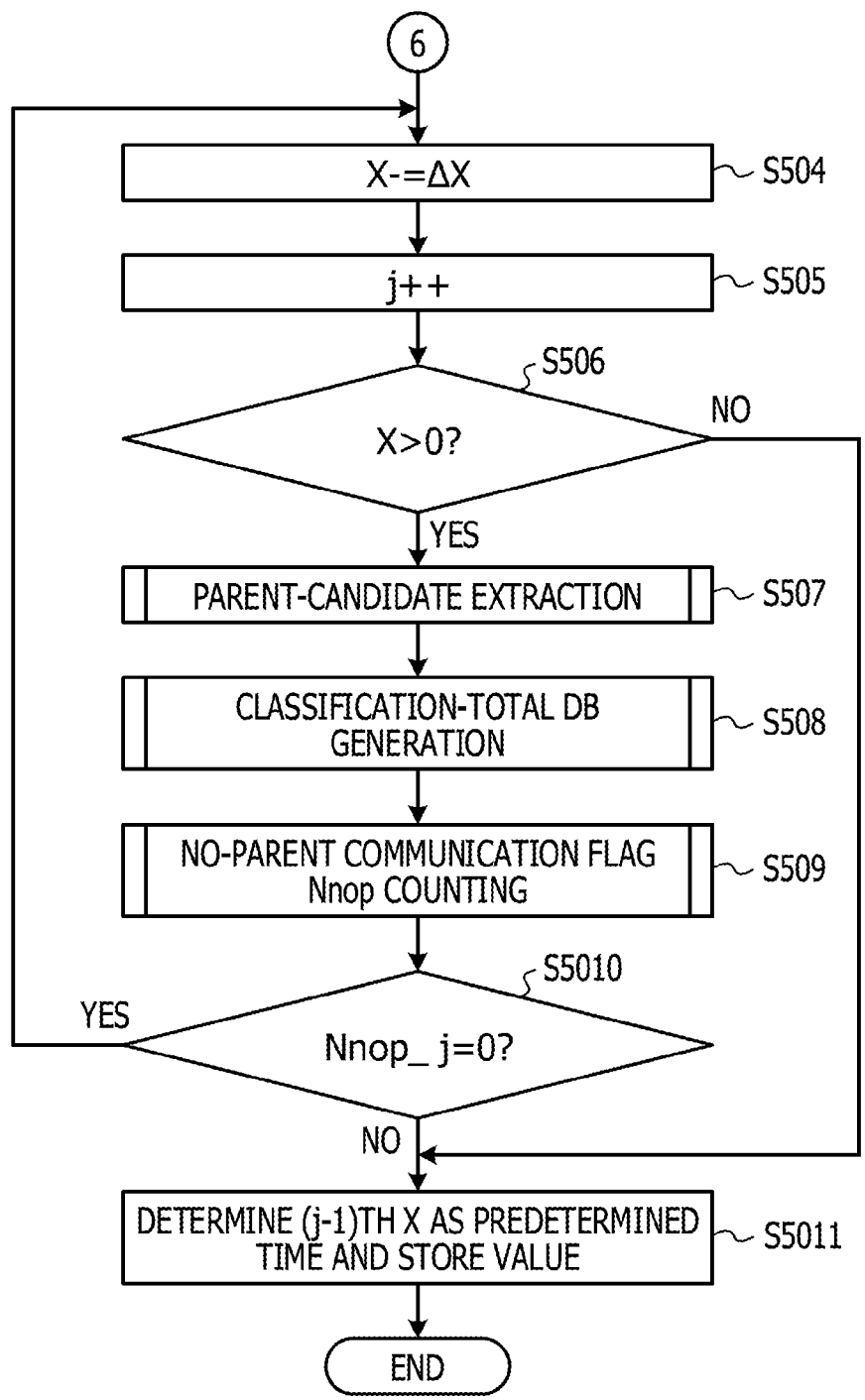
FIG. 51 is a flowchart illustrating steps of the process for determining a predetermined time.

Embodiment 3 relates to a form in which the predetermined time X is changed. FIGS. 50 and 51 are flowcharts illustrating steps of a process for determining a predetermined time X. The CPU 11 executes the communication information acquisition process in Step 1 as described with reference to FIG. 26 (step S491). The CPU 11 inputs an initial value of 1 to each of variables i and j (step S492). The CPU 11 executes the parent-candidate extraction process in Step 2 described with reference to FIGS. 26 and 27 (step S493). The CPU 11 executes the process for generating the classification-total DB 154 in Step 3 by executing the process illustrated in FIG. 28 (step S494).

The CPU 11 counts no-parent communication flags (hereinafter, referred to as Nnops) set in step S288 in Step 4 (step S495). The CPU 11 determines whether Nnop (the number of absences) has a value other than 0 and a relation i=1 or Nnop_i−1>Nnop_1 holds true (step S496). If the CPU 11 determines that Nnop has a value other than 0 and the relation i=1 or Nnop_i−1>Nnop_1 holds true (YES in step S496), the CPU 11 moves the process to step S497. The CPU 11 increments the value of the predetermined time X (for example, 10) by a predetermined value (step S497). The CPU 11 increments the variable i (step S498). The CPU 11 thereafter moves the process back to step S493. Repeating the process leads to a decrease of the value of Nnop.

If the CPU 11 determines that Nnop has a value other than 0 and that the relation i=1 or Nnop_i−1>Nnop_1 does not hold true (NO in step S496), the CPU 11 moves the process to step S499. The CPU 11 determines whether the relations i=1 and Nnop_1=0 hold true (step S499). The CPU 11 determines that the relations i=1 and Nnop_1=0 hold true (YES in step S499), the CPU 11 moves the process to step S504 because the number of parent candidates is originally 0 and the predetermined time X is likely to have a too large value.

If the CPU 11 determines that the relations i=1 and Nnop_1=0 do not hold true (NO in step S499), the CPU 11 moves the process to step S501. The CPU 11 determines whether Nnop_i is 0 (step S501). If the CPU 11 determines that Nnop_i is 0 (YES in step S501), the CPU 11 moves the process to step S502. The CPU 11 determines the i-th X as the predetermined time and stores the value in the storage unit 15 (step S502). If the CPU 11 determines that Nnop_i is not 0 (NO in step S501), the CPU 11 moves the process to step S503. The CPU 11 determines the (i−1)th X as the predetermined time and stores the value in the storage unit 15 (step S503). After steps S502 and S503, the CPU 11 executes the process for estimating a parent-child relationship in Step 5 illustrated in FIG. 29.

FIG. 52 is an explanatory diagram illustrating a state before the change of the predetermined time X. FIG. 53 is an explanatory diagram illustrating a state after the change of the predetermined time X. FIG. 52 illustrates the predetermined time X set to 10. There are two Nnops indicating that a parent candidate having a reception time within the predetermined time (10) before the transmission time of the child-side span is not present. In this case, the value of the predetermined time X is small and is thus increased, and Nnop is thereby decreased. The example in FIG. 53 illustrates the predetermined time X increased to 20. In this case, Nnop is 0.

If step S499 results in YES, the CPU 11 decreases the predetermined time X because Nnop is originally 0 and the predetermined time X is likely to have a too large value. The CPU 11 decrements the predetermined time X by a predetermined value ΔX (step S504). The predetermined value may be, for example, 100. The CPU 11 increments the variable j (step S505). The CPU 11 determines whether the predetermined time X is larger than 0 (step S506). If the CPU 11 determines that the predetermined time X is not larger than 0 (NO in step S506), the CPU 11 moves the process to step S5011.

If the CPU 11 determines that the predetermined time X is larger than 0 (YES in step S506), the CPU 11 moves the process to step S507. The CPU 11 executes the parent-candidate extraction process in Step 2 in the same manner as in step S493 (step S507). The CPU 11 executes the process for generating the classification-total DB 154 in Step 3 in the same manner as in step S494 (step S508). The CPU 11 counts no-parent communication flags Nnop (step S509).

The CPU 11 determines whether Nnop_j is 0 (step S5010). If the CPU 11 determines that Nnop_j is 0 (YES in step S5010), the CPU 11 moves the process back to step S504. If the CPU 11 determines that Nnop_j is not 0 (NO in step S5010) or if step S506 results in NO, the CPU 11 determines the (j−1)th X as the predetermined time and stores the value in the storage unit 15 (step S5011).

FIG. 54 is an explanatory diagram illustrating a state before the change of the predetermined time X. FIG. 55 is an explanatory diagram illustrating a state after the change of the predetermined time X. FIG. 54 illustrates the predetermined time X set to 200. In this case, Nnop is originally 0, and the predetermined time X is decremented. FIG. 55 illustrates the predetermined time X decreased to 100. Although Nnop is also 0 in this case, 100 is determined as the predetermined time X because further decrease of the predetermined time X leads to a value of 0. An optimum predetermined time can thereby be determined. In addition, the use of an appropriate predetermined time can enhance the estimation accuracy.

Embodiment 3 has heretofore been described, and description other than the above is the same as those in Embodiments 1 and 2. Accordingly, the same components are denoted by the same reference numerals, and detailed description is omitted.

Embodiment 4

Figure 56:
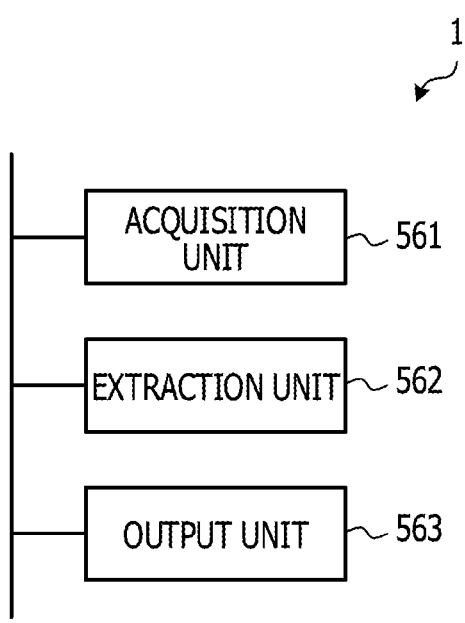
FIG. 56 is a functional block diagram illustrating operations of the server computer according to the embodiments described above.

FIG. 56 is a functional block diagram illustrating operations of the server computer 1 according to the embodiments described above. When the CPU 11 runs the control program 15P, the server computer 1 thereby operates in the following manner. An acquisition unit 561 acquires communication information including reception times on the transmission source side of a plurality of services and transmission times on the transmission destination side of the services. An extraction unit 562 extracts, for each service, one or more transmission source candidates each having a reception time within the predetermined time before each transmission time. An output unit 563 outputs data for displaying a relational chart representing relationships among the services based on the transmission source candidates of the services.

FIG. 57 is a block diagram illustrating a hardware group of a server computer 1 according to Embodiment 4. A program for operating the server computer 1 may be stored in a portable recording medium 1A such as a compact-disc read-only memory (CD-ROM), a digital versatile disc, a memory card, or a universal serial bus (USB) memory, may be read by a reading unit 10A such as a disk drive or a memory card slot, and then may be stored in the storage unit 15. A semiconductor memory 1B such as a flash memory soring the program may be installed in the server computer 1. Further, the program may be downloaded from another server computer (not illustrated) connected via the communication network N such as the Internet. The details will be described below.

The server computer 1 illustrated in FIG. 57 reads the program for executing the processes using software from the portable recording medium 1A or the semiconductor memory 1B or downloads the program from another server computer (not illustrated) via the communication network N. The program is installed as the control program 15P, loaded in the RAM 12, and then run. The server computer 1 thereby functions as described above.

Embodiment 4 has heretofore been described, and description other than the above is the same as those in Embodiments 1 to 3. Accordingly, the same components are denoted by the same reference numerals, and detailed description is omitted. Note that the embodiments described above may be appropriately combined.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method executed by a computer comprising:
executing first processing when a first condition, a second condition and a third condition are fulfilled, the first processing including generating relation information indicating service relationships each indicating that a first service and a source service and a destination service are related each other among a plurality of services, the first condition being configured to be fulfilled when a reception from the source service occurs at the first service, the second condition being configured to be fulfilled when a transmission to the destination service occurs at the first service, the third condition being configured to be fulfilled when a time of the reception is within a specific time period before a time of the transmission;
determining, for each specified source service and each specified destination service among the plurality of services, whether the first service and the specified source service and the specified destination service have performed a related communication, the determining being performed based on a number of service relationships corresponding to a combination of the first service and the specified source service and the specified destination service, the number of service relationships being determined based on the relation information; and
outputting information representing the combination of the first service and the specified source service and the specified destination service that are determined to have performed the related communication,
wherein the determining includes
calculating a proportion value obtained by dividing the number of service relationship corresponding to the specified source service and the specified destination service by a total of numbers of service relationships corresponding to destination services identical to the specified destination service, and
determining whether the first service and the specified source service and the specified destination service have performed the related communication based on the proportion value.

2. The method according to claim 1, wherein the information is a relational chart indicating at least a connection between the specified source service and the specified destination service via the first service.

3. The method according to claim 1, wherein the relation information includes each address identifying the source service in association with each address identifying the destination service.

4. The method according to claim 1, wherein the combination includes a parent relation between the first service and the specified source service and a child relation between the first service and the specified destination service.

5. The method according to claim 1, further comprising:
if there is no reception within the specific time period before a time of the transmission, generating information indicating that the specified source service is not present.

6. The method according to claim 1, further comprising:
when another transmission to another destination service occurs at the first service and when the time of the reception is within the specific time period before a time of the other transmission, generating other relation information indicating another service relationship indicating that the first service and the specified source service and the specified destination service and the other destination service are related each other, the other service relationship corresponding to simultaneous calling.

7. The method according to claim 1, further comprising:
changing the specific time period.

8. The method according to claim 6,
wherein the determining includes calculating a proportion value obtained by dividing a number of the other service relationship corresponding to the specified source service and the specified destination service and the other destination service by a total of numbers of other service relationships corresponding to source services identical to the specified source service, and
wherein, when the proportion value is no less than a threshold value, the outputting includes adding simultaneous calling information into the information, the simultaneous calling information indicating the other service relationship.

9. The method according to claim 7, wherein the changing is executed when there is no reception time within the specific time period before the transmission.

10. A device comprising:
a memory; and
a processor coupled to the memory and the processor configured to:
execute first processing when a first condition, a second condition and a third condition are fulfilled, the first processing including generating relation information indicating service relationships each indicating that a first service and a source service and a destination service are related each other among a plurality of services, the first condition being configured to be fulfilled when a reception from the source service occurs at the first service, the second condition being configured to be fulfilled when a transmission to the destination service occurs at the first service, the third condition being configured to be fulfilled when a time of the reception is within a specific time period before a time of the transmission, determine, for each specified source service and each specified destination service among the plurality of services, whether the first service and the specified source service and the specified destination service have performed a related communication, the determining being performed based on a number of service relationships corresponding to a combination of the first service and the specified source service and the specified destination service, the number of service relationships being determined based on the relation information, and output information representing the combination of the first service and the specified source service and the specified destination service that are determined to have performed the related communication, wherein the determining includes calculating a proportion value obtained by dividing the number of service relationship corresponding to the specified source service and the specified destination service by a total of numbers of service relationships corresponding to destination services identical to the specified destination service, and determining whether the first service and the specified source service and the specified destination service have performed the related communication based on the proportion value.

11. A non-transitory computer-readable recording medium storing a program that causes a computer to execute a process comprising:

executing first processing when a first condition, a second condition and a third condition are fulfilled, the first processing including generating relation information indicating service relationships each indicating that a first service and a source service and a destination service are related each other among a plurality of services, the first condition being configured to be fulfilled when a reception from the source service occurs at the first service, the second condition being configured to be fulfilled when a transmission to the destination service occurs at the first service, the third condition being configured to be fulfilled when a time of the reception is within a specific time period before a time of the transmission;

determining, for each specified source service and each specified destination service among the plurality of services, whether the first service and the specified source service and the specified destination service have performed a related communication, the determining being performed based on a number of service relationships corresponding to a combination of the first service and the specified source service and the specified destination service, the number of service relationships being determined based on the relation information; and outputting information representing the combination of the first service and the specified source service and the specified destination service that are determined to have performed the related communication, wherein the determining includes calculating a proportion value obtained by dividing the number of service relationship corresponding to the specified source service and the specified destination service by a total of numbers of service relationships corresponding to destination services identical to the specified destination service, and determining whether the first service and the specified source service and the specified destination service have performed the related communication based on the proportion value.

* * * * *